United States Patent [19]

Kawabata et al.

[11] Patent Number: 5,121,151
[45] Date of Patent: Jun. 9, 1992

[54] FOCUS ADJUSTMENT INFORMATION FORMING DEVICE

[75] Inventors: Takashi Kawabata; Yukio Odaka; Hiroshi Miyanari, all of Kanagawa; Eiji Nishimori, Tokyo; Toshiaki Shingu, Kanagawa; Yasuteru Ichida, Tokyo; Hidetoshi Masuda, Kanagawa, all of Japan

[73] Assignee: Canon Kabushiki Kaisha, Tokyo, Japan

[21] Appl. No.: 693,773

[22] Filed: Apr. 26, 1991

Related U.S. Application Data

[63] Continuation of Ser. No. 344,260, Apr. 27, 1989, abandoned.

[30] Foreign Application Priority Data

Apr. 28, 1988 [JP] Japan .................. 63-103983
Apr. 24, 1989 [JP] Japan .................. 1-104266

[51] Int. Cl.⁵ .............................................. G03B 3/00
[52] U.S. Cl. .................................................. 354/402
[58] Field of Search ............ 354/402, 403, 404, 405, 354/406, 407, 408, 409

[56] References Cited

U.S. PATENT DOCUMENTS 4,621,917 11/1986 Kaneda ........................ 354/403
4,800,409 1/1989 Matsuda et al. .............. 354/402
5,051,766 9/1991 Monaka et al. .............. 354/402

*Primary Examiner*—W. B. Perkey
*Assistant Examiner*—Cassandra C. Spyrou
*Attorney, Agent, or Firm*—Robin, Blecker, Daley & Driscoll

[57] ABSTRACT

Disclosed is a focus adjustment information forming device of the kind arranged to measure distances at a plurality of distance measuring areas on a picture plane specified by optical means which has its focal point being adjusted and to form information on adjustment of the focal point, the plurality of distance measuring areas including a center distance area located approximately in the center of the picture plane. The device comprises first priority means for giving priority to a measured distance value which represents the nearest distance among measured distance values obtained from the distance measuring areas; a second priority means for giving priority to the measured distance value obtained from the center distance measuring area according to its relations to the measured distance values of other distance measuring areas when one of the measured distance values of the distance measuring areas other than the center distance measuring area represents the nearest distance; and focus adjustment information forming means for forming information on adjustment of the focal point of the optical means on the basis of outputs of the first and second priority means.

10 Claims, 67 Drawing Sheets

LENS DRIVING INFORMATION

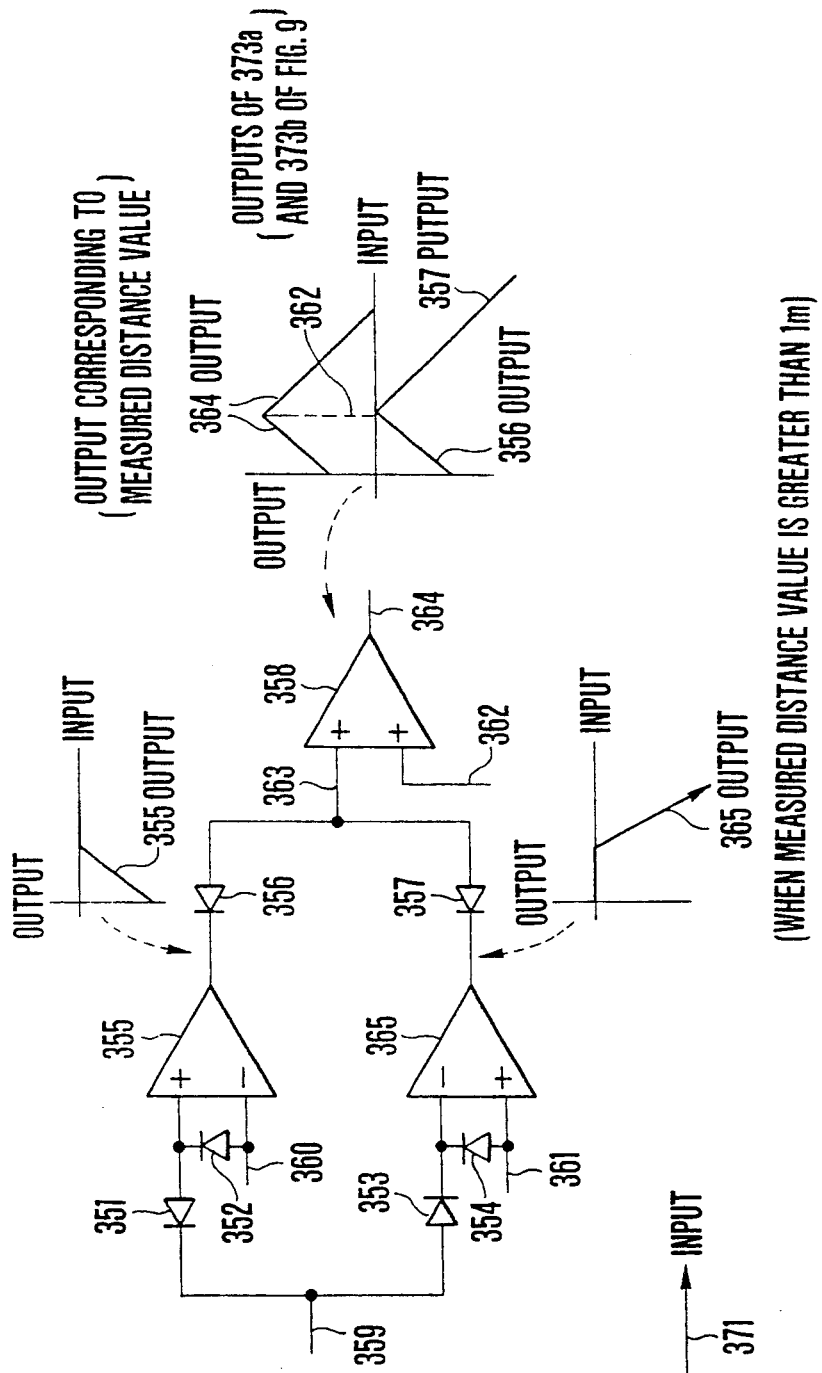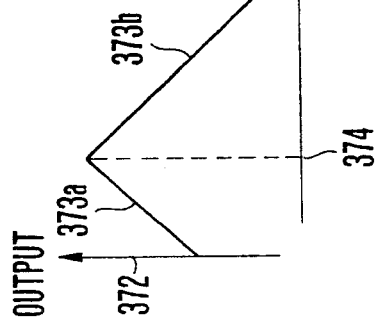

(PEAK DETECTION CKT)

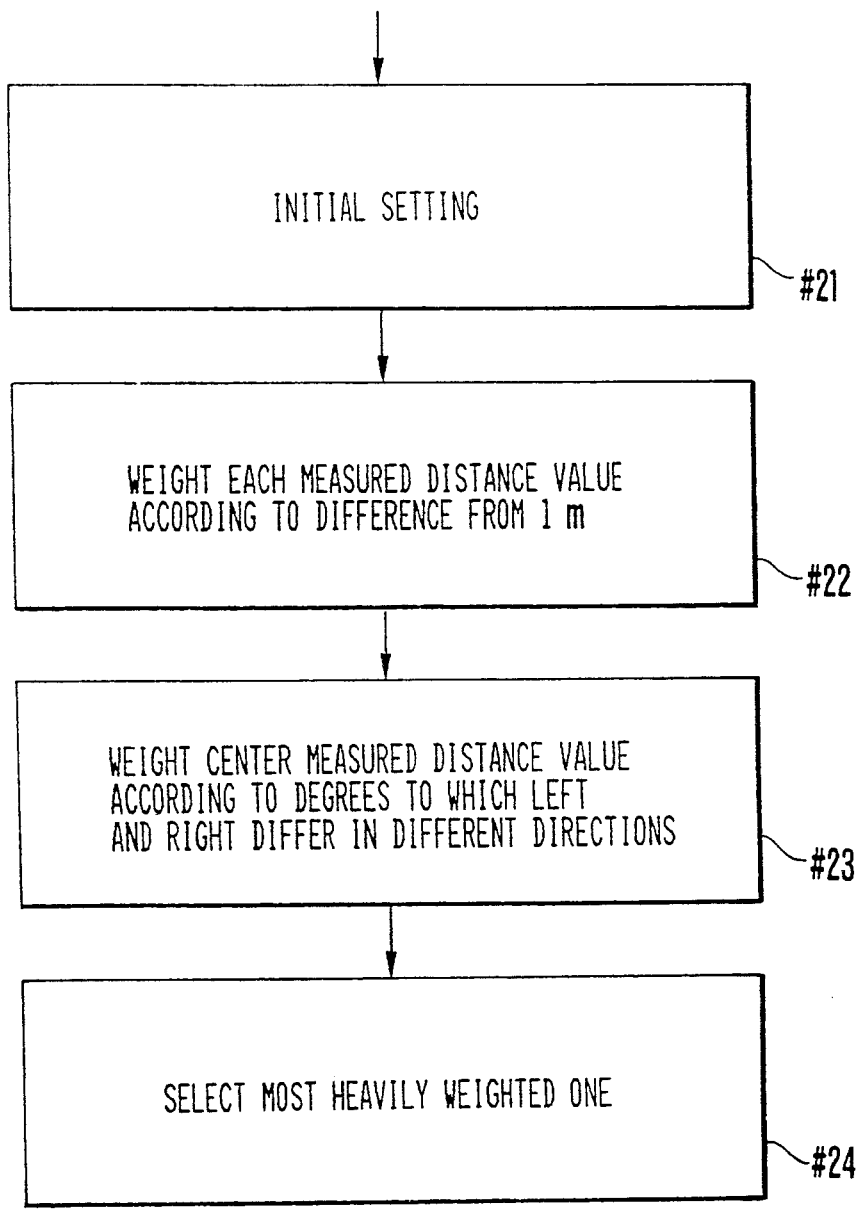

FIG.13

$$\#21 \begin{cases} LR=0 \\ CR=0 \\ RR=0 \end{cases}$$

$$\#22 \begin{cases} LR=LR+ABS\ (L-1m)*\alpha \\ CR=CR+ABS\ (C-1m)*\alpha \\ RR=RR+ABS\ (R-1m)*\alpha \end{cases}$$

$$\#23 \begin{cases} CR=CR+\max1\ ((L-C)-2m,\ 0)*\max1\ ((C-R)-2m,\ 0)*\beta \\ CR=CR+\max1\ ((R-C)-2m,\ 0)*\max1\ ((C-R)-2m,\ 0)*\beta \end{cases}$$

$$\#24 \begin{cases} IF\ (LR.\ EQ.\ \max1\ (LR,\ CR,\ RR))\ THEN\ OUT=L \\ IF\ (RR.\ EQ.\ \max1\ (LR,\ CR,\ RR))\ THEN\ OUT=R \\ IF\ (CR.\ EQ.\ \max1\ (LR,\ CR,\ RR))\ THEN\ OUT=C \end{cases}$$

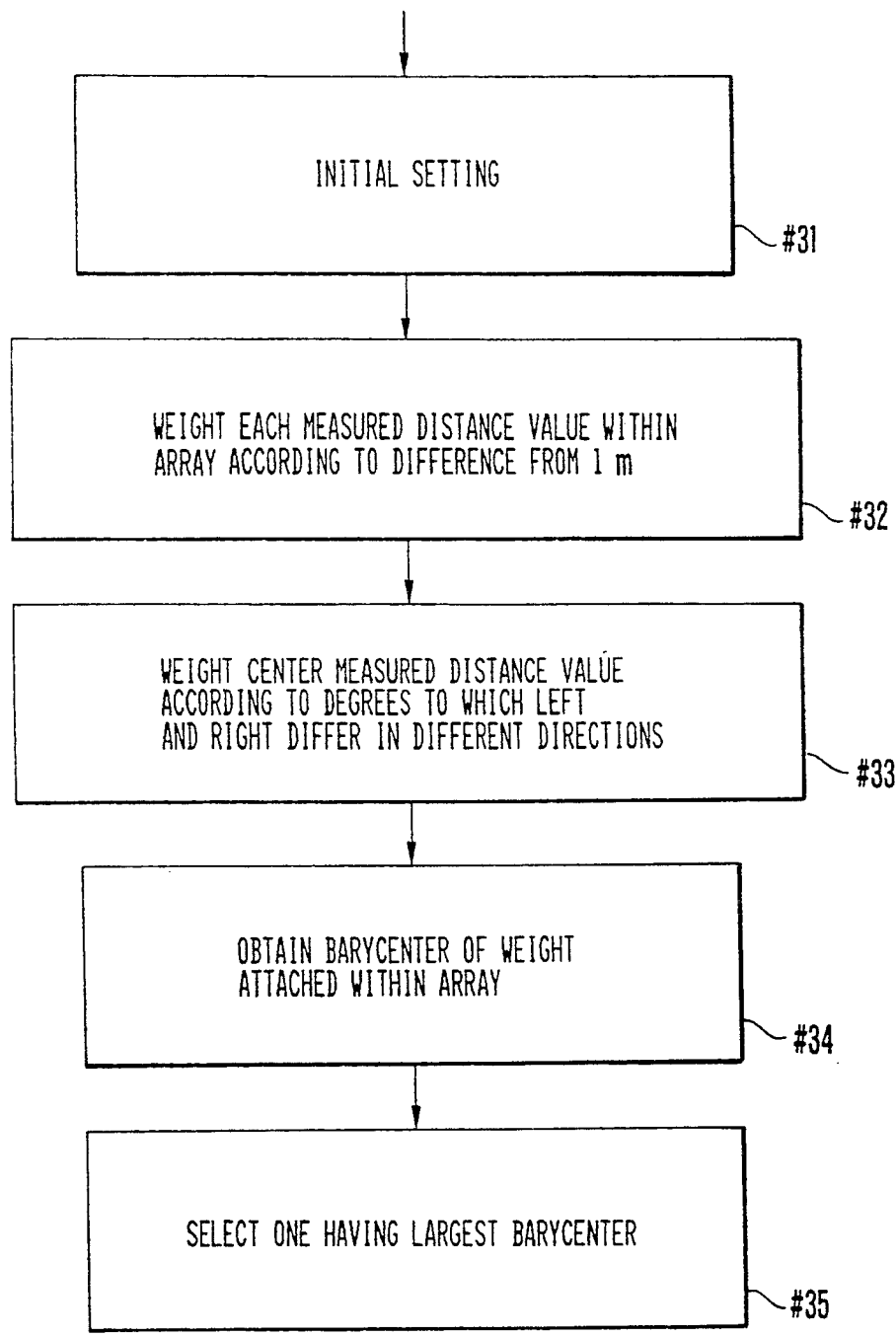

FIG.18

NOTE: "(" INDICATES THAT THE ACTION SHOWN INSIDE
"(" IS REPEATED TILL i=0-100

31 $\begin{cases} [LR\$(i) = 0 \\ [CR\$(i) = 0 \\ [RR\$(i) = 0 \end{cases}$

32 $\begin{cases} [LR(i) = LR(0\sim100) + ABS(L-1m)*\alpha\$(i) \\ [CR(i) = CR(0\sim100) + ABS(C-1m)*\alpha\$(i) \\ [RR(i) = RR(0\sim100) + ABS(R-1m)*\alpha\$(i) \end{cases}$

33 $\begin{cases} \begin{cases} CR(i) = CR(i) + \\ \quad max1((L-C)-2m, 0)*max1((C-R)-2m, 0) \\ \quad *\beta\$(i) \end{cases} \\ \begin{cases} CR(i) = CR(i) + \\ \quad max1((R-C)-2m, 0)*max1((C-L)-2m, 0) \\ \quad *\beta\$(i) \end{cases} \end{cases}$

34 $\begin{cases} LR = \dfrac{\sum_{i=0}^{100}(LR\$(i)*i)}{\sum_{i=0}^{100} LR\$(i)} \\[2em] CR = \dfrac{\sum_{i=0}^{100}(CR\$(i)*i)}{\sum_{i=0}^{100} CR\$(i)} \\[2em] RR = \dfrac{\sum_{i=0}^{100}(RR\$(i)*i)}{\sum_{i=0}^{100} RR\$(i)} \end{cases}$

35 $\begin{cases} IF\ (LR.EQ.max1\ (LR, CR, RR))\ THEN\ OUT=L \\ IF\ (RR.EQ.max1\ (LR, CR, RR))\ THEN\ OUT=R \\ IF\ (CR.EQ.max1\ (LR, CR, RR))\ THEN\ OUT=C \end{cases}$

FIG.21

41 
$$\begin{cases} \text{IF ( L IS "NEAR DISTANCE") THEN LR IS } \alpha \\ \text{IF ( C IS "NEAR DISTANCE") THEN CR IS } \alpha \\ \text{IF ( R IS "NEAR DISTANCE") THEN RR IS } \alpha \end{cases}$$

42
$$\begin{cases} \text{IF (((L-C) IS "POSITIVE AND LARGE") \&((R-C) IS} \\ \quad \text{"NEGATIVE AND LARGE"))THEN CR IS } \beta \\ \\ \text{IF (((R-C) IS "POSITIVE AND LARGE") \&((L-C) IS} \\ \quad \text{"NEGATIVE AND LARGE"))THEN CR IS } \beta \end{cases}$$

43 ( SELECT LARGEST ONE OF LR, CR AND RR (NORMALIZING CKT)

LENS DRIVING INFORMATION

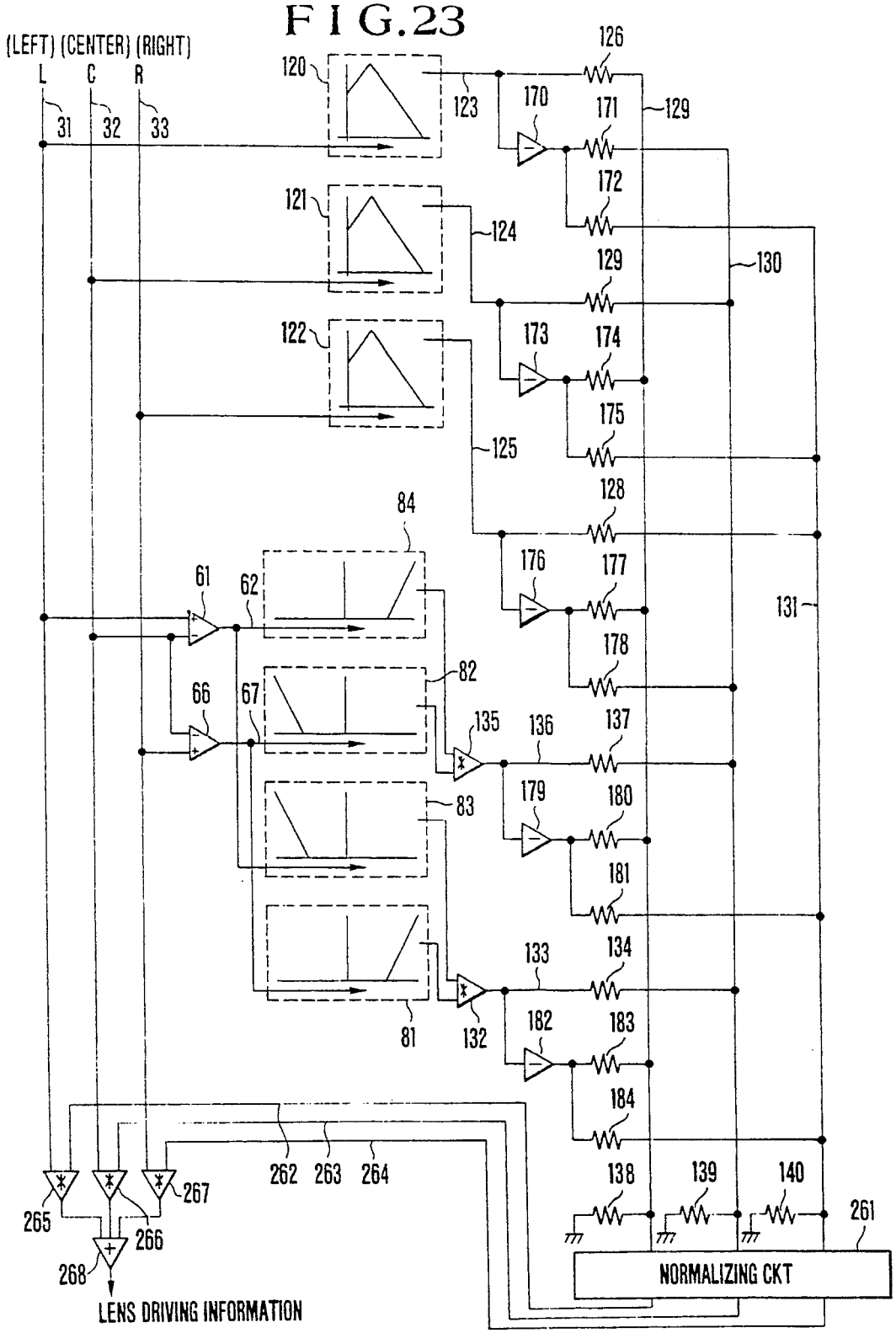

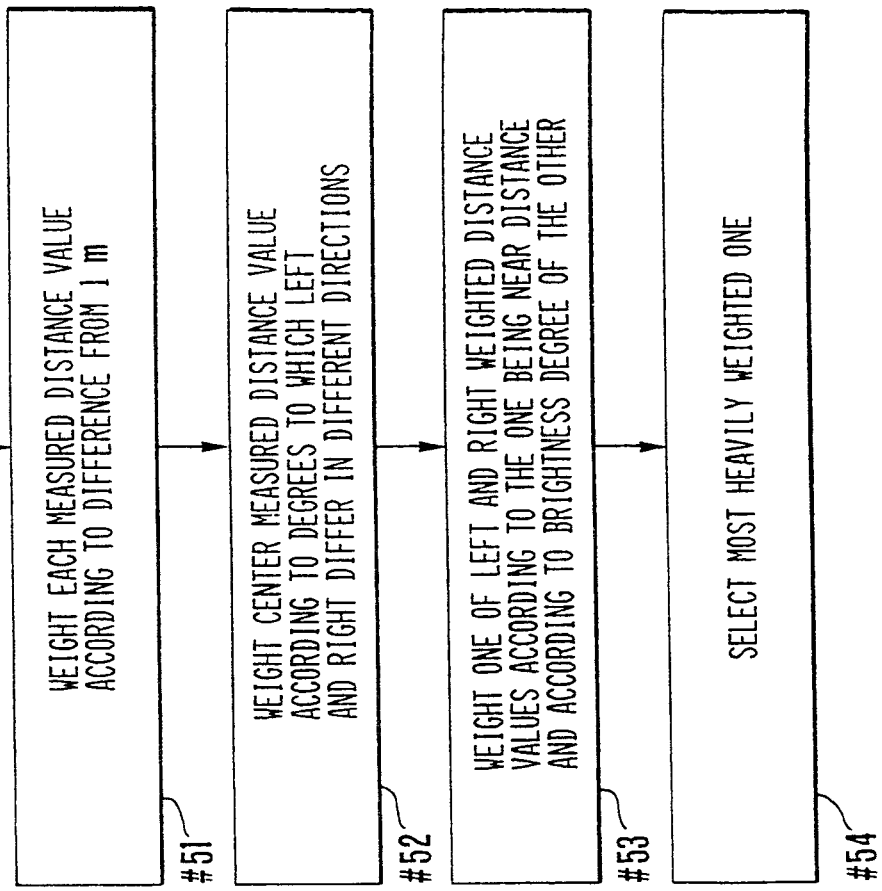
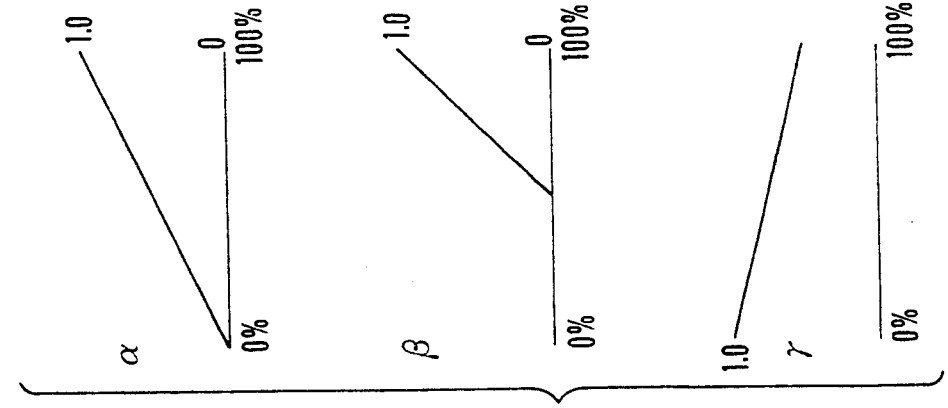

FIG.32

51
- IF ( L IS "NEAR DISTANCE") THEN LR IS α
- IF ( C IS "NEAR DISTANCE") THEN CR IS α
- IF ( R IS "NEAR DISTANCE") THEN RR IS α

52
- IF (((L−C) IS "POSITIVE AND LARGE") &((R−C) IS "NEGATIVE AND LARGE")) THEN CR IS β
- IF (((R−C) IS "POSITIVE AND LARGE") &((L−C) IS "NEGATIVE AND LARGE")) THEN CR IS β

53
- IF ( R IS "NEAR DISTANCE") & ("L IS BRIGHTER THAN AVERAGE BRIGHTNESS")) THEN RR IS γ
- IF ( L IS "NEAR DISTANCE") & ("R IS BRIGHTER THAN AVERAGE BRIGHTNESS")) THEN LR IS γ

54 (SELECT LARGEST ONE OF LR, CR AND RR

FIG.37

61
- IF ( L IS "NEAR DISTANCE") THEN LR IS α
- IF ( C IS "NEAR DISTANCE") THEN CR IS α
- IF ( R IS "NEAR DISTANCE") THEN RR IS α

62
- IF (((L-C) IS "POSITIVE AND LARGE") &((R-C) IS "NEGATIVE AND LARGE"))THEN CR IS β
- IF (((R-C) IS "POSITIVE AND LARGE") &((L-C) IS "NEGATIVE AND LARGE"))THEN CR IS β

63
- IF((R IS "NEAR DISTANCE") & (BUTTON 333 IS NOT PUSHED))THEN RR IS γ
- IF((L IS "NEAR DISTANCE") & (BUTTON 333 IS NOT PUSHED))THEN LR IS γ

64 (SELECT LARGEST ONE OF LR, CR AND RR)

FIG. 40

71 {
IF ( L IS "NEAR DISTANCE" ) THEN LR IS α
IF ( C IS "NEAR DISTANCE" ) THEN CR IS α
IF ( R IS "NEAR DISTANCE" ) THEN RR IS α
}

72 {
IF (((L−C) IS "POSITIVE AND LARGE" ) &
((R−C) IS "NEGATIVE AND LARGE"))THEN CR IS β
IF (((R−C) IS "POSITIVE AND LARGE" ) &
((L−C) IS "NEGATIVE AND LARGE"))THEN CR IS β
}

73 {
IF((R IS "NEAR DISTANCE") &(RIGHT SIDE ONE)
IS LOWER THAN LEFT SIDE ONE"))THEN RR IS γ
IF((L IS "NEAR DISTANCE") &(LEFT SIDE ONE
IS LOWER THAN RIGHT SIDE ONE"))THEN LR IS γ
}

74 (SELECT LARGEST ONE OF LR, CR AND RR

FIG.42

81
```
IF ( L IS "NEAR DISTANCE") THEN LR IS α
IF ( C IS "NEAR DISTANCE") THEN CR IS α
IF ( R IS "NEAR DISTANCE") THEN RR IS α
```

82
```
IF ((( L-C) IS "POSITIVE AND LARGE") &
    ((R-C) IS "NEGATIVE AND LARGE"))THEN CR IS β
IF ((( R-C) IS "POSITIVE AND LARGE") &
    ((L-C) IS "NEGATIVE AND LARGE"))THEN CR IS β
```

83
```
IF(( L IS "NEAR DISTANCE") &
   "FLASH DEVICE IS LIGHTED") THEN LR IS δ
IF((C IS "NEAR DISTANCE") &
   "FLASH DEVICE IS LIGHTED") THEN CR IS δ
IF((R IS "NEAR DISTANCE") &
   "FLASH DEVICE IS LIGHTED") THEN RR IS δ
```

84 (SELECT LARGEST ONE OF LR, CR AND RR

FIG.50

IF(((L-C) IS "POSITIVE AND LARGE") & ((R-C) IS "NEGATIVE AND LARGE"))THEN CR IS β

IF(((L-C) IS "POSITIVE AND LARGE") & ((R-C) IS "NEGATIVE AND LARGE"))&("FOCAL LENGTH" IS "LONG") & ("APERTURE" IS "ON FULL APERTURE SIDE"))THEN CR IS β

IF(((L-C) IS "POSITIVE AND EXTRA-LARGE") & ((R-C) IS "NEGATIVE AND EXTRA-LARGE"))&("FOCAL LENGTH" IS "SHORT") & ("APERTURE" IS "ON STOPPED-DOWN SIDE")) THEN CR IS β

IF((L IS "SHORT FOCAL LENGTH FREQUENCY") & ("FOCAL LENGTH" IS "SHORT"))THEN LR IS δ

IF((L IS "LONG FOCAL LENGTH FREQUENCY") & ("FOCAL LENGTH" IS "LONG"))THEN LR IS δ

IF((C IS "SHORT FOCAL LENGTH FREQUENCY") & ("FOCAL LENGTH" IS "SHORT"))THEN CR IS δ

IF((C IS "LONG FOCAL LENGTH FREQUENCY") & ("FOCAL LENGTH" IS "LONG"))THEN CR IS δ

IF((R IS "SHORT FOCAL LENGTH FREQUENCY") & ("FOCAL LENGTH" IS "SHORT"))THEN RR IS δ

IF((R IS "LONG FOCAL LENGTH FREQUENCY") & ("FOCAL LENGTH" IS "LONG"))THEN RR IS δ

101

FIG. 60
FUZZY-RULES

1. IF (C IS NEAR) THEN (POSSIBILITY OF C IS HIGH)
2. IF (L IS NEAR) AND (ANGLE OF VIEW IS WIDE) THEN (POSSIBILITY OF L IS HIGH)
3. IF (R IS NEAR) AND (ANGLE OF VIEW IS WIDE) THEN (POSSIBILITY OF R IS HIGH)
4. IF (L IS NEARER THAN C) AND (C IS MEDIUM) AND (C IS NEARER THAN R) AND (ANGLE OF VIEW IS NARROW) THEN (POSSIBILITY OF C IS VERY HIGH)
5. IF (R IS NEARER THAN C) AND (C IS MEDIUM) AND (C IS NEARER THAN L) AND (ANGLE OF VIEW IS NARROW) THEN (POSSIBILITY OF C IS VERY HIGH)
6. IF (L IS NEARLY EQUAL TO C) AND (L IS VERY NEAR) AND (C IS VERY NEAR) AND (R IS RELATIVELY FARTHER THAN L) AND (R IS RELATIVELY FARTHER THAN C) THEN (POSSIBILITY OF R IS LOW)
7. IF (R IS NEARLY EQUAL TO C) AND (R IS VERY NEAR) AND (C IS VERY NEAR) AND (L IS RELATIVELY FARTHER THAN R) AND (L IS RELATIVELY FARTHER THAN C) THEN (POSSIBILITY OF L IS LOW)
8. IF (L IS NEARLY EQUAL TO R) AND (L IS VERY NEAR) AND (R IS VERY NEAR) AND (C IS RELATIVELY FARTHER THAN L) AND (C IS RELATIVELY FARTHER THAN R) THEN (POSSIBILITY OF C IS VERY HIGH)
9. IF (L IS NEARLY EQUAL TO R) AND (L IS NEAR) AND (R IS NEAR) AND (C IS RELATIVELY FARTHER THAN L) AND (C IS RELATIVELY FARTHER THAN R) THEN (POSSIBILITY OF L IS VERY HIGH)
10. IF (L IS NEARLY EQUAL TO R) AND (L IS NEAR) AND (R IS NEAR) AND (C IS RELATIVELY FARTHER THAN L) AND (C IS RELATIVELY FARTHER THAN R) THEN (POSSIBILITY OF R IS VERY HIGH)

FIG.62
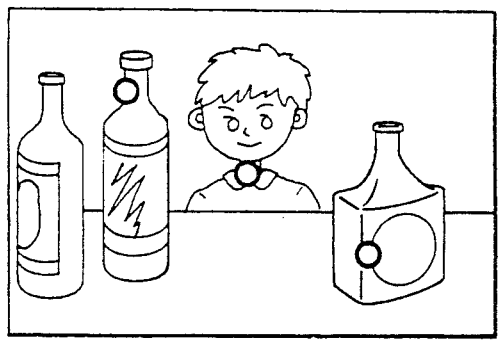
FIG.63(a) IF $x_1 = A_1$ THEN $u = C_1$
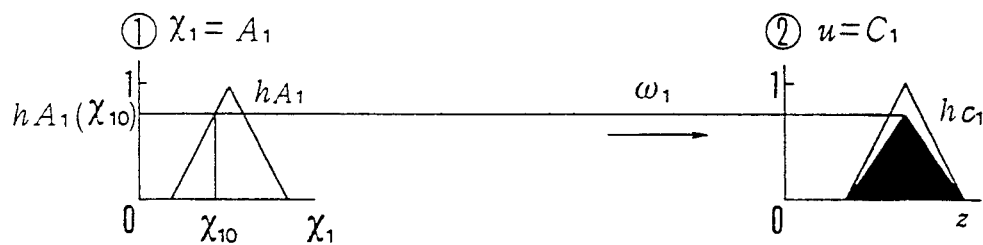
FIG.63(b) IF, $x_1 = A_2$, $x_2 = B_2$ THEN $u = C_2$
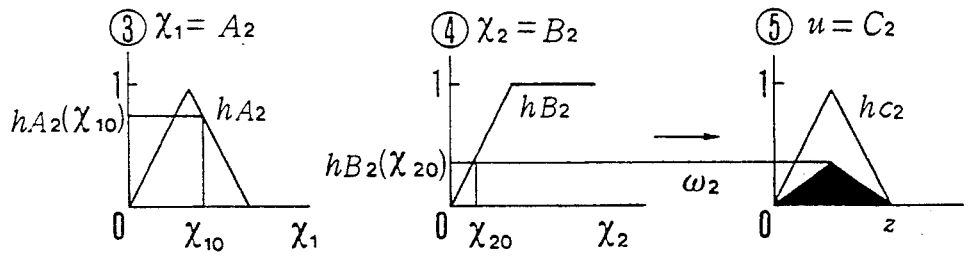
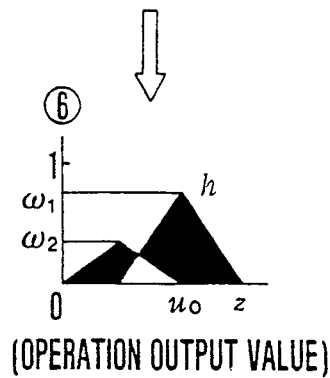
(OPERATION OUTPUT VALUE)

FIG.65

① W1 (x) : CENTER IS NEAR $$W1(x) = \begin{cases} 0 & (0 \leq x < 33) \\ 3 \cdot (x-33) & (33 \leq x < 118) \\ 3.5 \cdot (191-x) & (118 \leq x < 191) \\ 0 & (191 \leq x) \end{cases}$$

② W2 (x) : RIGHT IS NEAR $$W2(x) = \begin{cases} 0 & (0 \leq x < 33) \\ 3 \cdot (x-33) & (33 \leq x < 76) \\ 1.25 \cdot (179-x) & (76 \leq x < 179) \\ 0 & (179 \leq x) \end{cases}$$

③ W3 (x) : LEFT IS NEAR $$W3(x) = \begin{cases} 0 & (0 \leq x < 33) \\ 3 \cdot (x-33) & (33 \leq x < 88) \\ 1.75 \cdot (182-x) & (88 \leq x < 182) \\ 0 & (182 \leq x) \end{cases}$$

⑩ W10: ANGLE OF VIEW IS WIDE $$W10(x) = \begin{cases} 77 & \text{(HALF-SIZE)} \\ 255 & \text{(FULL-SIZE)} \end{cases}$$

⑪ POSSIBILITY IS HIGH $$P(W(x)) = 128 + W(X) \cdot 0.5$$

FIG.69

FUNCTION DETERMINED BY RELATION
BETWEEN TWO AF DATA (x, y)

$dx = x - y$

⑥ $W6(dx) : (x)$ IS NEARER THAN $(y)$ $$W6(dx) = \begin{cases} 0 & (dx < 0) \\ 9 \cdot dx & (0 \leq dx < 29) \\ 255 & (29 \leq dx <\ ) \end{cases}$$

⑤ $W5(x) : (x)$ IS MEDIUM $$W5(x) = \begin{cases} 0 & (0 \leq x < 38) \\ 9 \cdot (x-38) & (38 \leq x < 66) \\ 255 & (66 \leq x < 107) \\ 255 - 3 \cdot (x-107) & (107 \leq x < 192) \end{cases}$$

⑨ $W9$: ANGLE OF VIEW IS NARROW $$W9(x) = \begin{cases} 255 & \text{(HALF-SIZE)} \\ 128 & \text{(FULL-SIZE)} \end{cases}$$

⑬ POSSIBILITY IS VERY HIGH $$P(W(x)) = \begin{cases} W(x) \cdot 4 + 132 & (0 \leq x < 2) \\ W(x) \cdot 2 + 136 & (2 \leq x < 8) \\ W(x) + 144 & (8 \leq x < 32) \\ W(x) \cdot 1/2 + 160 & (32 \leq x < 80) \\ W(x) \cdot 3/8 + 170 & (80 \leq x < 176) \\ W(x) \cdot 1/4 + 192 & (176 \leq x < 255) \end{cases}$$

FIG.71

⑧ W8 (dx) : (x) IS NEARLY EQUAL TO (y)

$$W8(dx) = \begin{cases} 0 & (29 \leq |dx|) \\ 255 - 9 \cdot dx & (29 > |dx|) \end{cases}$$

④ W4 (x) : (x) IS VERY NEAR $$W4(x) = \begin{cases} 0 & (0 \leq x < 107) \\ 3 \cdot (x - 107) & (107 \leq x < 192) \end{cases}$$

⑦ W7 (dx) : (x) IS RELATIVELY FARTHER THAN (y)

$$W7(dx) = \begin{cases} 0 & (0 < dx) \\ -4.5 \cdot dx & (-56 < dx \leq 0) \\ 255 & (dx \leq -56) \end{cases}$$

⑫ POSSIBILITY IS LOW $$P(W(x)) = 128 - W(x) \cdot 0.5$$

FIG.73

```
IMPLICIT INTEGER (A-Z)
DIMENSION R(10)
COMMON SPPW, SPW
DATA     XLLMT, XULMT/0, 192/
READ (5) CX          "CENTER    ⎤
READ (5) RX          "RIGHT     ⎬ #1
READ (5) LX          "LEFT      ⎦
IF (CX .LT. XLLMT) THEN                    ⎤
     CX=XLLMT                              ⎥
   ELSE IF (CX .GT. XULMT) CX=XULMT        ⎥
   ENDIF                                   ⎥
IF (RX .LT. XLLMT) THEN                    ⎥
     RX=XLLMT                              ⎬ #2
   ELSE IF (RX .GT. XULMT) RX=XULMT        ⎥
   ENDIF                                   ⎥
IF (LX .LT. XLLMT) THEN                    ⎥
     LX=XLLMT                              ⎥
   ELSE IF (LX .GT. XULMT) LX=XULMT        ⎥
   ENDIF                                   ⎦
   SIZE=1            "FULL
```

FIG.74

```
C CENTER
    SPPW=0                                              ⎤ #3
    SPW=0                                               ⎦
C R-1
    P=MF1C (CX)         "C IS NEAR                      ⎤ #4
        PB=P                                            ⎦
    R (1) =HIGH (PB)    "HIGH
C R-4
    P=MF4 (LX, CX)                                      ⎤
        PB=P                                            ⎥
    P=MF3 (CX)          "C IS MID (->22)                ⎥
        P22=P                                           ⎥
        PB=MIN0 (PB, P)                                 ⎥ #5
    P=MF4 (CX, RX)      "C IS NEARER THAN R             ⎥
        PB=MIN0 (PB, P)                                 ⎥
    P=MF7 (SIZE)        "ANGLE IS NARROW                ⎥
        PB=MIN0 (PB, P)                                 ⎥
    R (4) =EXHIGH (PB)  "(EXT-)HIGH                     ⎦
C R-5
    P=MF4 (RX, CX)      "R IS NEARER THAN C             ⎤
        PB=P                                            ⎥
    P=P22               "C IS MID (<-22)                ⎥
        PB=MIN0 (PB, P)                                 ⎥
    P=MF4 (CX, LX)      "C IS NEARER THAN L             ⎥ #6
        PB=MIN0 (PB, P)                                 ⎥
    P=MF7 (SIZE)        "ANGLE IS NARROW                ⎥
        PB=MIN0 (PB, P)                                 ⎥
    R (5) =EXHIGH (PB)  "(EXT-)HIGH                     ⎦
C R-8
    P=MF6 (RX, LX)      "L & R IS NEARLY EQUAL (->22)   ⎤
        P22=P                                           ⎥
        PB=P                                            ⎥
    P=MF2 (LX)          "L IS EXT-NEAR (->24)           ⎥
        P24=P                                           ⎥
        PB=MIN0 (PB, P)                                 ⎥
    P=MF2 (RX)          "R IS EXT-NEAR (->26)           ⎥
        P26=P                                           ⎥
        PB=MIN0 (PB, P)                                 ⎥ #7
    P=MF5 (CX, LX)      "C IS RELATIVELY FAR FROM L (->28)⎥
        P28=P                                           ⎥
        PB=MIN0 (PB, P)                                 ⎥
    P=MF5 (CX, RX)      "C IS RELATIVELY FAR FROM R (->12)⎥
        P12=P                                           ⎥
        PB=MIN0 (PB, P)                                 ⎥
    R (8) =EXHIGH (PB)  "EXT-HIGH                       ⎦
    IF (SPW.GT. 0) THEN                                 ⎤
        PC=INT (SPPW/SPW)                               ⎥ #8
    ELSE                                                ⎥
        PC=0                                            ⎦
    ENDIF
```

FIG.75

```
C LEFT
      SPPW=0     ] #9
      SPW=0
C R-2
      P=MF1L (LX)         "L IS NEAR (->14)   ]
          P14=P                                |
          PB=P                                 | #10
      P=MF8 (SIZE)        "ANGLE IS WIDE      |
          PB=MIN0 (PB, P)                      |
      R (2) =HIGH (PB)    "HIGH               ]
C R-7
      P=MF6 (CX, RX)      "C & R IS NEARLY EQUAL    ]
          PB=P                                       |
      P=P26               "R IS EXT-NEAR (<-26)     |
          PB=MIN0 (PB, P)                            |
      P=MF2 (CX)          "C IS EXT-NEAR (->26)     |
          P26=P                                      | #11
          PB=MIN0 (PB, P)                            |
      P=MF5 (LX, RX)      "L IS RELATIVELY FAR FROM R|
          PB=MIN0 (PB, P)                            |
      P=MF5 (LX, CX)      "L IS RELATIVELY FAR FROM C|
          PB=MIN0 (PB, P)                            |
      R (7) =LOW (PB)     "LOW                      ]
C R-9
      PB=P22              "L & R IS NEARLY EQUAL (<-22)  ]
      P=P14               "L IS NEAR (<-14)              |
          PB=MIN0 (PB, P)                                 |
      P=MF1R (RX)         "R IS NEAR (->14)              |
          P14=P                                           |
          PB=MIN0 (PB, P)                                 | #12
      P=P28               "C IS RELATIVELY FAR FROM L (<-28)|
          PB=MIN0 (PB, P)                                 |
      P=P12               "C IS RELATIVELY FAR FROM R (<-12)|
          PB=MIN0 (PB, P)                                 |
          P18=PB          "SAVE RESULTS OF R-9 (->18)    ]
      R (9) =EXHIGH (PB)  "EXT-HIGH
      IF (SPW.GT. 0) THEN                ]
          PL=INT (SPPW/SPW)               |
      ELSE                                | #13
          PL=0                            |
      ENDIF                              ]
```

FIG.76

```
C RIGHT
        SPPW=0          ] #14
        SPW=0
C R-3
        PB=P14              "R IS NEAR (<-14)
        P=MF8 (SIZE)        "ANGLE IS WIDE       ] #15
                PB=MINO (PB, P)
        R (3) =HIGH (PB)    "HIGH
C R-6
        P=MF6 (CX, LX)      "C IS NEARLY EQUAL TO L
                PB=P
        P=P26               "C IS EXT-NEAR (<-26)
                PB=MINO (PB, P)                         ] #16
        P=MF5 (RX, LX)      "R IS RELATIVELY FAR FROM L
                PB=MINO (PB, P)
        P=MF5 (RX, CX)      "R IS RELATIVELY FAR FROM C
                PB=MINO (PB, P)
        R (6) =LOW (PB)     "LOW
C R-10
        PB=P18              "COPY OF R-9 (<=18)  ] #17
        R (10) =EXHIGH (PB)            "EXT-HIGH
        IF (SPW .GT. 0) THEN
                PR=INT (SPPW/SPW)
            ELSE                                ] #18
                PR=0
        ENDIF

C SELECT-VALUE
        IF (PC .GE. PR) THEN
            IF (PC .GE. PL) THEN
                        SX=CX
                ELSE
                        SX=LX
            ENDIF                               ] #19
        ELSE IF (PR .GT. PL) THEN
                        SX=RX
                ELSE
                        SX=LX
        ENDIF
C
        WRITE (6) CX, RX, LX
        WRITE (6) SX, PC, PR, PL
        WRITE (6) R                             ] #20
C
        STOP
        END
```

FIG.77

```
C
            INTEGER FUNCTION MF1C (X)
C MF1C =  CENTER IS NEAR
            IMPLICIT INTEGER (A-Z)
            IF (X .LT. 33) THEN
                MF1C=0
              ELSE IF (X .LT. 118) THEN
                    MF1C=3*(X-33)
                  ELSE IF (X .LT. 191) THEN
                        MF1C=INT (3.5 *FLOAT(191-X))
                      ELSE
                        MF1C=0
                      ENDIF
            RETURN
            END
C
            INTEGER FUNCTION MF1R (X)
C MF1R =  RIGHT IS NEAR
            IMPLICIT INTEGER (A-Z)
            IF (X .LT. 33) THEN
                MF1R=0
              ELSE IF (X .LT. 76) THEN
                    MF1R=3*(X-33)
                  ELSE IF (X .LT. 179) THEN
                        MF1R=INT (1.25*FLOAT(179-X))
                      ELSE
                        MF1R=0
                      ENDIF
            RETURN
            END
C
            INTEGER FUNCTION MF1L (X)
C MF1R =  LEFT IS NEAR
            IMPLICIT INTEGER (A-Z)
            IF (X .LT. 33) THEN
                MF1L=0
              ELSE IF (X .LT. 88) THEN
                    MF1L=3*(X-33)
                  ELSE IF (X .LT. 182) THEN
                        MF1L=INT (1.75*FLOAT(182-X))
                      ELSE
                        MF1L=0
                      ENDIF
            RETURN
            END
```

FIG.78

```
C
          INTEGER FUNCTION MF2 (X)
C MF2 = X IS EXTRA-NEAR
          IMPLICIT INTEGER (A-Z)
          IF (X .LT. 107) THEN
                MF2=0
              ELSE IF (X .LT. 192) THEN
                      MF2=3*(X-107)
                    ELSE
                            MF2=255
                    ENDIF
          RETURN
          END
C
          INTEGER FUNCTION MF3 (X)
C MF3 = X IS MID
          IMPLICIT INTEGER (A-Z)
          IF (X .LT. 38) THEN
                MF3=0
              ELSE IF (X .LT. 66) THEN
                      MF3=9*(X-38)
                    ELSE IF (X .LT. 107) THEN
                            MF3=255
                          ELSE IF (X .LT. 192) THEN
                                  MF3=255-3*(X-107)
                                ELSE
                                        MF3=0
                                ENDIF
          RETURN
          END
C
          INTEGER FUNCTION MF4 (X, Y)
C MF4 = X IS NEARER THAN Y
          IMPLICIT INTEGER (A-Z)
          DX=X-Y
          IF (DX .LT. 0) THEN
                MF4=0
              ELSE IF (DX .LT. 29) THEN
                      MF4=9*DX
                    ELSE
                            MF4=255
                    ENDIF
          RETURN
          END
```

FIG.79

```
C
              INTEGER FUNCTION MF5 (X, Y)
C MF5 =  X IS RELATIVELY FAR FROM Y
              IMPLICIT INTEGER (A-Z)
              DX=X-Y
              IF (DX .GE. 0) THEN
                     MF5=0
                     ELSE IF (-56 .LT. DX. ) THEN
                                  MF5=INT (-4.5*FLOAT (DX))
                            ELSE
                                  MF5=255
                            ENDIF
              RETURN
              END
C
              INTEGER FUNCTION MF6 (X, Y)
C MF6 =  X IS NEARLY-EQUAL TO Y
              IMPLICIT INTEGER (A-Z)
              DX=IABS (X-Y)
              IF (29 .LE. DX) THEN
                     MF6=0
                     ELSE
                           MF6=255-9*DX
                     ENDIF
              RETURN
              END
C
              INTEGER FUNCTION MF7 (SIZE)
C MF7 =  VIEW ANGLE IS NARROW
              IMPLICIT INTEGER (A-Z)
              IF (SIZE .LT. 1) THEN
                     MF7=255
                     ELSE
                           MF7=128
                     ENDIF
              RETURN
              END
C
              INTEGER FUNCTION MF8 (SIZE)
C MF8 =  VIEW ANGLE IS WIDE
              IMPLICIT INTEGER (A-Z)
              IF (SIZE .LT. 1) THEN
                     MF8=77
                     ELSE
                           MF8=255
                     ENDIF
              RETURN
              END
```

FIG.80

```
C
            INTEGER FUNCTION HIGH (PB)
C P-HIGH
            IMPLICIT INTEGER (A-Z)
            COMMON SPPW, SPW
            W=PB
            PW=128+INT (FLOAT (W) *0.5)
            SPPW=SPPW+ (PW*W)
            SPW=SPW+W
                    HIGH=PW
            RETURN
            END
C
            INTEGER FUNCTION LOW (PB)
C P-LOW
            IMPLICIT INTEGER (A-Z)
            COMMON SPPW, SPW
            W=PB
            PW=128-INT (FLOAT (W) *0.5)
            SPPW=SPPW+ (PW*W)
            SPW=SPW+W
                    LOW=PW
            RETURN
            END
C
            INTEGER FUNCTION EXHIGH (PB)
C P-HIGH-X
            IMPLICIT INTEGER (A-Z)
            COMMON SPPW, SPW
            W=PB
            IF (W .LT. 2) THEN
                PW=W*4+132
              ELSE IF (W .LT. 8) THEN
                    PW=W*2+136
                ELSE IF (W .LT. 32) THEN
                      PW=W+144
                  ELSE IF (W .LT. 80) THEN
                        PW=INT (FLOAT (W) * .5) +160
                    ELSE IF (W .LT. 176) THEN
                          PW=INT (FLOAT (W) * .375) +170
                      ELSE
                          PW=INT (FLOAT (W) * .25) +192
                      ENDIF
            SPPW=SPPW+ (PW*W)
            SPW=SPW+W
                    EXHIGH=PW
            RETURN
            END
```

FIG. 81

MS-DOS  TLCS-47 ASSEMBLER V4.5

```
LOC    OBJECT    LINE   SOURCE STATEMENT

5410   ;------< AF-Fuzzy Algorithm >------
                 5411   ;
1427  223F       5412   M3AFB:  CALL   RAMCAF
                 5413   ;
                 5414   ;------ evaluate CENTER probability ------
                 5415   ;                                          ;****** [ Rule 1 ] ******
1429  C6E0       5416           LD     HL,#AFCNTL                 ;<<if CENTER is NEAR>>
142B  27A4       5417           CALL   MEMB1C                     ;      (RG21)(RG20)<=W1(c)
142D  21F6       5418           CALL   RAMTR2
142F  27C5       5419           CALL   PHIGH                      ;<<then PROBABILITY of CENTER is HIGH>>
                 5420   ;                                          ;(Yi<=Yj+Yi) ( Si<=Si + Yi*Wi ) i=j+1
                 5421   ;                                          ;****** [ Rule 4 ] ******
1431  C6E0       5422           LD     HL,#AFCNTL
1433  21D3       5423           CALL   RAMTR0
1435  C6E4       5424           LD     HL,#AFLFTL                 ;<<if LEFT is nearer than CENTER>>
1437  27B3       5425           CALL   MEMBR4                     ;      min(RG21)(RG20)<=W4(L-C)
1439  21F6       5426           CALL   RAMTR2
143B  C6E0       5427           LD     HL,#AFCNTL
143D  27B0       5428           CALL   MEMBR3                     ;and <<if CENTER is MEDIUM>>
```

FIG.82(a)

MS-DOS  TLCS-47 ASSEMBLER V4.5

LOC   OBJECT      LINE  SOURCE STATEMENT

ROM PAGE NO.81*

```
143F C2E2         5429        LD    HL,#RG22     ;          (RG23)(RG22)<=W3(C)
1441 21E0         5430        CALL  RAMTRX
1443 21EB         5431        CALL  MINMUM
1445 C6E2         5432        LD    HL,#AFRGTL   ;(RG21)(RG20) <= min[W4(L-C),w3(C)]
1447 21D3         5433        CALL  RAMTR0
1449 C6E0         5434        LD    HL,#AFCNTL
144B 27B3         5435        CALL  MEMBR4       ;and <<if CENTER is nearer than RIGHT>>
144D 21EB         5436        CALL  MINMUM       ;(RG21)(RG20)<=inf(W4(L-C),W3(C),W4(C-R))
144F 27BF         5437        CALL  MEMBR7       ;and <<if view angle is NARROW>>
1451 21EB         5438        CALL  MINMUM       ;(RG21)(RG20)<=inf(W4(L-C),W3(C),W4(C-R),W7(F/H))
1453 27CB         5439        CALL  PHIGHX       ;<<then PROBABILITY of CENTER is EXTRA-HIGH>>
                  5440                           ;( Yi<=Yj+Yi ) ( Si<=Si + Yi*Wi ) i=j+1
                  5441
                  5442                           ;****** [ Rule 5 ] ******
1455 C6E0         5443        LD    HL,#AFCNTL
1457 21D3         5444        CALL  RAMTR0       ;<<if RIGHT is nearer than CENTER>>
1459 C6E2         5445        LD    HL,#AFRGTL   ;    min(RG21)(RG20)(RG20)<=W4(R-C)
145B 27B3         5446        CALL  MEMBR4       ;and <<if CENTER is MEDIUM>>
145D 21F6         5447        CALL  RAMTR2       ;(RG21)(RG20)<=inf(W4(R-C),W3(C))
145F C2E2         5448        LD    HL,#RG22
1461 21EB         5449        CALL  MINMUM
1463 C6E4         5450        LD    HL,#AFLFTL
1465 21D3         5451        CALL  RAMTR0
1467 C6E0         5452        LD    HL,#AFCNTL   ;and <<if CENTER is nearer than LEFT>>
1469 27B3         5453        CALL  MEMBR4       ;(RG21)(RG20)<=inf(W4(R-C),W3(C),W4(C-L))
146B 21EB                     CALL  MINMUM
```

FIG. 82(b)

```
        146D  27BF        CALL  MEMBR7      ;and <<if view angle is NARROW>>
        146F  21EB        CALL  MINMUM      ;(RG21)(RG20)<=inf(W4(R-C),W3(C),W4(C-L),W7(F/H))
        1471  27CB        CALL  PHIGHX      ;<<then PROBABILITY of CENTER is EXTRA-HIGH>>
                                            ;( Yi<=Yj+Yi ) ( Si<=Si + Yi*Wi )  i=j+1
                          ;..
        1473  C6E2        LD    HL,#AFRGTL
        1475  21D3        CALL  RAMTR0      ;****** [ Rule 8 ] ******
        1477  C6E4        LD    HL,#AFLFTL
        1479  27BC        CALL  MEMBR6      ;<<if (R,L) is nearly equal>>
        147B  21F6        CALL  RAMTR2      ;       min(RG21)(RG20)<=W6(R,L)
        147D  C2E2        LD    HL,#RG22    ;       (RG23)(RG22)<=W6(R,L)

ROM PAGE NO.82*

147F  21E0        CALL  RAMTRX
        1481  C6E4        LD    HL,#AFLFTL
        1483  27AD        CALL  MEMBR2      ;and <<if LEFT is EXTRA-NEAR>>
        1485  C2E4        LD    HL,#RG24    ;    (RG25)(RG24)<=W2(L)
        1487  21E0        CALL  RAMTRX
        1489  21EB        CALL  MINMUM      ;(RG21)(RG20)<=inf(W6(R,L),W2(L))
        148B  C6E2        LD    HL,#AFRGTL
        148D  27AD        CALL  MEMBR2      ;and <<if RIGHT is EXTRA-NEAR>>
        148F  C2E6        LD    HL,#RG26    ;    (RG27)(RG26)<=W2(R)
        1491  21E0        CALL  RAMTRX
        1493  21EB        CALL  MINMUM      ;(RG21)(RG20)<=inf(W6(R,L),W2(L),W2(R))
        1495  C6E0        LD    HL,#AFCNTL
        1497  21D3        CALL  RAMTR0
        1499  C6E4        LD    HL,#AFLFTL
        149B  27B9        CALL  MEMBR5      ;and <<if CENTER is relatively far to LEFT>>
        149D  C2E8        LD    HL,#RG28    ;    (RG29)(RG28)<=W5(C,L)
        149F  21E0        CALL  RAMTRX
```

FIG.83(a)

```
MS-DOS   TLCS-47 ASSEMBLER V4.5

LOC    OBJECT     LINE  SOURCE STATEMENT

14A1   21EB       5482        CALL   MINMUM            ;(RG21)(RG20)<=inf(W6(R,L),W2(L),W2(R),W5(C,L))
14A3   C6E0       5483        LD     HL,#AFCNTL
14A5   21D3       5484        CALL   RAMTR0
14A7   C6E2       5485        LD     HL,#AFRGTL
14A9   27B9       5486        CALL   MEMBR5            ;and <<if CENTER is relatively far to RIGHT>>
14AB   C1E2       5487        LD     HL,#RG12          ;             (RG13)(RG12)<=W5(C,R)
14AD   21E0       5488        CALL   RAMTRX            ;
14AF   21EB       5489        CALL   MINMUM            ;inf(W6(R,L),W2(L),W2(R),W5(C,L),W5(C,R))
14B1   27CB       5490        CALL   PHIGHX            ;<<then PROBABILITY of CENTER is EXTRA-HIGH>>
                  5491                                 ;( Yi<=Yj+Yi ) ( Si<=Si + Yi*Wi ) i=j+1
                  5492        ;
14B3   216E       5493        CALL   DV20S             ;<<20bit/12bit division>>
14B5   C7E0       5494        LD     HL,#PCENTR        ;(RESULTS)=(PG01)(PG00) = Si/Yi
14B7   21E0       5495        CALL   RAMTRX            ;CENTER DATA store
                  5496        ;
                  5497        ;
14B9   223F       5498        CALL   RAMCAF
                  5499        ;----- evaluate LEFT probability -----
                  5500        ;
                  5501        ;******* [ Rule 2 ] ******
14BB   C6E4       5502        LD     HL,#AFLFTL        ;<<if LEFT is NEAR>>
14BD   27AA       5503        CALL   MEMB1L

ROM PAGE NO.83*

14BF   21F6       5504        CALL   RAMTR2                        (RG21)(RG20)<=W1(L)
14C1   C1E4       5505        LD     HL,#RG14                      (RG15)(RG14)<=W1(L)
```

FIG. 83(b)

```
14C3  21E0            CALL  RAMTRX     ;and <<if view angle is WIDE>>
14C5  27C2            CALL  MEMBR8     ;(RG21)(RG20)<=inf(W1(L),W8(F/H))
14C7  21EB            CALL  MINMUM     ;<<then PROBABILITY of LEFT is HIGH>>
14C9  27C5            CALL  PHIGH      ;( Yi<=Yj+Yi ) ( Si<=Si + Yi*Wi ) i=j+1
                      ..
                      ..
                                       ;****** [ Rule 7 ) ******
14CB  C6E0            LD    LH,#AFCNTL
14CD  21D3            CALL  RAMTR0
14CF  C6E2            LD    HL,#AFRGTL  ;<<if (C,R) is nearly equal>>
14D1  27BC            CALL  MEMBR6      ;       (RG21)(RG20)<=W6(C,R)
14D3  21F6            CALL  RAMTR2     ;and <<if RIGHT is EXTRA-NEAR>>
14D5  C2E6            LD    HL,#RG26    ;       inf(W6(C,R),W2(R))
14D7  21EB            CALL  MINMUM
14D9  C6E0            LD    HL,#AFCNTL ;and <<if CENTER is EXTRA-NEAR>>
14DB  27AD            CALL  MEMBR2      ;       (RG27)(RG26)<=W2(C)
14DD  C2E6            LD    HL,#RG26   ;inf(W6(C,R),W2(R),W2(C))
14DF  21E0            CALL  RAMTRX
14E1  21EB            CALL  MINMUM
14E3  C6E4            LD    HL,#AFLFTL ;and <<if LEFT is relatively far to RIGHT>>
14E5  21D3            CALL  RAMTR0     ;inf(W6(C,R),W2(R),W2(C),W5(L,R))
14E7  C6E2            LD    HL,#AFRGTL
14E9  27B9            CALL  MEMBR5
14EB  21EB            CALL  MINMUM
14ED  C6E4            LD    HL,#AFLFTL ;and <<if LEFT is relatively far to CENTER>>
14EF  21D3            CALL  RAMTR0     ;inf(W6(C,R),W2(R),W2(C),W5(L,R),W5(L,C))
14F1  C6E0            LD    HL,#AFCNTL ;<<then PROBABILITY of LEFT is LOW>>
14F3  27B9            CALL  MEMBR5     ;( Yi=Tj+Yi ) ( Si<=Si + Yi*Wi ) i=j+1
14F5  21EB            CALL  MINMUM
14F7  27C8            CALL  PLOW
                      ..
                      ..
```

FIG. 84(a)

```
MS-DOS  TLCS-47 ASSEMBLER V4.5

LOC   OBJECT    LINE  SOURCE STATEMENT

14F9  C2E2      5537        LD    HL,#RG22        ;****** [ Rule 9 ] ******
14FB  21D3      5338        CALL  RAMTR0          ;<<if (L,R) is nearly equal>>
14FD  21F6      5539        CALL  RAMTR2          ;       (RG21)(RG20)<=(RG23)(RG22)=W6(L,R)

ROM PAGE NO.84*

14FF  C1E4      5540        LD    HL,#RG14        ;and <<if LEFT is NEAR>>
1501  21EB      5541        CALL  MINMUM          ;            inf(W6(C,R),W1(L))
1503  C6E2      5542        LD    HL,#AFRGTL
1505  27A7      5543        CALL  MEMB1R          ;and <<if RIGHT is NEAR>>
1507  C1E4      5544        LD    HL,#RG14
1509  21E0      5545        CALL  RAMTRX          ;         (RG15)(RG14)<=W1(R)
150B  21EB      5546        CALL  MINMUM          ;and <<if CENTER is relatively far to LEFT>>
150D  C2E8      5547        LD    HL,#RG28        ;inf(W6(C,R),W1(R),W1(L),W5(C,L))
150F  21EB      5548        CALL  MINMUM          ;and <<if CENTER is relatively far to RIGHT>>
1511  C1E2      5549        LD    HL,#RG12        ;inf(W6(C,R),W1(L),W1(R),W5(C,L),W5(C,R))
1513  21EB      5550        CALL  MINMUM          ;STORE RESULTS of [Rule 9]
1515  2820      5551        LD    HL,RG20         ;<<then PROBABILITY of LEFT is EXTRA-HIGH>>
1517  2918      5552        XCH   HL,RG18         ;( Yi<=Yj+Yi ) ( Si<=Si + Yi*Wi ) i=j+1
1519  27CB      5553        CALL  PHIGHX
                5554        ;
                5555        ;
151B  216E      5556        CALL  DV20S           ;<<20bit/12bit division>>
151D  C7E4      5557        LD    HL,#PLEFT       ;(RESULTS)=(PG01)(PG00) = Si/Yi
151F  21E0      5558        CALL  RAMTRX          ;LEFT DATA store
                5559        ;
                5560        ;
1521  223F      5561        CALL  RAMCAF
                5562        ;
```

FIG.84(b)

```
                ;----- evaluate RIGHT probability -----
5563
5564            ;****** [ Rule 3 ] ******
5565 1523 C1E4      LD    HL,#RG14      ;<<if RIGHT is NEAR>>
5566 1525 21D3      CALL  RAMTR0        ;    (RG21)(RG20)<=W1(R)
5567 1527 21F6      CALL  RAMTR2
5568 1529 27C2      CALL  MEMBR8        ;and <<if view angle is WIDE>>
5569 152B 21EB      CALL  MINMUM        ;inf(W1(R),W8(F/H))
5570 152D 27C5      CALL  PHIGH         ;<<then PROBABILITY of RIGHT is HIGH>>
5571            ;    ( Yi<=Yj+Yi ) ( Si<=Si + Yi*Wi ) i=j+1
5572
5573            ;****** [ Rule 6 ] ******
5574 152F C6E0      LD    HL,#AFCNTL    ;<<if (C,L) is nearly equal>>
5575 1531 21D3      CALL  RAMTR0        ;    (RG21)(RG20)<=W6(C,R)
5576 1533 C6E4      LD    HL,#AFLFTL
5577 1535 27BC      CALL  MEMBR6
5578 1537 21F6      CALL  RAMTR2        ;and <<if LEFT is EXTRA-NEAR>>
5579 1539 C2E4      LD    HL,#RG24      ;inf(W6(C,R),W2(L))
5580 153B 21EB      CALL  MINMUM
         153D C2E6      LD    HL,#RG26      ;and <<if CENTER is EXTRA-NEAR>>

ROM PAGE NO.85*

5581            :                        inf(W6(C,L),W2(L),W2(C))
5582 153F 21EB      CALL  MINMUM
5583 1541 C6E2      LD    HL,#AFRGTL
5584 1543 21D3      CALL  RAMTR0
5585 1545 C6E4      LD    HL,#AFLFTL
5586 1547 27B9      CALL  MEMBR5        ;and <<if RIGHT is relatively far to LEFT>>
5587 1549 21EB      CALL  MINMUM        ;inf(W6(C,R),W2(R),W2(C),W5(R,L))
5588 154B C6E2      LD    HL,#AFRGTL
     154D 21D3      CALL  RAMTR0
```

FIG. 85(a)

```
MS-DOS   TLCS-47 ASSEMBLER V4.5

LOC    OBJECT    LINE  SOURCE STATEMENT

5589        LD     HL,#AFCNTL
154F   C6E0      5590        CALL   MEMBR5          ;and <<if RIGHT is relatively far to CENTER>>
1551   27B9      5591        CALL   MINMUM          ;inf(W6(C,R),W2(R),W2(C),W5(R,L),W5(R,C))
1553   21EB      5592        CALL   PLOW            ;<<then PROBABILITY of RIGHT is LOW>>
1555   27C8      5593        ;                      ;( Yi<=Yj+Yi ) ( Si<=Si + Yi*Wi ) i=j+1
                 5594        ;
                 5595        LD     HL,RG18         ;****** [ Rule 10 ] ******
1557   2818      5596        XCH    HL,RG20         ;using the results of [Rule 9]
1559   2920      5597        CALL   PHIGHX          ;<<then PROBABILITY of RIGHT is EXTRA-HIGH>>
155B   27CB      5598        ;                      ;( Yi<=Yj+Yi ) ( Si<=Si + Yi*Wi ) i=j+1
                 5599        ;
                 5600        CALL   DV20S           ;<<20bit/12bit division>>
155D   216E      5601        LD     HL,#PRIGHT      ;(RESULTS)=(PG01)(PG00) = Si/Yi
155F   C7E2      5602        CALL   RAMTRX          ;RIGHT DATA store
1561   21E0      5603        ;
                 5604        ;
                 5605        ;U=(P(C),P(R),P(L))
                 5606        ;P(C)=CENTER / P(R)=RIGHT / P(L)=LEFT
                 5607        ;
1563   E0        5608        LD     L,#PCENTR
1564   21C5      5609        CALL   DTCMPR          ;P(C) >= P(R)?
1566   06B1      5610        BNC    M3AFP           ;      (NO) ->sup[ U ]= P(R) or P(L)
```

FIG. 85(b)

```
1568 E4        LD    L,#PLEFT         ;             (YES)->sup[ U ]= P(C) or P(L)
1569 21D3      CALL  RAMTR0
156B E0        LD    L,#PCENTR
156C 21C5      CALL  DTCMPR           ;P(C) >= P(L)?
156E 06B6      BNC   M3AF2            ;            (NO) ->P(L)>P(C)>P(R)
1570 BA        B     M3AF0            ;            (YES)->P(C)>P(R),P(L)
1571 E4        LD    L,#PLEFT
1572 21C5 M3AFP: CALL DTCMPR          ;P(L) >= P(R)?
1574 06BE      BNC   M3AF1            ;            (NO) ->P(R)>P(C),P(L)
                                       ;            (YES)->P(L)>P(R)>P(C)
1576 C6E4 M3AF2: LD   HL,#AFLFTL      ;sup[ U ]=P(L)
1578 6580      B     M3AFEN
157A C6E0 M3AF0: LD   HL,#AFCNTL      ;sup[ U ]=P(C)
157C 6580      B     M3AFEN
157E C6E2 M3AF1: LD   HL,#AFRGTL      ;sup[ U ]=P(R)

ROM PAGE NO. 86

1580 21D3 ;M3AFEN: CALL RAMTR0        ;(PG01)(PG00) <= sup[ U ]
1582 E6        LD    L,#(AFCOUL)
1583 21E0      CALL  RAMTRX           ;(AFCOUH)(AFCOUL) <= sup[ U ]
```

FOCUS ADJUSTMENT INFORMATION FORMING DEVICE

This is a continuation under 37 CFR 1.62 of prior application Ser. No. 344,260, filed Apr. 27, 1989, now abandoned.

BACKGROUND OF THE INVENTION

1. Field of the Invention

This invention relates to an improvement on a focus adjustment information forming device arranged to measure distances to objects appearing at a plurality of distance measuring points (or areas) set within a picture plane such as a photo-taking picture plane or the like specified by optical means which is used for an optical system such as a camera and to be focus adjusted.

2. Description of the Related Art

The devices of the above-stated kind has been known as wide-field distance measuring devices, which have been disclosed, for example, in Japanese Laid-Open Patent Application No. SHO 58-201015 and U.S. Pat. No. 4,470,681. After these disclosures, devices arranged to prevent a distance measurement error due to a foreground has been disclosed in Japanese Laid-Open Patent Applications No. SHO 59-193307 and No. SHO 60-172008. In addition to these known devices, a device arranged to exclude any object located nearer than a given distance as an obstacle has been proposed in U.S. patent application Ser. No. 184,931, etc.

However, these known wide-field distance measuring devices have been incapable of accurately discriminating a nearby object from a nearby obstacle such as the ground and thus have often failed to give accurate focus adjustment information.

SUMMARY OF THE INVENTION

Such being the background situation, a principal object of the present invention is to provide a focus adjustment information forming device which is capable of forming reliable focus adjustment information by accurately discriminating the measured distance value of an object to be focused on by optical means from other measured distance values obtained by a plurality of distance measuring areas including one located approximately in the central part of a picture plane.

To attain this object, a focus adjustment information forming device arranged according to this invention to measure distances to objects appearing at a plurality of distance measuring areas of a picture plane specified by optical means which has its focal point being adjusted and to form information on adjustment of the focal point of the optical means, the plurality of distance measuring areas including a substantially central distance measuring area located approximately in the center of the picture plane, comprises: first priority means for giving priority to a measured distance value which represents the nearest distance among measured distance values obtained from the plurality of distance measuring areas; a second priority means for giving priority to the measured distance value obtained from the substantially central distance measuring area according to relations thereof to measured distance values obtained from distance measuring areas other than the substantially central distance measuring area when one of the measured distance values of the distance measuring areas other than the central distance measuring area represents the nearest distance; and focus adjustment information forming means for forming information on adjustment of the focal point of the optical means on the basis of outputs of the first and second priority means.

Other objects and features of the invention will become apparent from the following detailed description of embodiments thereof taken in connection with the accompanying drawings.

BRIEF DESCRIPTION OF THE DRAWINGS

FIG. 9 shows the input-output characteristic of an output circuit 120 of FIG. 8.

FIG. 10 is a circuit diagram showing a circuit arrangement for attaining the same characteristic.

FIG. 12 is a flow chart showing the operation of the circuit arrangement of FIG. 8 to be performed with a microcomputer included therein. FIG. 13 is a flow chart showing by way of example a programmed operation of the same.

FIG. 17 is a flow chart showing the operation of the arrangement of FIG. 15 with a microcomputer included therein.

FIG. 18 shows by way of example a programmed operation of the same arrangement.

FIG. 21 shows by way of example a programmed operation of the same.

FIG. 23 is a circuit diagram showing by way of example a circuit arrangement for obtaining an intermediate value by a probability computation for the same embodiment.

FIG. 31 is a flow chart showing an operation using a measured light value for the same embodiment.

FIG. 32 shows by way of example a program for the operation of FIG. 31.

FIG. 33 shows the consequent membership functions of the same program.

FIG. 37 shows an example where the same operation is performed according to a program.

FIG. 40 shows an example where the same operation is performed according to a program.

FIG. 42 shows an example where the same operation is arranged to be performed according to a program.

FIG. 50 shows by way of example a program of the operation of FIG. 49.

FIG. 56 shows by way of example a program for the operation of FIG. 55.

FIG. 60 shows Fuzzy rules employed by the embodiment of FIG. 57.

FIG. 62 shows by way of example a photographic framing to be employed in the event of having nearby obstacles on both sides.

FIGS. 63(*a*) and 63(*b*) show methods generally employed for a Fuzzy computation.

FIGS. 65, 69 and 71 show the formulas of the membership functions relative to the embodiment of FIG. 57.

FIGS. 73 to 80 show the program examples of the same embodiment.

FIGS. 81, 82(*a*), 82(*b*), 83(*a*), 83(*b*), 84(*a*), 84(*b*), 85(*a*) and 85(*b*) show assembler program examples to be used for the same embodiment.

DETAILED DESCRIPTION OF THE PREFERRED EMBODIMENTS

Figure 1:
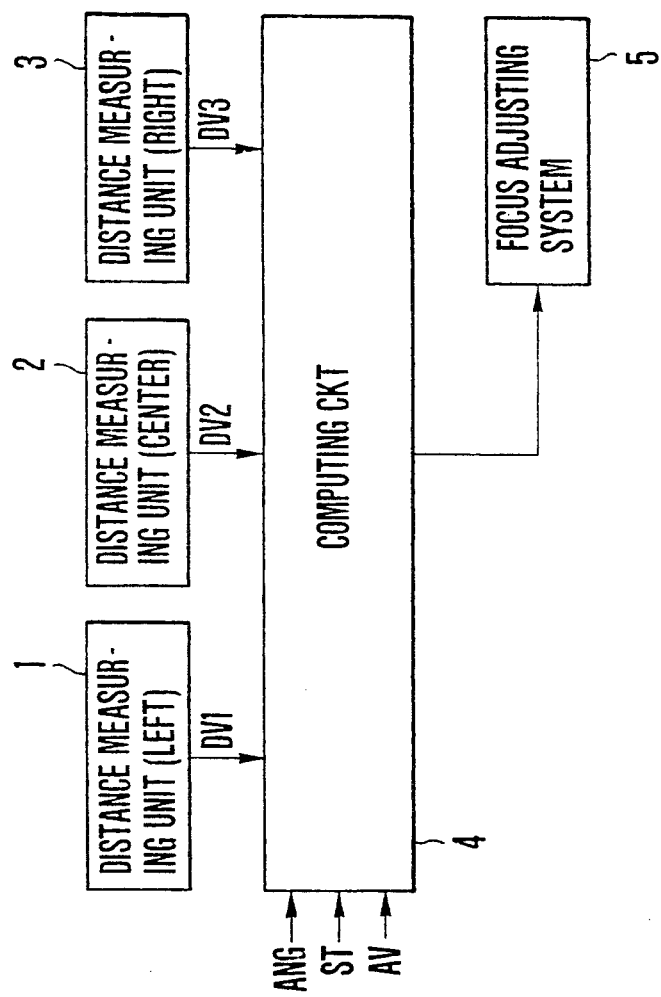
FIG. 1 is a block diagram showing in outline the arrangement of an embodiment of the invention.

FIG. 1 shows in a block diagram an embodiment of this invention. The embodiment is arranged to measure distances to objects by means of three known distance measuring units 1, 2 and 3 through left, center (approximately in the center) and right distance measuring points (or areas) provided within a photo-taking picture plane specified by a photo-taking lens which is not shown. An analog voltage is produced as a result of the distance measurement. The nearer the measured distance value DV1, DV2 or DV3 is, the lower the level of the analog voltage is. A computing circuit 4 receives the analog voltages from the distance measuring units 1, 2 and 3. The circuit 4 is arranged to compute and obtain lens driving (focus adjusting) information from the measured distance values, differences among them, information ANG about the posture of the camera, information ST about the use or nonuse of a flash device, information AV on an aperture value, etc. A focus adjusting system 5 is arranged to drive and control the lens according to the lens driving information from the computing circuit 4.

The details of the computing operation and the arrangement of the computing circuit 4 are as follows:

In the case of this embodiment, one of the measured distance values obtained from the three distance measuring points is selected through a computing operation which is performed on the basis of the following concept: Among these measured distance values, the nearest distance value represents an object to be photographed in general. Hence, the nearest distance value is output as a general rule. However, in the case of "provided that" conditions where one of the left and right measured distance values indicates a near distance, where the center measured distance value indicates a medium distance and where the other of the left and right measured distance values indicates a far distance, the measured distance value indicating the near distance is regarded as representing a nearby obstacle such as a ground or the like located between the camera and the object to be photographed and, in that case, the computing circuit 4 outputs the center measured distance value, because: In such a case, it is highly probable that one of the distance measuring points is facing the ground with the camera held aslant or an obstacle such as a tree or the like is located nearby even if the camera is in a normal posture.

Figure 2:
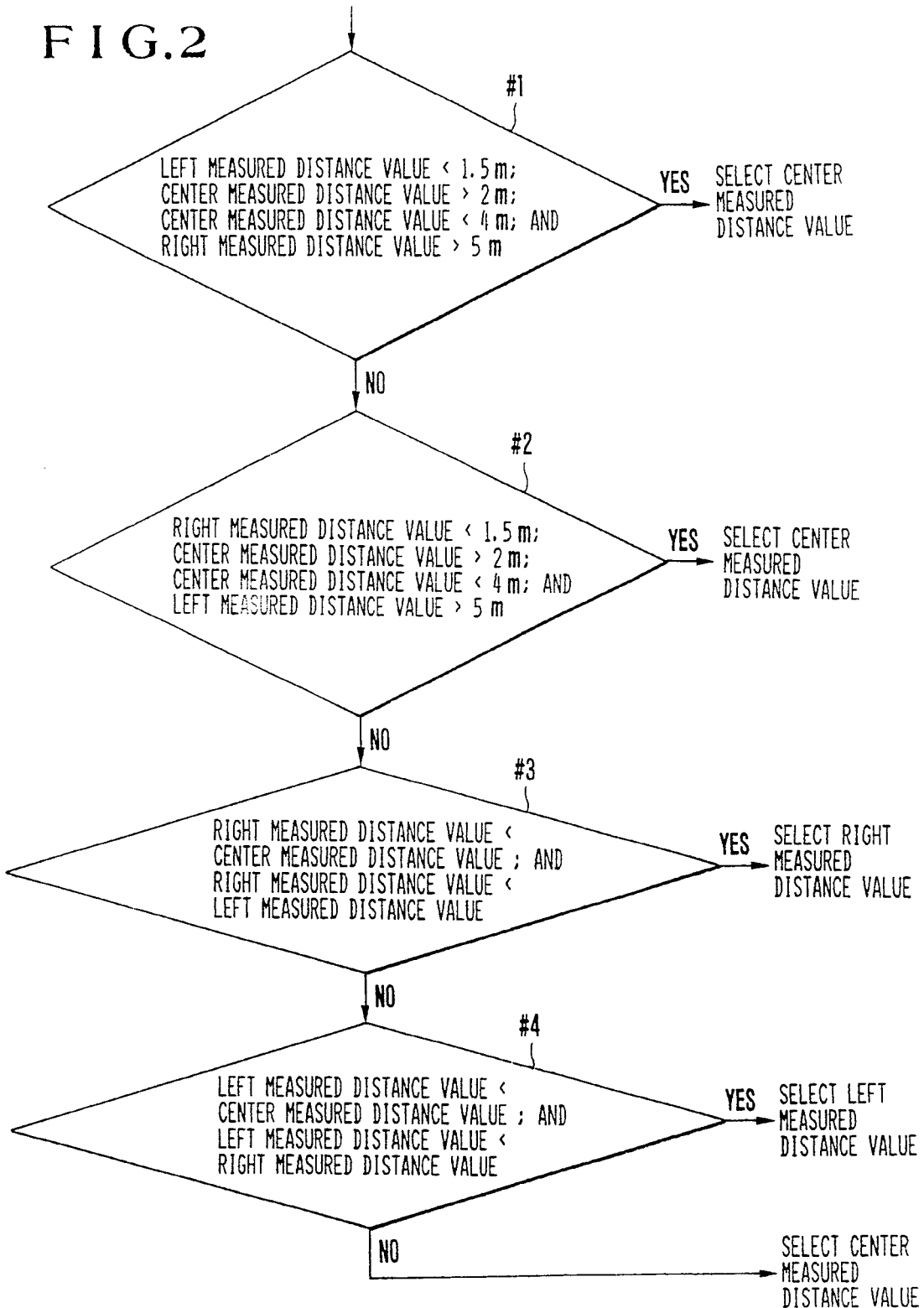
FIG. 2 is a flow chart showing the operation of the embodiment of FIG. 1.

In a case where the computing circuit 4 of FIG. 1 includes a microcomputer, etc., the embodiment operates as shown in FIG. 2 which is a flow chart. In this instance, as criteria for determining whether the camera is under the above-stated "provided that" condition, the near distance is considered to be not exceeding 1.5 m, the medium distance to be between 2 m and 4 m and the far distance to be exceeding 5 m.

Referring to FIG. 2, the embodiment operates as follows: At a step #1: A check is made to see if the measured distance value (left measured distance value) obtained from the distance measuring unit 1 is not exceeding 1.5 m; if the measured distance value (center measured distance value) obtained from the distance measuring unit 2 is between 2 m and 4 m; and if the measured distance value (right measured distance value) obtained from the distance measuring unit 3 is exceeding 5 m. If these conditions are all satisfied, the center measured distance value is selected as the current measured distance information. If not, the flow proceeds to a step #2. At the step #2: A check is made to see if the measured distance value from the distance measuring unit 3 is not exceeding 1.5 m; if the value from the unit 2 is between 2 m and 4 m; and if the value from the unit 1 is exceeding 5 m. If these conditions are all satisfied, the center measured distance value is selected as the current measured distance information like in the case of the step #1. If not, the flow proceeds to a step #3. At the step #3: A check is made to see if the value from the unit 3 is smaller than the value from the unit 2 and if the value from the unit 3 is smaller than the value from the unit 1. If these conditions are all satisfied, the measured distance value obtained from the distance measuring unit 3 is selected as the current measured distance information. If not, the flow proceeds to a step #4. At the step #4: A check is made to see if the value from the unit 1 is smaller than the value from the unit 2 and if the value from the unit 1 is smaller than the value from the unit 3. If these conditions are satisfied, the measured distance value from the unit 1 is selected as the measured distance information of that point of time. If not, the value from the unit 2 is selected as the measured distance information in the same manner as in the cases of the steps #1 and #2.

The above stated arrangement enables the camera of the AF type to more adequately bring the object into focus than the conventional AF camera of a narrow distance measuring field even with framing freely determined. Further, compared even with the conventional camera of the kind measuring distances with a wide visual field, the embodiment is capable of eliminating the possibility of measuring a distance to a nearby obstacle such as the ground or the like by mistake. Therefore, a distance to the object to be photographed can be correctly measured without any erroneous distance measurement.

In the case of FIG. 2, the flow chart shows a programmed operation. However, the operation can be also executed with an analog circuit arrangement. An example of that arrangement is shown in FIG. 3.

Figure 3:
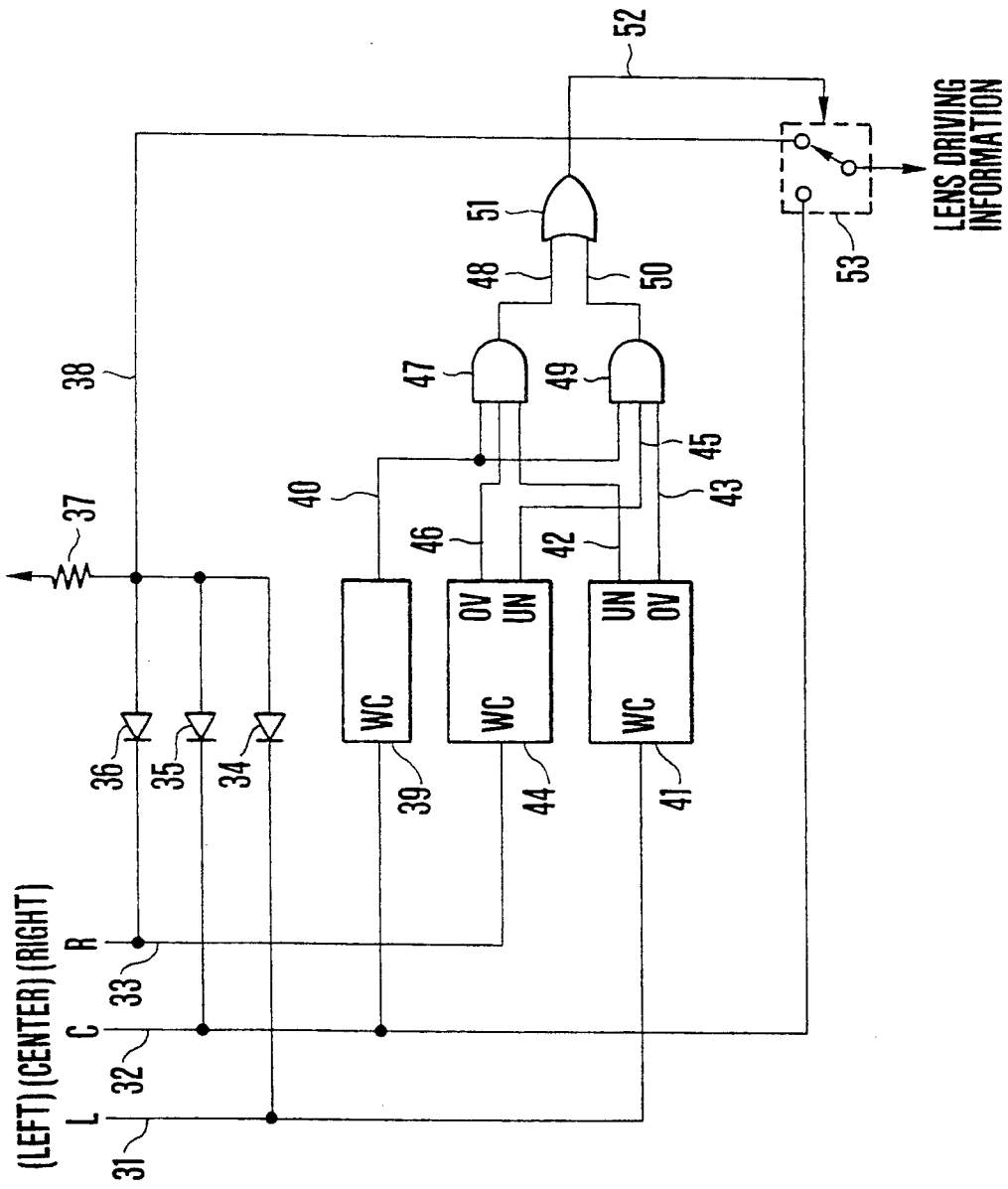
FIG. 3 is a circuit diagram showing circuit arrangement of the embodiment for zone (area) comparison.

Referring to FIG. 3, the distance measuring units 1 to 3 shown in FIG. 1 are provided with output lines 31, 32 and 33 respectively. The output of each of these units is arranged to be in the form of an analog voltage which decreases accordingly as the distance represented by the output is nearer. Distance information on the nearest distance is obtained from one of the output lines by means of diodes 34, 35 and 36 and a pull-up resistor 37. A window comparator 39 is arranged to make the level of a signal line 40 high when a center measured distance value obtained through the output line 32 is within a given range (indicating a medium distance). Another window comparator 41 is arranged to make the level of a signal line 43 high when a left measured distance value obtained through the output line 31 is above a given value (indicating a far distance) and to make the level of another signal line 42 high when it is less than the given value (indicating a near distance). A window comparator 44 is arranged to make the level of a signal line 46 high when a right measured distance value obtained through the output line 33 is above a given value (indicating a far distance) and to make that of another signal line 45 high when it is less than the given value (indicating a near distance). An AND gate 47 is arranged as follows: In a case where, in respect to the above-stated "provided that" condition, the left indicates a near distance, the center a medium distance and the right a far distance, the AND gate 47 have all its inputs at high levels. In that case, therefore, the AND gate 47 makes the level of a signal line 48 high. An AND gate 49 is arranged as follows: In a case where, in respect to the above-stated "provided that" condition, the right indicates a near distance, the center a medium distance and the left a far distance, the AND gate 49 have all its inputs at high levels. In that case, therefore, the AND gate 49 makes the level of a signal line 50 high. An OR gate 51 is arranged to make the level of a signal line 52 high in the event of the above-stated "provided that" condition. An analog switch 53 is arranged to output as lens driving information the center measured distance value obtained through the output line 32, instead of the nearest measured distance value obtained through a signal line 38, in the event of the "provided that" condition."

The arrangement is simple as described above.

Each of the measured distance values is processed in the form of an analog signal the level of which increases accordingly as the measured distance is farther. However, the signal is not proportional to the absolute distance (at zero for 0 m and at infinity for an infinity distance) but is arranged to be reciprocal with the absolute distance suited for AF (automatic focusing). In other words, the signal is proportional to the depth of field.

Next, in cases where the criterional logic of the above-stated "provided that" condition part is changed, the embodiment operates as follows:

The nearest measured distance value is output as a general rule;

"provided that" the center measured distance value is output in cases where one of the left and right measured distance values indicates a distance considerably nearer than the distance indicated by the center measured distance value, where the center measured distance value indicates a medium distance, and where the other of the left and right measured distance values indicates a distance considerably farther than the distance indicated by the center measured distance value.

In other words, in respect to the above-stated logic, in a case where the left and right measured distance values indicate values in the opposite directions relative to the center measured distance value, the mode of rewriting the conditions into relative values is used for the logic.

Figure 4:
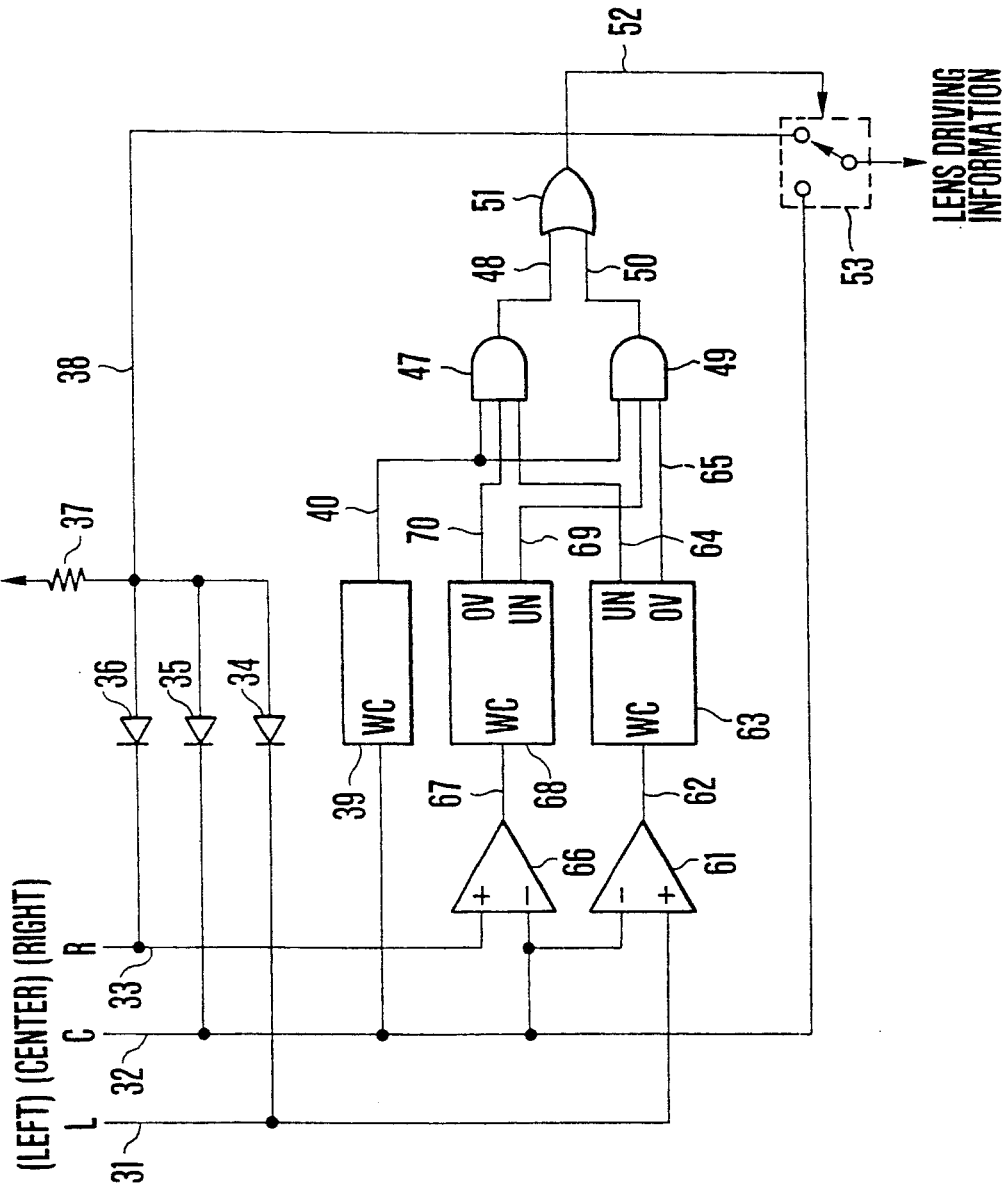
FIG. 4 is a circuit diagram showing a circuit arrangement of the embodiment made with a distance difference taken into consideration.

FIG. 4 shows a case where the logic is digitally embodied in an analog circuit. In FIG. 4, the parts having the same functions as the corresponding parts of FIG. 3 are indicated by the same reference numerals.

While the window comparators 44 and 41 of FIG. 3 are arranged to make a discrimination between a far distance and a near distance, this is changed according to the change in logic as follows in the case of FIG. 4: A differential amplifier 61 is arranged to output to a signal line 62 "the left measured distance value—the center measured distance value". As a result, a signal of a considerably low level flows to the signal line 62 when the left measured distance value indicates a considerably nearer distance than the center measured distance value. Then, a high level signal is generated in a signal line 64 via a window comparator 63. Further, in a case the left indicates a considerably farther distance than the center, a signal of a considerably high level flows to the signal line 62 to cause a high level signal to be generated in a signal line 65 via the window comparator 63. Meanwhile, a differential amplifier 66 is arranged to output and supply "the right measured distance value—the center measured distance value" to a signal line 67. As a result, a fairly low level signal flows to the signal line 67 when the right measured distance value indicates a considerably nearer distance than the center. Then, a high level signal is generated in a signal line 69 via a window comparator 68. When the right measured distance value indicates a considerably farther distance than the center, a considerably high level signal flows in the signal line 67 to cause a high level signal to be generated in a signal line 70 via the window comparator 68.

The ensuing processes of operation are similar to those of the arrangement of FIG. 3. The AND gate 47 makes the level of the signal line 48 high in cases where the level of the signal line 40 is high with the center measured distance value indicating a medium distance, where the level of the signal line 70 is high with the right measured distance value indicating a farther distance than the center measured distance value, and where the level of the signal line 64 is high with the left measured distance value indicating a nearer distance than the center measured distance value. Further, another AND gate 49 is arranged to make the level of the signal line 50 high in cases where the level of the signal line 40 is high with the center measured distance value indicating a medium distance, where the level of the signal line 65 is high with the left measured distance value indicating a farther distance than the center measured distance value, and where the level of the signal line 69 is high with the right measured distance value indicating a nearer distance than the center measured distance value. With the embodiment arranged in this manner, the center measured distance value is selected and output as lens driving information from the analog switch 53 as in the case of the "provided that" conditions of the foregoing logic description.

With the distance difference included in the logic as described above, the arrangement of FIG. 4, unlike that of FIGS. 2 and 3, enables the device to make a discrimination without being restricted by the fixed distance measuring zones. In other words, it enables the device to correctly make a discrimination even in cases where the center measured distance value indicates a nearer distance or a farther distance than the medium distance. The details of this will be described later.

The arrangement to take the distance difference into consideration means consideration for a degree of blur that likely results from focusing on one side. In other words, a great difference in distance in the logic means that the use of one side for focusing would result in a blurred picture of the other side. In selecting one of the distance measuring points, this bears an important meaning.

Figure 5:
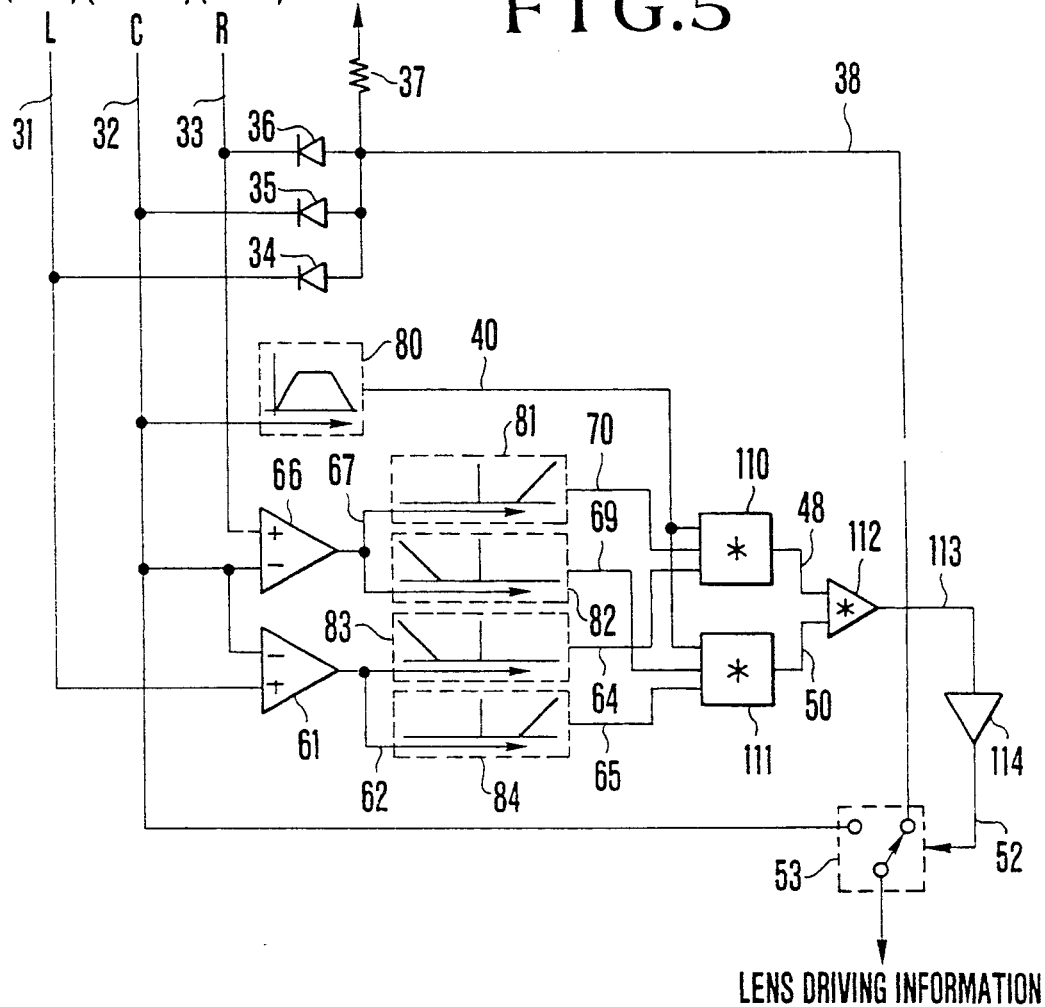
FIG. 5 is an analog circuit arrangement of the same embodiment.

An example of an arrangement for an analog discrimination of the "provided that" conditions of the logic described in the foregoing is as shown in FIG. 5. Referring to FIG. 5, an output circuit 80 is arranged to produce an output having a function which increases the output when information indicating a medium distance is received and decreases it when information indicating a near distance or a far distance is received. As a result, a medium distance causes a larger output to be produced into the signal line 40. An output circuit 81 likewise has a function which is arranged to give a larger output when its input is positive and large. When the right measured distance value indicates a farther distance than the center measured distance value, the output circuit 81 produces a large output to a signal line 70. Another output circuit 82 has a function which gives a larger output accordingly as its input is negative and large. The output circuit 82 is thus arranged to produce to a signal line 69 a large output which increases accordingly as negative input increases. As a result, the signal line 69 generates an output which increases accordingly as the right measured distance value indicates a more nearer distance than the center measured distance value. A function circuit 83 is arranged in the same manner as the output circuit 82. Another function circuit 84 is arranged in the same manner as the output circuit 84.

The arrangement described above supplies the signal lines 40, 70, 69, 64 and 65 with signals similar to those of the digital arrangement of FIG. 4.

Figure 6:
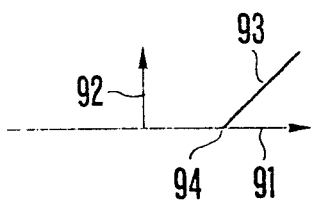
FIG. 6 shows the input-output characteristic of an output circuit 81 of FIG. 5.
Figure 7:
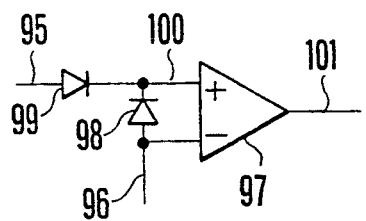
FIG. 7 is a circuit diagrams showing a circuit arrangement for attaining the same characteristic.

An example of arrangement for obtaining an input-output characteristic like that of the output circuit 81 is as follows: Referring to FIG. 6 which shows the characteristic, the axis of abscissa 91 shows an input (positive and large on the right-hand side). The axis of ordinate 92 shows an output. In relation to the input, the output value is produced at a function which is represented by a straight line 93. When the input is less than a value indicated by a point 94, the output value is zero. The output is arranged to increase accordingly as the input increases from this point 94. FIG. 7 shows by way of example a circuit arrangement for obtaining this characteristic. Referring to FIG. 7, with an input voltage applied to a signal line 95, a voltage of a value corresponding to the above-stated point 94 is applied to a signal line 96. Diodes 98 and 99 are arranged to transmit to a signal line 100 the higher one of the voltages applied to the signal lines 95 and 96. A differential amplifier 97 is arranged to produce a voltage difference between the signal lines 100 and 96 to a signal line 101. The signal line 101 thus carries information on a difference between the value of the higher one of the signal levels of the signal lines 95 and 96 and the level value of the signal line 96. In other words, when the signal level of the signal line 95 is higher than that of the signal line 96, a difference by which the former is higher than the latter is produced to the signal line 101. Further, this circuit arrangement can be changed into the same arrangement as the above-stated output circuit 82 by arranging an inversion circuit in front of the diode 99 on the signal line 95 and by arranging the voltage of the zero-crossing point of the output circuit 82 to be applied to the signal line 96.

Again referring to FIG. 5, the circuit arrangement operates as follows: Multipliers 110 and 111 are arranged to compute the "and" parts of "provided that" conditions. A signal indicating the degree of satisfying the "provided that" conditions by its level is obtained at a signal line 113 from the outputs of the multipliers 110 and 111 which are output through signal lines 48 and 50 and supplied to an adder 112. A comparator 114 receives this signal makes a discrimination between satisfaction and nonsatisfaction of the conditions in two values. This determines whether or not the center measured distance value is to be selected by the analog switch 53.

According to this method, the "provided that" conditions are computed in an analog manner instead of a binary computation. This permits synthetic judgment of the conditions. In other words, this method has the following advantage: In a case where the center measured distance value is somewhat deviating from a medium distance, the center measured distance value is selected if the left measured distance value indicates a very near distance and if the right measured distance value an extremely far distance such as an infinity distance. In an opposite case where the left and right measured distance values are not indicating extremely far or near distances, the center measured distance value does not have to be selected. All elements of the above-stated "provided that" conditions thus can be synthetically judged. In other words, synthetic evaluation of each condition prevents a possible misjudgment without setting a strict criterion for the "medium distance". For example, even in cases where a judged medium distance somewhat deviates from an ideal medium distance, a strong influence of other conditions would give the same result as mentioned above. This method is thus considered to allow a greater latitude to the logic.

Figure 8:
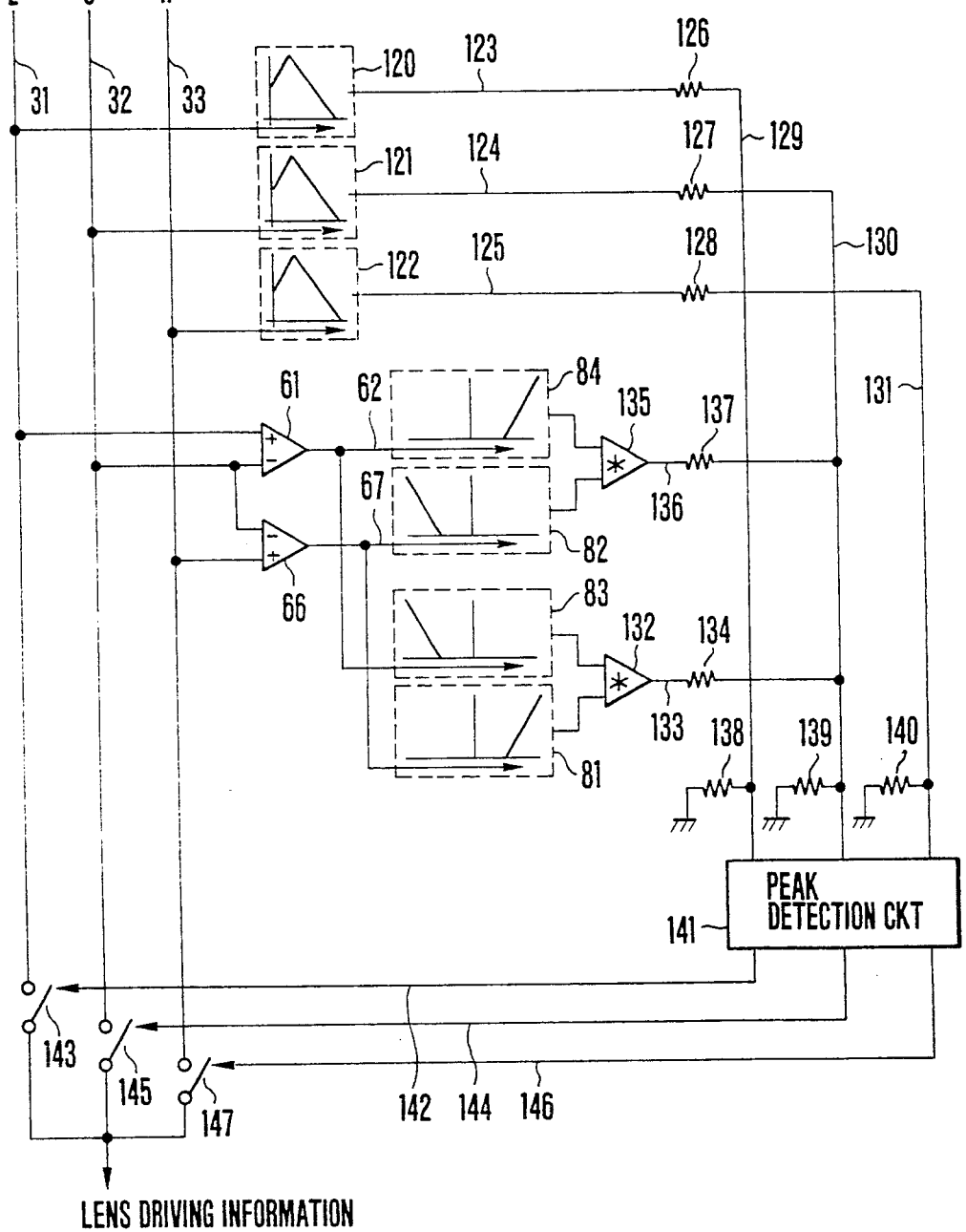
FIG. 8 is a circuit diagram showing a circuit arrangement for a probability addition to be performed on the basis of a distance difference for the embodiment shown in FIG. 1.

FIG. 8 shows a circuit arrangement for carrying out the computing operation of the arrangement of FIG. 5 in a mode of "selecting a measured distance value which is probably most correct". The circuit arrangement thus makes selection by probability.

In the case of this embodiment, the logic of "selecting the nearest one" is changed to a logic of "selecting a nearer distance at an increased rate within a range from the infinity to 1 m and at a lowered rate within a range nearer than 1 m". Further, a logic of "selecting the center measured distance value when the left and right measured distance values are larger than the center measured distance value in the opposite directions" is changed to a logic of "selecting the center measured distance value at an increased rate when the left and right measured distant values are larger than the center measured distance value in the opposite directions". The arrangement of FIG. 8 then acts to "select one having a greater rate of selection among the measured distance values".

In other words, the arrangement of FIG. 8 is based on the following logic:

The rate where the left measured distance value is correct increases accordingly as the left measured distance value is close to 1 m;

The rate where the center measured distance value is correct increases accordingly as the center measured distance value is close to 1 m;

The rate where the right measured distance value is correct increases accordingly as the right measured distance value is close to 1 m;

The rate where the center measured distance value is correct increases accordingly as the left measured distance value farther than the center measured distance value and the right measured distance value is nearer than the center measured distance value; and The rate where the center measured distance value is correct increases accordingly as the right measured distance value is farther than the center measured distance value and the left measured distance value is nearer than the center measured distance value.

The measured distance value to be selected is determined on the basis of the above-stated logic according to the overall selectable degrees of the three different measured distance values.

The circuit arrangement of FIG. 8 includes output circuits 120, 121 and 123, which are arranged to have such functions that cause them to output to signal lines 123, 124 and 125 signals at higher levels accordingly as the measured distance values are close to 1 m respectively. The details of the arrangement of these output circuits will be described later. The level of the signal line 123 is high if the left measured distance value is close to 1 m. As a result, a large amount of current indicating "the rate of correctness of the left measured distance value" flows to a signal line 129 via a resistor 126. The level of the signal line 124 likewise is high if the center measured distance value is close to 1 m. As a result, a large amount of current indicating "the rate of correctness of the center measured distance value" flows to a signal line 130 via a resistor 127. The level of the signal line 125 is high if the right measured distance value is close to 1 m. Then, a large amount of current indicating "the rate of correctness of the right measured distance value" flows to a signal line 131 via a resistor 128.

Next, like in the case of FIG. 5, a distance difference between the left and right measured distance values is used as follows: A signal line 133 obtains information on the degree of a difference between the left and right measured distance values from the output circuits 81 and 83 via a multiplier 132 if the left measured distance value indicates a near distance and if the right measured distance value indicates a far distance. As a result a large amount of current indicating "the rate of correctness of the center measured distance value" flows via a resistor 134 to the signal line 130. In cases where the right measured distance value indicates a near distance and where the left measured distance value indicates a far distance, information on the degree of difference is obtained on the signal line 136 via an amplifier 135 from the output circuits 82 and 84. In this case, a current indicating "the rate of correctness of the center measured distance value" flows in a large amount to the signal line 130 via a resistor 137.

Resistors 138, 139 and 140 are arranged to convert into voltage values the added current values indicating "the rate of probable correctness" obtained through the above-stated computing processes. A peak detection circuit 141 is arranged to select the highest one of the voltages obtained from the signal lines 129 to 131 and to make high the level of one of signal lines 142, 144 and 146 which correspond to the lines 129, 130 and 131.

This circuit arrangement will be described in detail later.

In a case where the left measured distance value is most probably a correct value, the level of the signal line 142 becomes high. Then, an analog switch 143 is turned on to allow the measured distance value coming through the output line 31 to be output as lens driving information. When the center measured distance value is most probably the correct value, the level of the signal line 144 becomes high to turn on an analog switch 145. The switch 145 then allows the measured distance value received from the output line 32 to be output as the lens driving information. If the right measured distance value is most probably the correct value, the level of the signal line 146 becomes high to turn on another analog switch 147. The switch 147 then allows the measured distance value coming through the output line 33 to be output as the lens driving information.

The priority degrees thus can be given to the logic as in the case of the above-stated "provided that" conditions by changing the function provided within each of the output circuits 81 to 84 and 120 to 122 or by changing the value of each of the resistors 134, 137 and 126 to 128.

Each logic is thus synthetically judged by performing an adding operation on the values of "the rate of correctness". This means that a plurality of logic conditions are added up in an analog manner. Therefore, each logic does not have to be independent of others. The criterion for the logic also does not have to be strict. In other words, the logic is acceptable even if it involves some contradiction. It is an advantage that the logic conditions of varied kinds can be added in a similar form.

The word "rate" as used in the foregoing description qualitatively means probability. However, the word differs from probability in the following points: Each of the logic conditions is independently computed without checking the above-stated independency; and they are arranged to be computable without normalization and even when they include some graybody (ambiguity).

The input-output characteristic of the output circuit 120 of FIG. 8 is, for example, as described below:

FIG. 9 shows an example of the characteristic. The axis of abscissa 371 shows the input and the axis of ordinate 372 the output. In relation to the input, the output is produced with functions as represented by straight lines 373a and 373b. Up to a value of input indicated by a point 374 (which is 1 m in the case of this embodiment), the output gradually increases as shown by the straight line 373a. In the event of input values above this particular point, the output comes to gradually decrease from this point 374 as shown by the straight line 372b. FIG. 10 shows a circuit arrangement for attaining this characteristic. Referring to FIG. 10, a signal line 359 is arranged to have an input applied thereto while a voltage corresponding to the point 374 is applied to signal lines 360 and 361. If the input value is less than the value of the point 374, since the voltage corresponding to the point 374 is applied to a signal line 360, by operations of an adder 358 which has a given voltage applied to a signal line 362, diodes 351 and 352, a differential amplifier 355, a diode 356 and a signal line 362, an output is produced on a signal line 364 in a manner as represented by the straight line 373a of FIG. 9. If the value of the input to the signal line 359 is higher than the point 374, the voltage which corresponds to the point 374 and which is applied to the signal line 361 causes diodes 353 and 354, a differential amplifier 365, a diode 357 and the adder 358 to produce an output as represented by the straight line 373b of FIG. 9.

Figure 11:
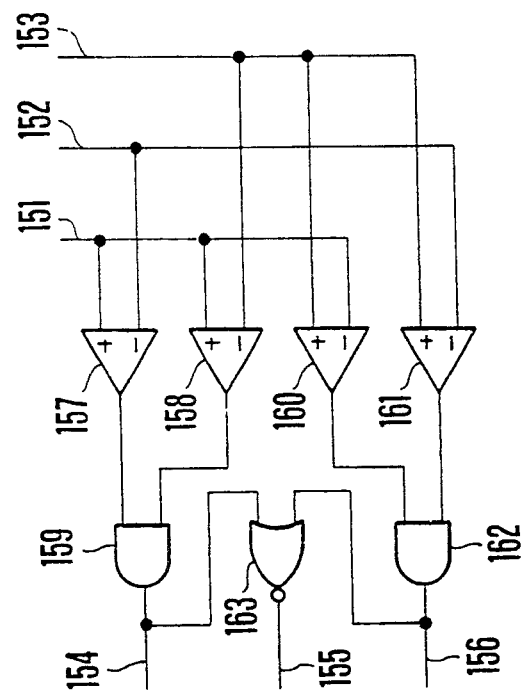
FIG. 11 is a circuit diagram showing by way of example the details of a peak detection circuit of FIG. 8.

FIG. 11 shows an example of arrangement of the peak detection circuit 141 of FIG. 8. The level of an output line 154 becomes high when an input coming via an input line 151 is at a maximum value. The level of another output line 155 becomes high when an input coming via an input line 152 is at a maximum value. The level of an output line 156 becomes high when an input coming via an input line 153 is at a maximum value. In other words, when the input coming via the input line 151 is at a maximum value, the output level of a comparator 157 becomes high as the input via the input line 151 is larger than the input coming via the input line 152. Then, the output level of a comparator 158 also becomes high as the input via the input line 151 is also larger than the input coming via the input line 153. As a result, the output level of an AND gate 159 becomes high to make the level of the output line 154 high. Further, when the input coming via the input line 153 is at its maximum value, the input via the input line 153 is larger than the input coming via the input line 151. This causes the output level of a comparator 160 to become high. Then, since the input via the input line 153 is larger than the input coming via the input line 152, the output level of a comparator 161 also becomes high. As a result, the output level of an AND gate 162 become high to make the level of the output line 156 high. In a case where the input coming via the input line 152 is at a maximum value, the levels of the comparators 157 and 161 and those of the AND gates 159 and 162 are low. In this case, therefore, the output level of a NOR gate 163 becomes high to make the level of the output line 155 high.

FIG. 12 is a flow chart showing the operation of the analog circuit of FIG. 8 to be performed with a microcomputer, etc. included in the circuit arrangement. Referring to FIG. 12, the operation is as follows:

At a step #21: For example, a register which is arranged to hold each of the measured distance values is set in its initial position. The flow of operation proceeds to a step #22. At the step #22: The left, center and right measured distance values are examined to see how much each of them differs from "1 m" which is regarded as a near distance in this embodiment. Each of these measured distance values is weighted according to the difference (an absolute value) detected. The weighting degree increases accordingly as the value is close to 1 m. The weighted values thus obtained correspond to the outputs of the output circuits 120 to 122 of FIG. 8. The flow then proceeds to a step #23. At the step #23: A check is made for a difference between the center measured distance value and each of the left and right measured distance values. The center measured distance value is weighted according to degrees to which the left measured distance value is nearer than the center measured distance value and the right measured distance value is farther than the center measured distance value or according to the degrees to which the right measured distance value is nearer than the center measured distance value and the left measured distance value is farther than the center measured distance value. The weighted values corresponds to the outputs of the multipliers 132 and 135 of FIG. 8. The flow proceeds to a step #24. At the step #24: The measured distance value which is most heavily weighted among the weighted measured distance values of the left, center and right measured distance value is selected and output as the current lens driving information, which corresponds to the output of the peak detection circuit 141 of FIG. 8.

FIG. 13 shows an example of a program prepared for the flow of operation shown in FIG. 12. The left, center and right measured distance values are used as variables L, C and R respectively and the "rate" mentioned in the foregoing is computed. As a result of the computation, distance values are selected and output in the form of variables OUT. In this example, the program is prepared in a machine language something like the language called FORTRAN which is employed in coding for a computer.

Referring to FIG. 13, the first letters "L", "C" and "R" in codes LR, CR and RR respectively represent the left measured distance value, the center measured distance value and the right measured distance value. The letter "R" disposed in the second place in each of these codes LR, CR and RR indicates the above-stated "rate of probable correctness". Letters α and β represent weighting functions. The function α becomes a maximum value when each of the left, center and right measured distance values is 1 m. The function beta increases the weighting degree accordingly as the difference between the center measured distance value and each of the left and right measured distance values increases further than a difference value of 2 m. Further, a code ABS means an absolute value. A code "max1" means selection of a maximum value. Therefore, ABS (L−1 m) means to obtain the absolute value of a difference obtained by subtracting 1 m from the left measured distance value. The expression max1 ((L−C)−2 m, 0) means selection of the larger one of "0" and a difference between 2 m and a computed difference value between the left measured distance value and the center measured distance value. Further "EQ" means equal.

Referring to FIG. 13, the details of the program are as follows: At a part corresponding to the step #21 of FIG. 12, an initial setting action is of course performed on each of the variables. At a part corresponding to the step #22, the left, center and right measured distance values are respectively weighted according to their differences from 1 m (by using the function α). They are thus converted into the variables LR, CR and RR which respectively include the rate of probable correctness. At a part corresponding to the step #23: The center measured distance value which has already been weighted by the function alpha is further weighted by using the function β to obtain the variable CR according to a degree to which the left and right measured distance values differ from the center measured distance value (with 2 m used as a datum point in the case of the embodiment). At a part corresponding to the step #24: One of the variables LR, CR and RR which is most heavily weighted among them is selected. More specifically, if the variable LR is equal to max1 (LR, CR, RR) is equal to each other, the variable L which is the left measured distance value is output as lens driving information.

To facilitate the program, a peak selecting action is changed into a condition having the same value as the "max1".

Figure 14:
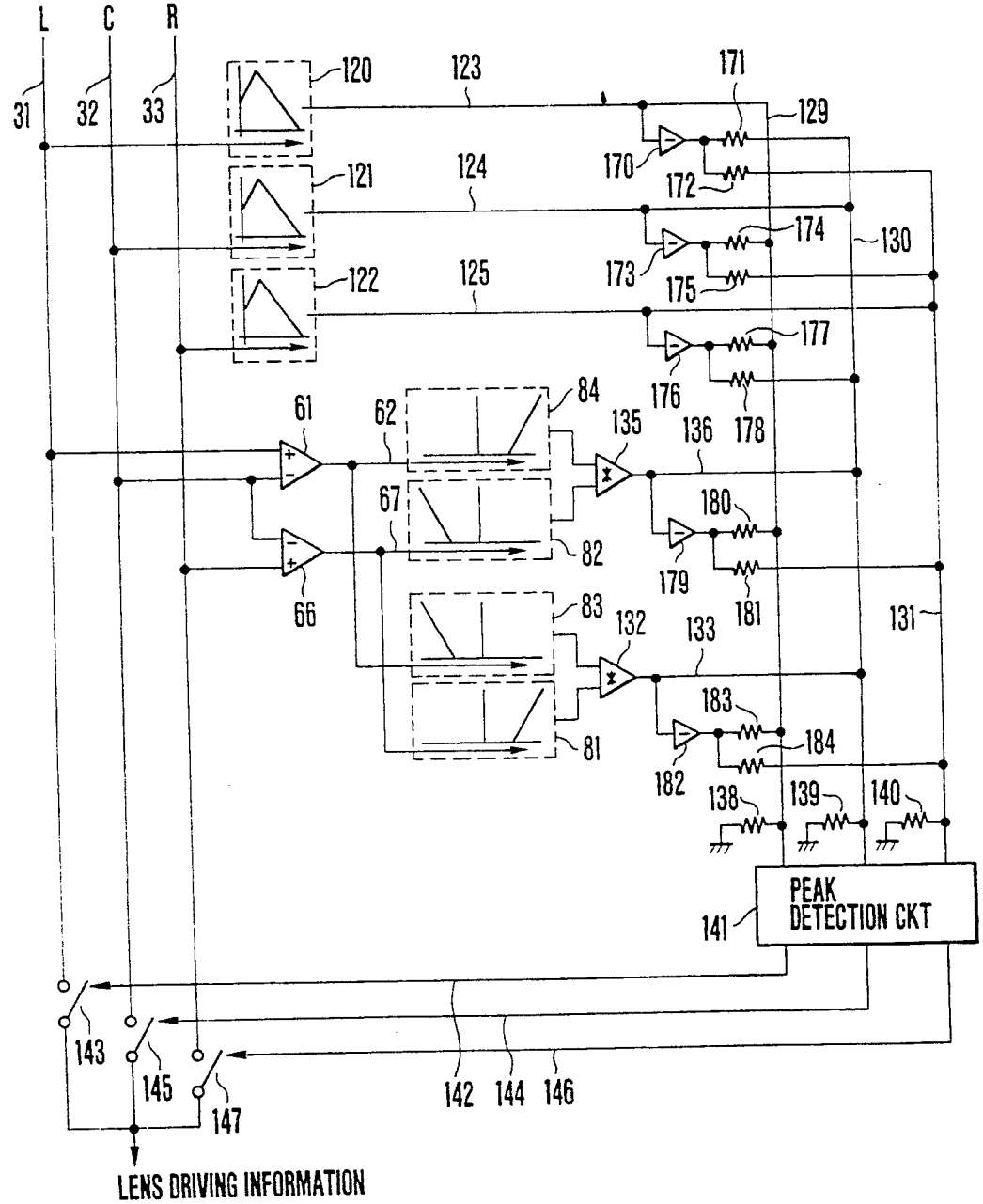
FIG. 14 is a circuit diagram showing a circuit arrangement for a probability subtraction to be performed on the basis of a distance difference for the embodiment shown in FIG. 1.

Next, an arrangement for performing the operation of the arrangement of FIG. 8 in a subtracting mode is described below with reference to FIG. 14:

Referring to FIG. 14, the output of the output circuit 120 causes the level of the signal line 123 to increase accordingly as the left measured distance value is near to a given near distance. However, an inverting amplifier 170 sucks currents out from the signal lines 130 and 131 by means of resistors 171 and 172 in such a way as to lower the rate of probable correctness of the center and right measured distance values. The level of the signal line 124 likewise becomes higher accordingly as the center measured distance value is close to the given near distance. However, an inverting amplifier 173 sucks currents out from the signal lines 129 and 131 by means of resistors 174 and 175 in such a way as to lower the rate of probable correctness of the left and right measured distance values. The level of the signal line 125 also increases accordingly as the right measured distance value is near to the given near distance. However, an inverting amplifier 176 sucks currents out from the signal lines 129 and 130 by means of resistors 177 and 178 in such a way as to lower the rate of probable correctness of the center and left measured distance values.

Further, when the output of the signal line 136 indicates that the left measured distance value is farther than the center measured distance value and the right measured distance value is nearer than the center measured distance value, an inverting amplifier 179 causes resistors 180 and 181 to suck out currents from the signal lines 129 and 131 which carry signals indicating the rates of the left and right measured distance values. In cases where the output of the signal line 133 indicates the right measured distance value is farther than the center measured distance value while the left measured distance value is nearer than the center measured distance value, an inverting amplifier 182 causes resistors 183 and 184 to suck out currents from signal lines 129 and 131 which carry signals indicating the rates of the left and right measured distance values.

As apparent from the above description of the arrangement of FIG. 14, the use of the current sucking subtraction mode in combination with the adding mode shown in FIG. 8 enables the device to perform about the same functions. Besides, the arrangement of FIG. 14 prevents the values (voltage values) from becoming excessively large in computing and obtaining a total of them.

Figure 15:
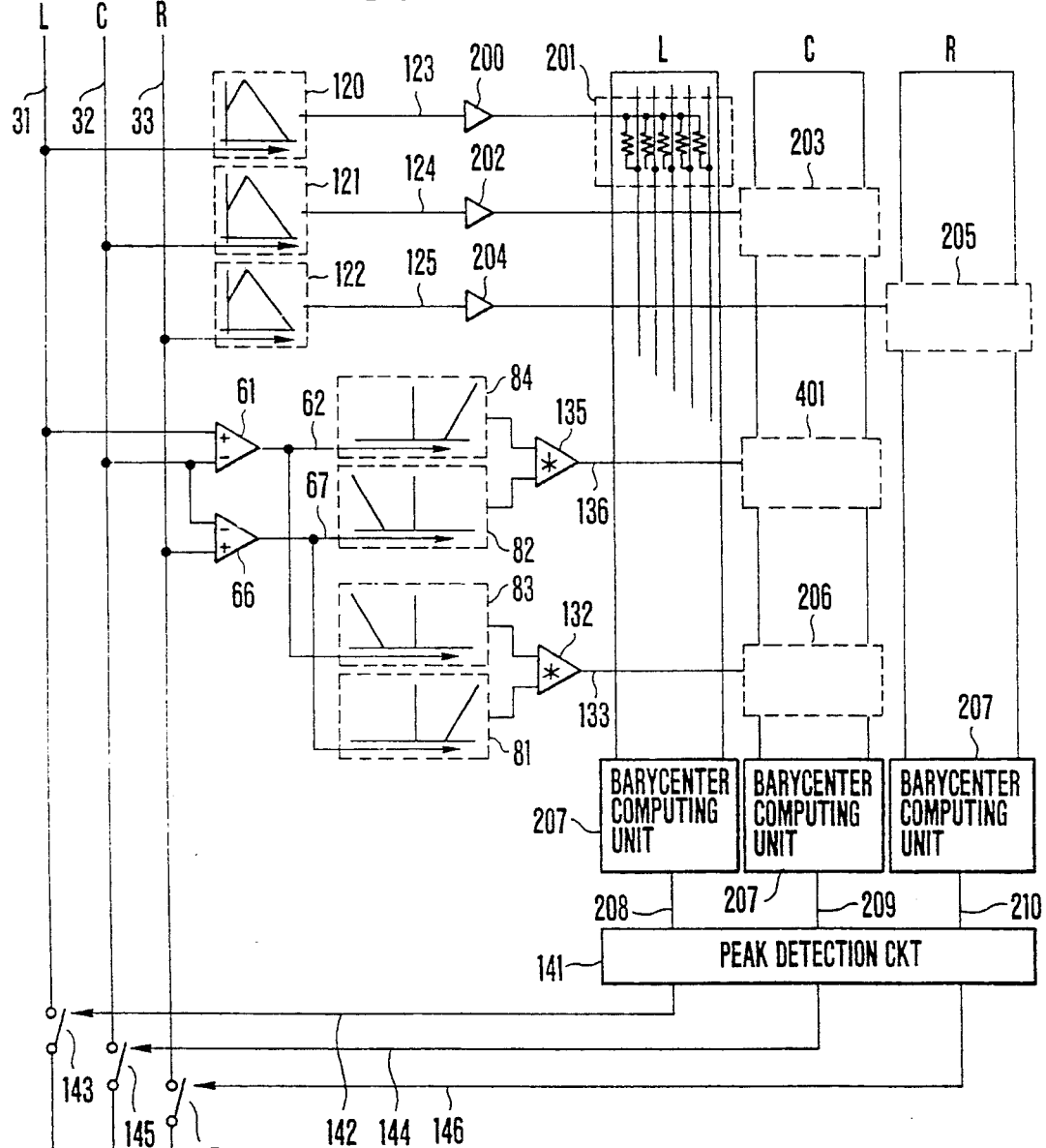
FIG. 15 is a circuit diagram showing a circuit arrangement made according to a probability array of the same embodiment.

FIG. 15 shows another embodiment, which is arranged as follows: In the arrangements of FIGS. 8 and 14, the "rate of probable correctness" is obtained from one of the signal lines carrying a signal of the "rate of probable correctness" by performing an adding or subtracting operation. In the case of FIG. 15, however, the "rate" is obtained by performing an adding operation by using a plurality of signal lines.

For example, three signal lines for 0%, 50% and 100% are used in the following manner:

In the case of a strongly negative result of logic: A given value is added to the 0% signal line.

In the case of a weakly negative result of logic (rather negative): The given value is added to the 0% and 50% signal lines.

In the case of an indecisive result of logic: The given value is added to the 50% signal line.

In the case of a weakly affirmative result of logic: The given value is added to the 50% and 100% signal lines.

In the case of a strongly affirmative result of logic: The given value is added to the 100% signal line.

In making an overall judgment, the barycenter positions (%) of the three signal lines are obtained from the values obtained in the above-stated manner and then the line having the largest value of the barycenter position is selected.

Compared with the mode described in the foregoing, the above-stated mode of computation requires a greater number of computing processes. However, in the modes described in the foregoing, since the synthesization (or integration) of logic is carried out by one of the signal lines, the affirmative and negative degrees are synthesized. In other words, these modes are incapable of discriminating the "rate of probable correctness" obtained in the event of a plurality of indecisive results of logic from the "rate of probable correctness" obtained without any indecisive result of logic. Therefore, an ambiguous (gray) result of logic might be selected by mistake. Whereas, in the mode of FIG. 15, the "rate" of the 50% signal lines increases in the event of many indecisive results of logic. Then, in carrying out the barycenter computation, "0%" negative or "100%" affirmative becomes "25%" or "75%." In other words, the negative and the affirmative are computed in a thinned state. It is, therefore, an advantage of this mode that the computing operation is carried out including the above-stated indecisive and weak affirmative results and a weak negative result.

This mode can be extended into the so-called "Fuzzy theory" which has recently become popular.

In the arrangement of FIG. 15, the single signal line of "the rate of probable correctness" used in the arrangement of FIG. 8 is replaced with five signal lines including 0%, 25%, 50%, 75% and 100% signal lines.

The level of the signal lines 123 becomes higher and the output level of an amplifier 200 increases accordingly as the left measured distance value is near to the near distance. The resistor 126 which is singly disposed in the signal line 123 in the case of FIG. 8 is replaced with a resistor block 201. The resistor block 201 consists of five resistors of five different resistance values which are connected to five signal lines for five different "rates of likely correctness", including: A 100% signal line arranged to have a large current with a small resistance and a 0% signal line arranged to have a small current with a large resistance. Information about the degree of likeliness as to whether the center measured distance value is the near distance is likewise supplied via an amplifier 202 to a resistor block 203 including five signal lines provided for determining the rate of the center measured distance value. Information about the degree of likeliness as to whether the right measured distance value is the near distance is also supplied via an amplifier 204 to a resistor block 205 including signal lines provided for determining the rate of the right measured distance value.

The resistance difference among the above-stated resistor blocks is, so to speak, a "ratio" between one way of thinking that "the left measured distance value is absolutely correct and should be selected" and another way of thinking that, although it is logically correct, "there is a possibility that a measured distance value other than the left measured distance value might be correct, that is, the left measured distance value might be not selected" in a case where the left measured distance value is, for example, logically determined to be the near distance. Therefore, the internal resistance ratios of resistor blocks 206 and 401 which are provided for supplying currents from signal lines 133 and 136 to the five signal lines arranged to determine the rate of the center measured distance value may, in some cases, differ from those of the resistance ratios of other resistor blocks 201, 203 and 205. Especially, as mentioned in the foregoing, the priority logic arrangement of "provided that ---" conditions results in a lower resistance on the 100% side and a higher resistance on the 0% side. Further, the average internal resistance value of each resistor block is arranged to be low in the case of a strong logic depending on the strength of the whole logic, i.e. according to the weight of the result of logic.

The signal line groups provided of three kinds carrying information on different rates to be selected are arranged to supply information on the rates to be selected to signal lines 208, 209 and 210 through barycenter computing units 207 which are arranged to compute applicable barycenters respectively. The peak detection circuit 141 is arranged to obtain the highest selectable rate of the left, center and right measured distance values. The level of one of the signal lines 142, 144 and 146 then becomes high to cause the output of the peak detection circuit 141 to be output as lens driving information from one of the analog switches 143, 145 and 147.

Figure 16:
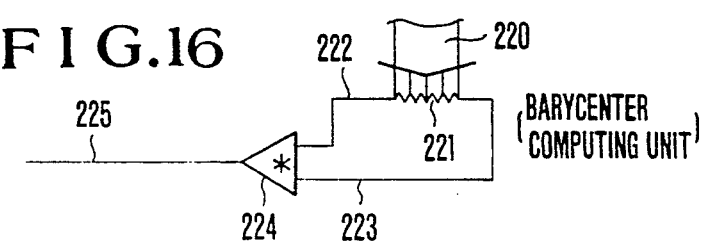
FIG. 16 is a circuit diagram showing by way of example the arrangement of a barycenter computing unit of FIG. 15.

FIG. 16 shows by way of example the details of each of the above-stated barycenter computing unit 207.

The signal lines for the selective rates of 0 to 100% (five signal lines for 0%, 25%, 50%, 75% and 100% in this specific case) are connected to a resistor 221 in positions from the left to the right in order of rate. As a result, a current is divided and shunted to signal lines 222 and 223 in a ratio according to the connecting positions of the five signal lines. The shunted currents are supplied to a divider 224, which is arranged to produce an output according to the dividing ratio between the input currents. The output of the divider 224 is supplied to a signal line 225 in the form of a voltage. Such being the arrangement, 100 parts of voltage is produced to the line 225, for example, if the current is flowing only to the position of 100%; and 50 parts of voltage is produced if the current is flowing only to the position of 50%. This arrangement enables the unit 207 to give a signal for the "rate to be selected" on the basis of the synthetic logic.

With a plurality of signal lines for 0 to 100% provided as mentioned above, even such a measured distance value that has a gray result of logic can be computed. This is an advantage in case where the rates are to be influenced by varied number of logics. In other words, the arrangement to have the plurality of signal lines is advantageous, for example, in cases where one logic is used for determining the rate of each of the left and right measured distance values and three logics for that of the center measured distance value like in the case of the preceding example described in the foregoing, because: For an accurate computation of probability, the result of computation must be normalized for each logic. In the case of the example described above, the probability of the center must be increased by affirmation, decreased by ambiguity and decreased by denial while those of others must be decreased and increased accordingly (although it depends also on the involutional relation of logic). In the case of the ambiguous logic, the decrease and increase must be different from the increase and decrease under affirmative and negative conditions. In short, the accuracy of computation cannot be maintained without accurate and complex operations on the probability of the cases according to the logical results (especially in the event of many cases and many gray logics).

In the above-stated example, the provision of, for example, the 50% signal line enables the device to thin down the degrees of affirmation and denial for each of the rates. Further, as regards affirmation or denial of each rate, a distribution constant having some value in the 50% signal line permits normalization of distributed values through comparison of the barycenters of them.

FIG. 17 is a flow chart showing the operation of the above-stated arrangement of FIG. 15 with a microcomputer, etc. included therein. Referring to FIG. 17, the operation is as follows: At a step #31: Initial setting is performed. At a step #32: The left, center and right measured distance values are checked for their differences from "1 m" which is considered to be a standard near distance. Each of them is weighted within its array (of signal lines) according to the difference thus found (by the resistor blocks 210, 203 and 205 of FIG. 15). At a step #33: With importance attached to the difference of the center measured distance value from the left and right measured distance values, the center measured distance value is weighted within its array (the resistor blocks 206 and 401 of FIG. 15) according to degrees to which the left measured distance value is nearer and the right measured distance value is farther than the center measured distance value, or the right measured distance value is farther and the left measured distance value is nearer than the center measured distance value. Then, the flow proceeds to a step #34. At the step #34: The barycenters of the weighted left, center and right measured distance values are obtained from within their arrays respectively. At a step #35: The measured distance value having the largest barycenter is selected and output (the output of the peak detection circuit 141 of FIG. 15).

FIG. 18 shows an example of a program prepared for the flow of operation shown in FIG. 17. In this case, the array of the 0 to 100% signal lines is expressed as an array 0 to 100 indexes ($) for computation. Further, the functions of the resistor blocks 210, 203, 205, 206 and 401 are expressed as the arrays of $\alpha\$$ and $\beta\$$.

Referring to FIG. 18, the details of the program are as follows: At a part corresponding to the step #31 of FIG. 17, initial setting of all variables is performed. At a part corresponding to the step #32: The left, center and right measured distance values are weighted within their arrays (by a multiplying operation with the function $\alpha$ for 0 to 100). They are thus converted into variables LR, CR and RR which respectively include the "rate of probable correctness". At a part corresponding to the step #33: According to the degrees to which the left and right measured distance values deviate in different directions, weight is further attached to the center measured distance value within its array (by a multiplying operation with the function $\beta$ for 0 to 100). The center measured distance value is thus made into the variable CR. At a part corresponding to the step #34: The barycenters of the added left, center and right measured distance values which are weighted for 0 to 100 are obtained from within their arrays respectively. At a part corresponding to the step #35: The valve having the largest barycenter is selected and output.

Figure 19:
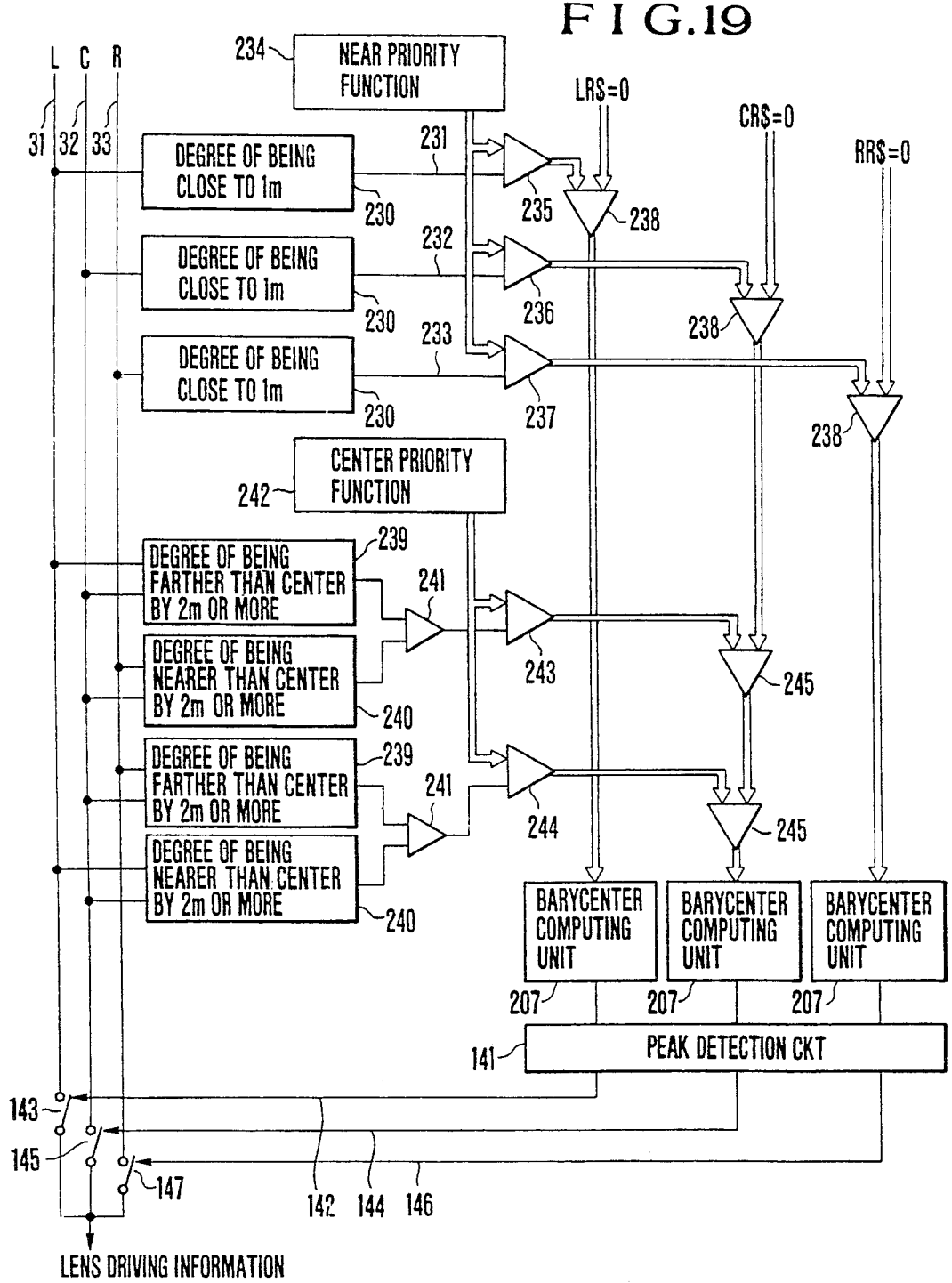
FIG. 19 is a block diagram showing the arrangement of FIG. 15 based on the Fuzzy theory.

FIG. 19 shows a circuit arrangement based on a higher notion than the arrangement of FIG. 15. Referring to FIG. 19, output circuits 230 have functions for "outputting a larger value accordingly as the measured distance value is close to 1 m" like in the case of the output circuits 120 to 122 of FIG. 15. The circuits 230 are thus arranged to output via signal lines 231 to 233 such signals that indicate degrees to which the left, center and right measured distance values are close to 1 m respectively. An output circuit 234 has a function for varying the rate according to the degrees of the measured distance values. The circuit 234 corresponds to the resistor blocks 201, 203 and 205 of FIG. 15. Function circuits 235 to 237 which correspond to the amplifiers 200, 202 and 204 of FIG. 15 are arranged to multiply the degree outputs by the function output of the circuit 234. A computer 238 which is arranged to add to the current rate a rate change obtained as a result of logic. This computing operation corresponds to the operation of adding currents by the resistor blocks of FIG. 15. Output circuits 239 have functions for "outputting a larger value accordingly as the measured distance value is farther than the center measured distance value" like in the case of the output circuits 82 and 83 of FIG. 15. Multipliers 241 are arranged to perform multiplying actions corresponding to the "and" included in the same logic conditions as those of the multipliers 132 and 135 of FIG. 15. An output circuit 242 has a function for changing the rate on the basis of the same logic as that of the resistor blocks 206 and 401 of FIG. 15. A computer 243 is arranged to multiply the degree outputs of the circuits 241 by the function output of the circuit 242. A computer 245 is arranged to change the value of rate with the output of the computer 243.

The ensuing operation of the arrangement of FIG. 19 is similar to that of the arrangement of FIG. 15 and one of the measured distance value is eventually output as lens driving information.

Again referring to FIG. 19, the arrangement is described according to the Fuzzy theory as follows: The output circuits 230, 239 and 240 correspond to condition membership functions in the Fuzzy rules. The output circuits 234 and 242 are consequent membership functions. In the above-stated arrangement, the computing operations of the computers 235, 236, 237, 243 and 244 are performed in accordance with the method of Larsen to obtain the consequent membership functions from the condition membership functions. The convolution of rules performed by the computers 238 and 245 corresponds to computation of an algebraic sum. (While a simple adding operation is performed by the arrangement described, a maximum value "1" must be computed, in theory.) Further, an algebraic product is used for the composition of conditions performed by the multiplier 241.

Other effective methods include, for example, the method listed below (an excerpt from a thesis of Mr. Mizumoto of Osaka Electric Communication College, disclosed at the 5th Knowledge Engineering Symposium):

| Product obtaining operation: | |
|---|---|
| Logical product: | $X \cap Y = \min(X, Y)$ |
| Algebraic product: | $X \cdot Y = X * Y$ |
| Bounded product: | $X \odot Y = \max(0, (X + Y - 1))$ |
| Drastic product: | $X \triangle Y =$ |
| | $X * Y$ (when $X = 1$ or $Y = 1$) |
| | $0$ (when $X \neq 1$ and $Y \neq 1$) |
| Sum obtaining operation: | |
| Logical sum: | $X \cup Y = \max(X, Y)$ |
| Algebraic sum: | $X \hat{+} Y = X + Y - X * Y$ |
| Bounded sum: | $X \oplus Y = \min(1, (X + Y))$ |
| Drastic sum: | $X \triangledown Y =$ |
| | $X + Y$ (when $X = 0$ or $Y = 0$) |
| | $0$ (when $X \neq 0$ and $Y \neq 0$) |

The computing operation methods for obtaining consequent membership functions from the condition membership functions, include a method of using sum obtaining operation in composing (combining) rules, i.e. a method of adding rates of probable correctness (adding "0" if totally unknown), which are as shown below:

$$\begin{cases} \text{Mamdani} \ldots Rc: \min(\mu_{A(uo)}, \mu_{B(v)}) \\ \text{Larsen} \ldots Rp: \mu_{A(uo)} * \mu_{B(v)} \\ \text{Bounded-Product} \ldots \\ \quad Rbp: \max(0, (\mu_{A(uo)} + \mu_{B(v)} - 1)) \\ \text{Drastic-Product} \ldots Rpd: \end{cases}$$

$$\begin{cases} \mu_{A(uo)} * \mu_{B(v)} \ [\text{at } \mu_{A(uo)} = 1 \text{ or } \mu_{B(v)} = 1] \\ 0 \ [\text{at } \mu_{A(uo)} \neq 0 \text{ and } \mu_{B(v)} \neq 0 \ 1] \end{cases}$$

Further, there are methods of using a product obtaining operation in composing (combining) rules. This is based on the following concept: In the event of a totally unknown part, "1" is used. The number of unknown parts decreases accordingly as conditions are established to give the consequent membership functions. The methods based on this concept includes:

$$\begin{cases} \text{Zadeh} \ldots \\ \quad Ra: \min(1, (1 - \mu_{A(uo)} + \mu_{B(v)})) \\ \text{Zadeh} \ldots \\ \quad Rm: \min(\max(\mu_{A(uo)}, \mu_{B(v)}), (1 - \mu_{A(uo)})) \\ \text{Standard-Sequence} \ldots \\ \quad Rs: \begin{cases} 1 \ (\text{at } \mu_{A(uo)} \leq \mu_{B(v)}) \\ 0 \ (\text{at } \mu_{A(uo)} > \mu_{B(v)}) \end{cases} \\ \text{Godel} \ldots \\ \quad Rg: \begin{cases} 1 \ (\text{at } \mu_{A(uo)} \leq \mu_{B(v)}) \\ \mu_{B(v)} \ (\text{at } \mu_{A(uo)} > \mu_{B(v)}) \end{cases} \\ \text{Boolean implication} \ldots \\ \quad Rb: \max((1 - \mu_{A(uo)}), \mu_{B(v)}) \\ \text{Gougen} \ldots R\Delta: \end{cases}$$

$$\begin{cases} 1 & (\text{at } \mu_{A(uo)} \leq \mu_{B(v)}) \\ \mu_{B(v)}/\mu_{A(uo)} & (\text{at } \mu_{A(uo)} > \mu_{B(v)}) \end{cases}$$

Figure 20:
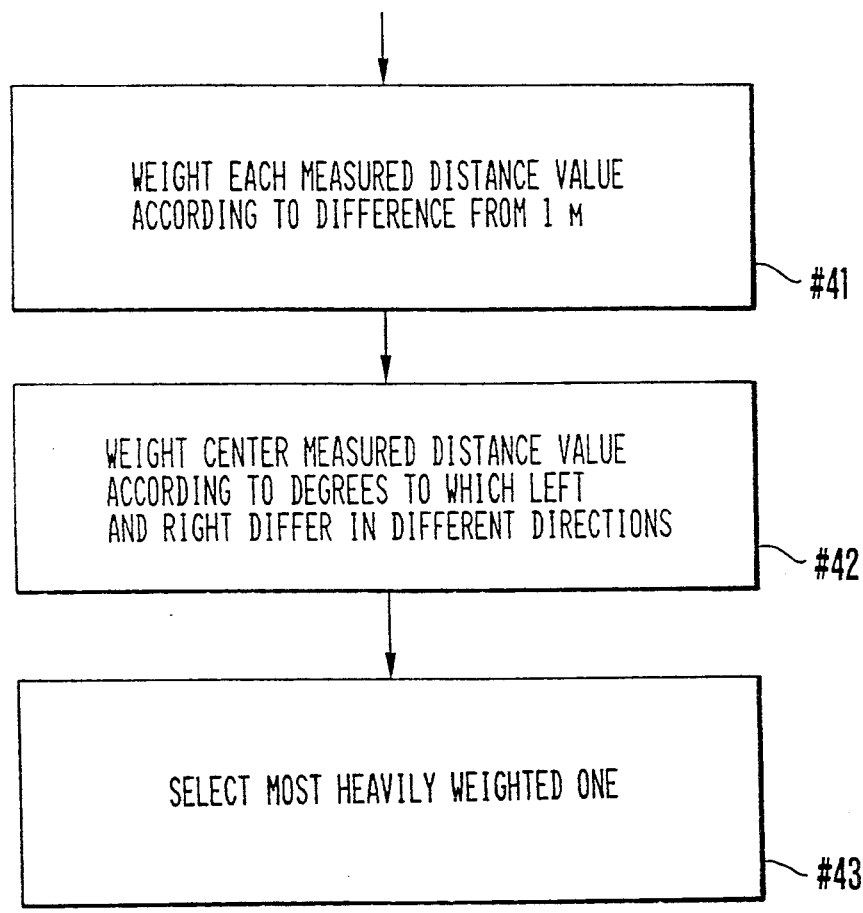
FIG. 20 is a flow chart showing the operation of the arrangement of FIG. 19 with a microcomputer included therein.

FIG. 20 is a flow chart showing the operation of the arrangement of FIG. 19 with a microcomputer, etc. included in the arrangement. Referring to FIG. 20, the flow of operation is as follows At a step #41: Weight is attached to each of the left, center and right measured distance values according to degrees to which they are deviating from 1 m. At a next step #42: The center measured distance value is weighted according to degrees to which the left and right measured distance values are deviating from the center measured distance value. At a step #43: Among these measured distance values, the most heavily weighted value is selected and output.

FIG. 21 describes the flow of operation of FIG. 20 according to the Fuzzy theory. In FIG. 21, a term "near distance" means the distance of 1 m as mentioned in the foregoing and is a function which takes a maximum value of "1". A function $\alpha$ gradually takes "0 to 1" for 0 to 100%. A function $\beta$ somewhat acutely takes, for example, 0 to 1 for 50 to 100%. The strengths of two logics are differentiated from each other by a difference between the functions $\alpha$ and $\beta$.

The details of the operation of FIG. 21 are as follows: At a part corresponding to the step #41: The left, center and right measured distance values are respectively weighted according to the degrees to which they are close to the near distance 1 m. Then the rate of probable correctness of each measured distance value is computed with the function $\alpha$ to obtain variables LR, CR and RR. At a step corresponding to the step #42: Weight is further attached to the center measured distance value according to the degree to which the difference of the center measured distance value from the left and right measured distance values is large and positive (i.e. the degrees to which the left and right measured distance values deviate from the center measured distance value, or relative relations of the left, center and right measured distance values in respect to far (near), medium, and near (far) distances. Then, the rate of probable correctness of the weighted center measured distance value is computed with the function $\beta$ to obtain the variable CR. At a part corresponding to the step #43: Among the weighted variables LR, CR and RR, the most heavily weighted one is selected and output.

Figure 22:
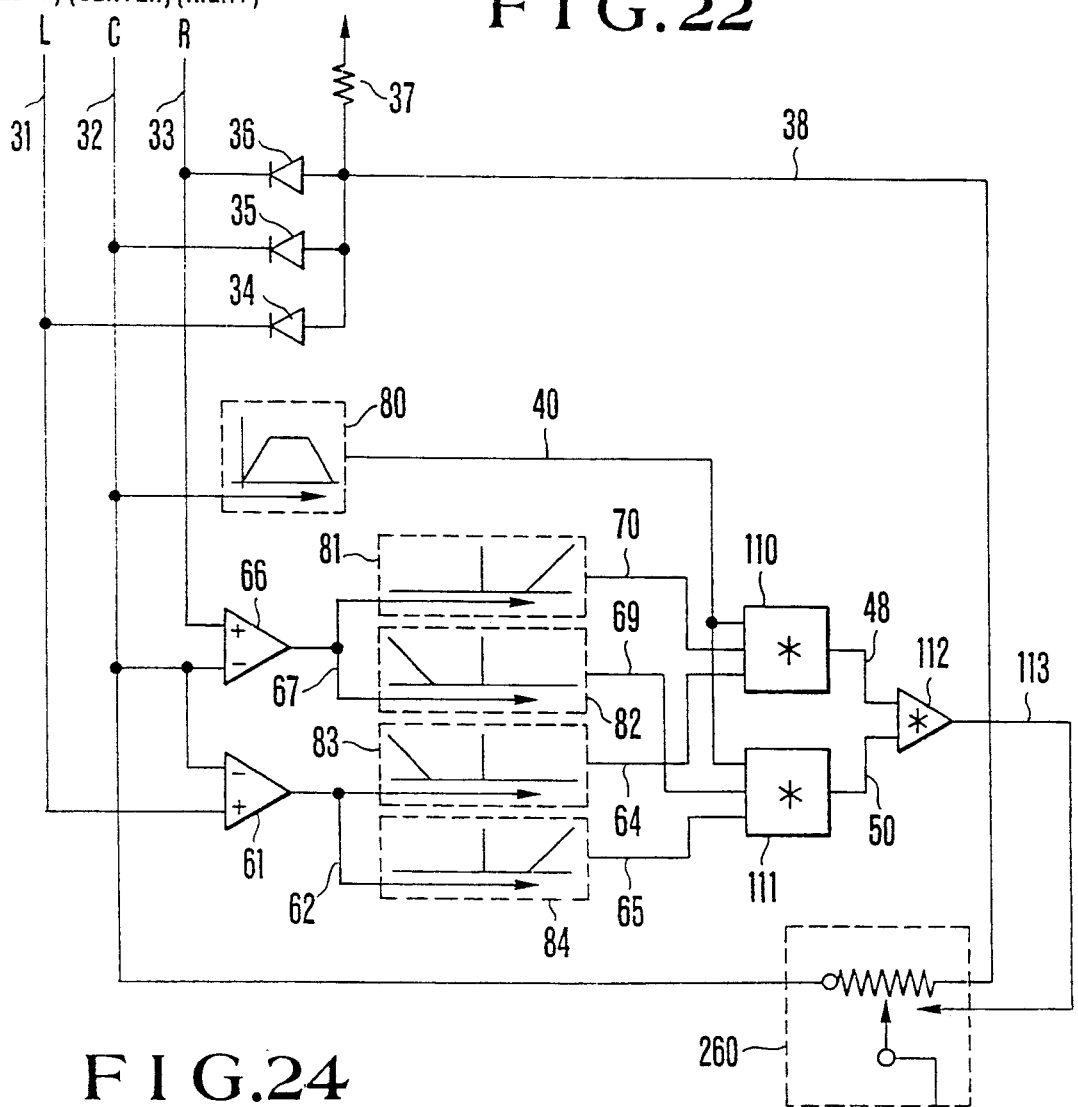
FIG. 22 is a circuit diagram showing a circuit arrangement for obtaining an intermediate value through an analog computing operation using a distance difference for the embodiment shown in FIG. 1.

In all the examples described, one of the distance values obtained from the left, center and right distance measuring areas is selected as a result of distance measurement. In the following, however, a method of employing an intermediate value between these measured distance values as the result of distance measurement: FIG. 22 shows an arrangement for carrying out this method. This arrangement is described as a modification of the analog computing arrangement of FIG. 5.

The use of the signal line 113 for the center measured distance value gives a signal showing a better rate. Therefore, a value between the center measured distance value and a distance value nearest thereto is produced in an analog manner according to the result obtained from the signal line 113. A variable resistor 260 is provided for this purpose. The resistor 260 is arranged to select the nearest measured distance value obtained from the signal line 38 when the level of the signal line 113 is zero and to select the center measured distance value obtained from the output line 32 when the signal line 113 is at a maximum level. The variable resistor 260 thus operates in a servo-like manner according to the level of the signal line 113. When the signal line 113 is at a medium level, the resistor 260 produces an intermediate distance value between the nearest distance value and the center measured distance value.

The selection of an intermediate value in this manner might bring both distance measuring concerned out of focus in the event of shallow depth of field. However, ordinary photographing operations generally have a certain depth of field to give a good picture with both areas in focus.

FIG. 23 shows a circuit arrangement which is a modification of the arrangements of FIGS. 8 and 14 and is arranged to output an intermediate value. Referring to FIG. 23, the processes of operation up to the computation of the rates of the signal lines 129, 130 and 131 are about the same as in the preceding example. This arrangement includes a normalizing circuit 261, which is arranged to normalize the signals of three rates and to output the normalized signals to three signal lines 262, 263 and 264, in such a way as to make the total of these three rates into "1". Multipliers 265, 266 and 267 are arranged to multiply the measured distance values by these three normalized signals. The outputs of the multipliers 265, 266 and 267 are supplied to an adder 268 to obtain a weighted average of the measured distance values. The weighted average value is output as lens driving information. The arrangement thus makes a synthetic or integral judgment on the three measured distance values to give a picture which is in focus all over.

Figure 24:
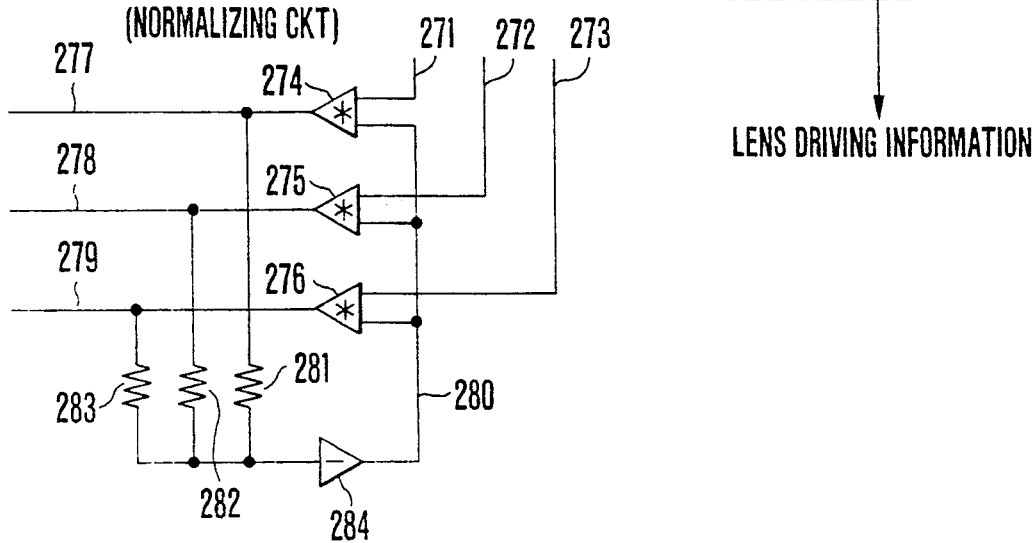
FIG. 24 is a circuit diagram showing by way of example a normalizing arrangement for the circuit of FIG. 23.

FIG. 24 shows by way of example the details of the above-stated normalizing circuit 261 of FIG. 23. Reference numerals 271, 272 and 273 denote positive rate signals. Multipliers 274, 275 and 276 multiply these rate signals by the signal of a signal line 280. The results of the multiplying actions are output to signal lines 277, 278 and 279. The three signals thus obtained are added together through resistors 281, 282 and 283. An inverting amplifier 284 is arranged to control the signal line 280 in such a way as to make the sum of these three signals into "1".

Figure 25:
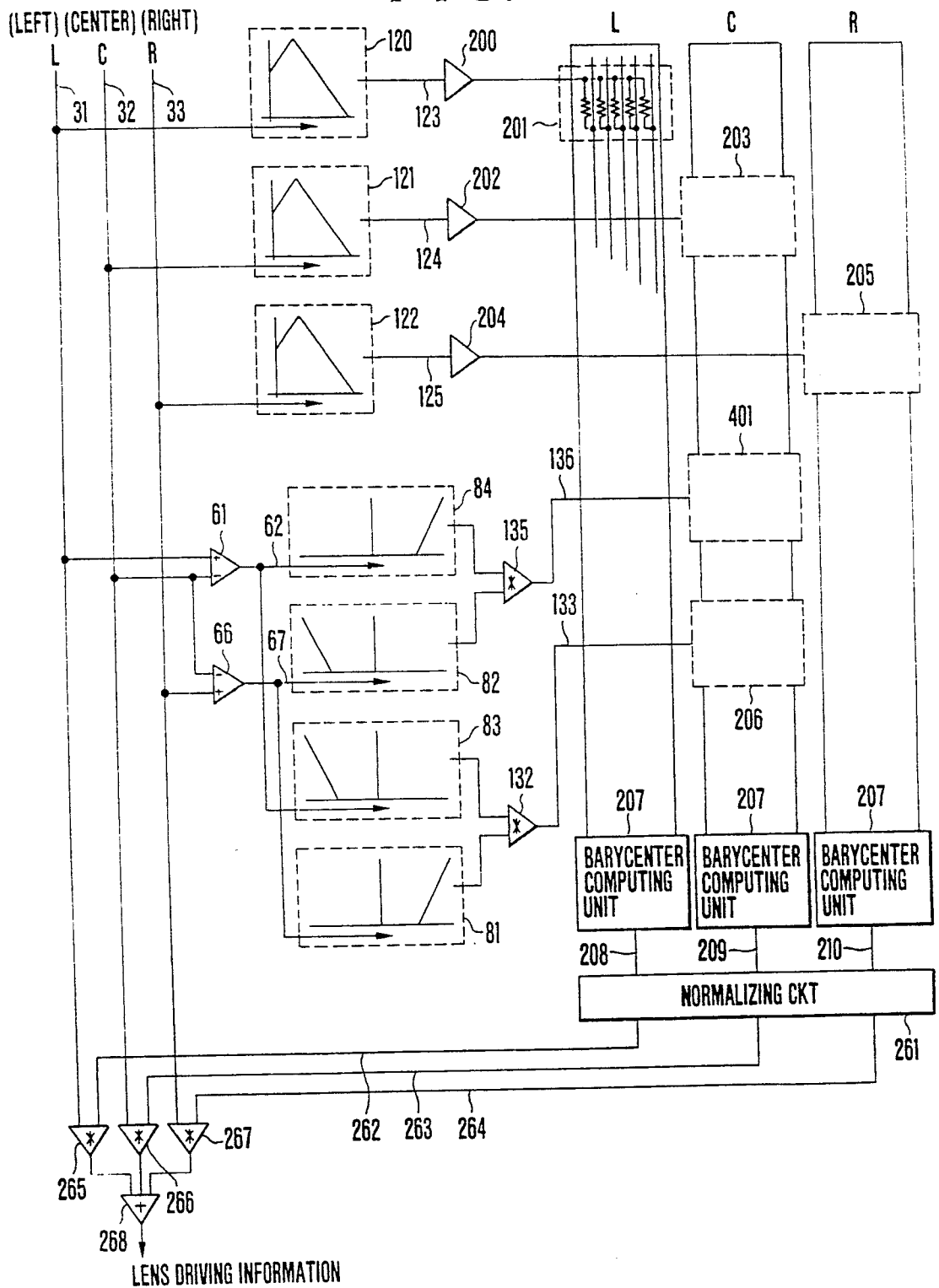
FIG. 25 is a circuit diagram showing by way of example a probability array arranged to obtain an intermediate value by using a distance difference for the embodiment of FIG. 1.

FIG. 25 shows a circuit arrangement which is arranged to output an intermediate value in computing the distribution probability in a manner as shown in FIG. 15. The circuit parts up to the part 210 are identical with those of FIG. 15. Parts 261 to 268 are arranged to obtain a weighted average value in the same manner as in the case of FIG. 23.

The arrangement to obtain a weighted average after completion of rate computation as in the cases of FIGS. 23 and 25 enables the device to give a correct output with the three values selected through the complex computing operation irrespectively of variations taking place in the rates of the three values.

The arrangements described in the foregoing eliminate the adverse effects of nearby obstacles such as the ground, etc. by means of the measured distance values and information on differences between them. However, information of other kinds are also usable as means for making an effective discrimination.

Figure 26:
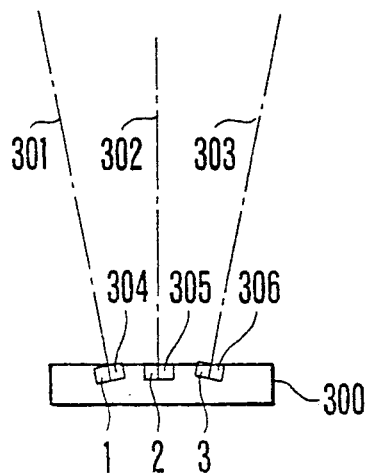
FIG. 26 shows by way of example the arrangement of the distance and light measuring units of another embodiment of the invention.

An example of arrangement for making the discrimination by means of a measured light value (brightness) is as follows: FIG. 26 shows by way of example the arrangement of a light measuring sensor of a camera. The illustration includes a camera body 300; and distance measuring units 1, 2 and 3 which are also shown in FIG. 1. The units 1, 2 and 3 are arranged to measure distances in the directions 301, 302 and 303 respectively. Known light measuring units 304, 305 and 306 are arranged to measure light also in the directions 301, 302 and 303.

Figure 27:
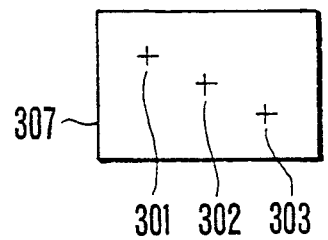
FIGS. 27 to 29 show examples of positions of distance measuring points arranged within the photo-taking picture plane of the same embodiment.
Figure 28:
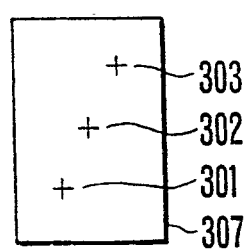

FIG. 27 shows a photographing frame of the camera in relation to the distance and light measuring directions. The measuring directions 301, 302 and 303 are arranged to be not only laterally spreading as shown but also vertically spreading relative to a photographing picture plane 307, because: In some cases, framing requires to have the picture plane in a vertical posture as shown in FIG. 28. The spreading arrangement of measuring directions then permits distance measurement in the lateral directions with the picture plane in the vertical posture.

For an improved degree of accuracy, the number of measuring points may be increased from three points to five or more points as shown in FIG. 28. However, the increase of measuring points is not easy in terms of cost and, therefore, should be determined according to the purpose for which the camera is designed. Meanwhile, the discrimination of a nearby obstacle such as the ground from other objects is necessary in all cases. In view of this, the following description is given on the assumption that the number of measuring points is three.

Figure 30:
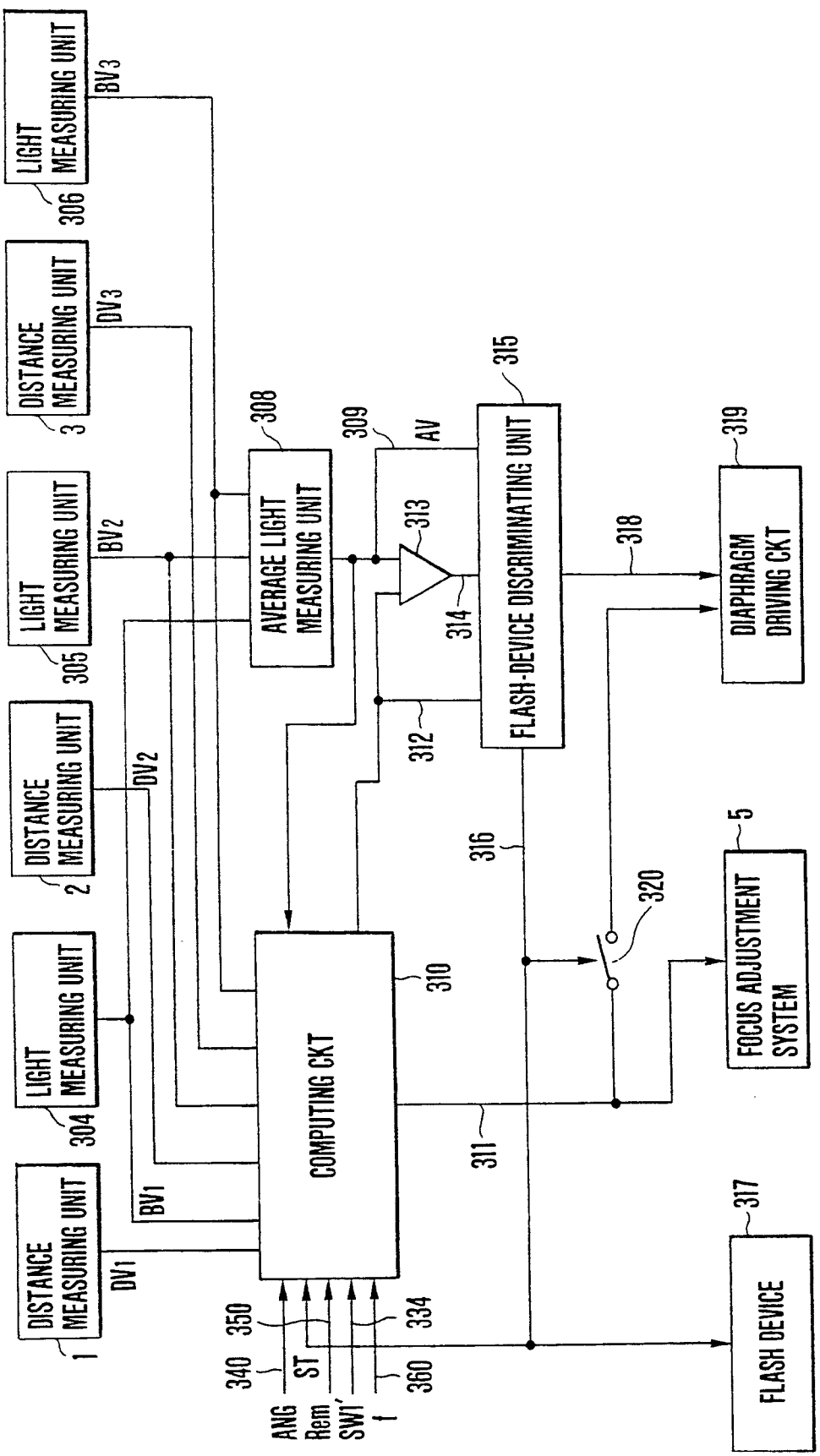
FIG. 30 is a block diagram showing in outline the arrangement of a further embodiment of the invention.

FIG. 30 shows by way of example the arrangement of the above-stated embodiment. In this case, the camera is controlled by measuring distances and brightness in three directions. An average light measuring unit 308 is arranged to obtain the average of three measured light values received from the light measuring units 304, 305 and 306. The average value is output to a signal line 309. A computing circuit 310 is arranged to selectively output a measured distance value as lens driving information. Compared with the arrangements described in the foregoing, the computing circuit 310 receives a greater number of inputs including the above-stated three measured light values and the average measured light value of the signal line 309 in addition to measured distance values.

FIG. 31 is a flow chart showing the operation of the above-stated embodiment with a microcomputer, etc. included in the arrangement described. Referring to FIG. 31, the operation is as follows: At a step #51: The left, center and right measured distance values are weighted according to degrees to which they deviate from 1 m. At a step #52: The center measured distance value weighted according to degrees to which the left and right measured distance values differ from the center measured distance value. At a step #53: If one of the left and right measured distance values indicates a near distance and if the brightness of the other side is high, the one measured distance value is weighted according to the degree of brightness of the other side, because: In a case where one side is at a near distance and the brightness obtained in the direction of the opposite side is higher than an average degree of brightness, there is a high degree of possibility that the opposite side might be directed to a sky while the above-stated one side is directed to the ground. At a step #54: Among the weighted measured distance values, the value most heavily weighted is selected and output.

FIG. 32 is a description of the flow of FIG. 31 in accordance with the Fuzzy theory. The parts of the description corresponding to the steps #51, #52 and #54 of FIG. 31 are the same as the steps #41, #42 and #43 of FIG. 21. The details of these parts are omitted. A part corresponding to the step #53 is as follows: For example, with the weighted right measured distance value as it is close to the near distance, if the left measured light value is brighter than an average brightness, the weighted value of the variable RR is reduced by the use of a function $\gamma$.

FIG. 33 shows by way of example consequent membership functions indicated by $\alpha$, $\beta$ and $\gamma$. Referring to FIG. 33, the function indicated by $\beta$ is a function which is near to 100% representing "a considerably high degree of likeliness" and is used for removing the influence of the ground from the distance difference. The function indicated by $\gamma$ is a nearly flat function which indicates a weak denial "somewhat unlikely" and is used for the purpose of removing something like the ground from the brightness. The computing circuit 310 of FIG. 30 acts according to the above-stated concept to selectively output information on a measured distance to a likely main object and supplies it to a signal line 311 for causing an AF driving (automatic focus adjustment) system 5 to adjust the focal point of the lens. Further, by this action, the left, center and right measuring areas are checked to find which of them is indicating a likely main object. The circuit 310 outputs to another signal 312 one of the left, center and right measured light values which is obtained from the direction of the likely main object by a selecting arrangement similar to the distance selecting arrangement. A comparator 313 is arranged to compare the measured light value obtained from the direction of the likely main object with an average measured light value. If the former is much darker than the latter, the comparator 313 produces a high level signal indicating a possible back-lighting condition. A flash-device discriminating unit 315 is arranged in a known manner to cause a flash device 317 to flash by outputting a high level signal to a signal line 316 in the event of a back-lighting or dark condition. Under other conditions, the unit 315 instructs, through a signal line 318, a diaphragm driving system 319 to obtain an apposite aperture value according to the automatic light measurement. Further, an analog switch 320 is arranged to control the diaphragm driving system 319 to make its action commensurate with the flash device 317 when the flash device 317 is to be operated. The arrangement enables the camera to correctly perform distance and light measuring operations even when the main object is located in a part other than the center of the picture plane or when the object is under a back-lighting condition.

Figure 34:
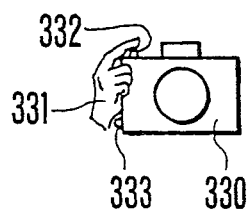
FIGS. 34 and 35 are illustrations showing a shutter release operation to be performed with a camera held in vertical and horizontal postures.
Figure 35:
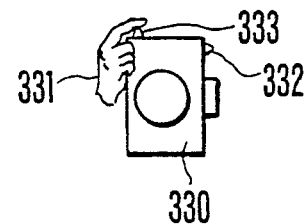

While the brightness of the object is utilized in the arrangement described above, an example where an input other than brightness is described below:

FIGS. 34 and 35 are illustrations provided for description of a further embodiment. FIG. 34 shows the camera as in a state of being held sidewise. The camera 330 is held by one hand 331. A release button 332 is used for photographing in this posture. FIG. 35 shows the camera as in a state of being held longwise. The camera can be gripped likewise. Another release button 333 which is provided for use in this instance facilitates a release operation.

The use of the release button 333, therefore, means vertical photographing. In this case, there is a strong possibility of measuring the ground with the left distance measuring point as indicated by the reference numeral 301 of FIG. 28. In other cases, it is highly possible that the right distance measuring point is measuring the ground as indicated by the numeral 303 of FIG. 27. A signal SW1 indicating the use of this release button 333 is arranged to be supplied via a signal line 334 of FIG. 30 to the computing circuit 310 for selection of the distance measuring point.

Figure 36:
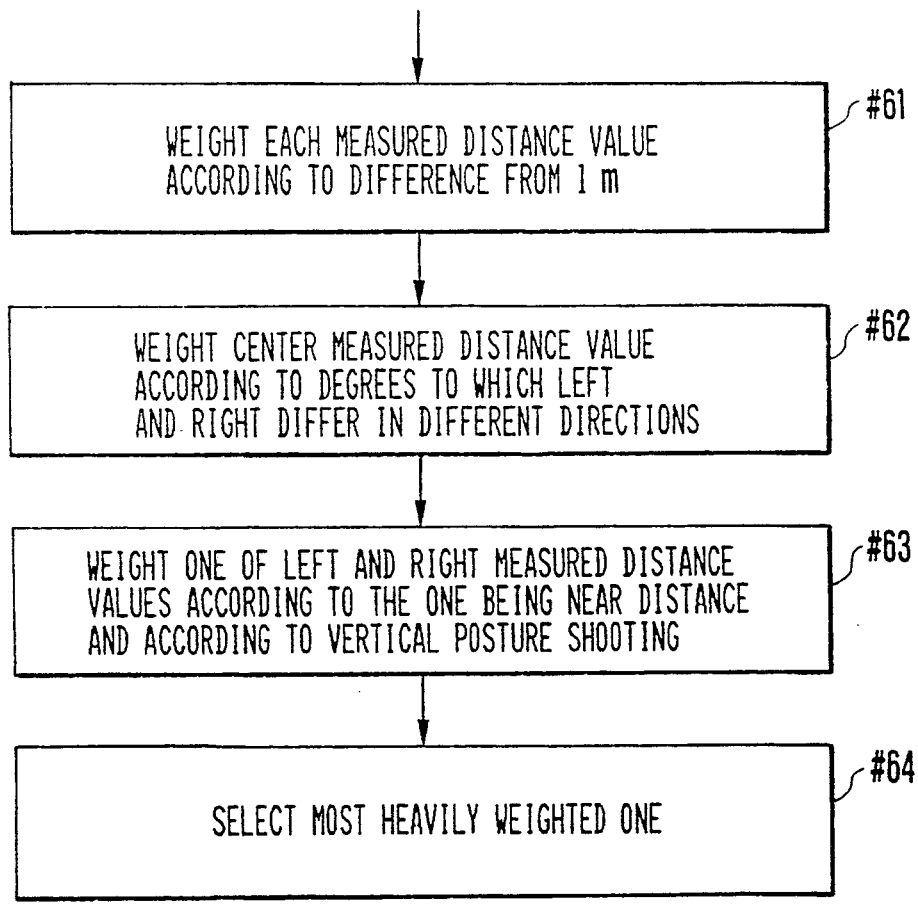
FIG. 36 is a flow chart showing the same operation.

FIG. 36 is a flow chart showing the operation of the computing circuit 310 performed with a microcomputer, etc. included therein for a discrimination between the use or nonuse of the release button 333 for photographing. The flow of operation is as follows: At a step #61: Each of the left, center and right measured distance values is weighted according to how much the value differ from 1 m. At a next step #62: The center measured distance value is weighted according to the degrees to which the left and right measured distance values are deviating from that of the center measured distance value. At a step #63: If the measured distance value of one side indicates a near distance, the value of that side is weighted according to whether the camera is in the vertical photographing posture. The reason for this step: If one side indicates a near distance in the event of the vertical photographing, that side is probably measuring a distance to the ground. Therefore, value of that side is weighted on the basis of this possibility. At a step #64: Among the weighted measured distance values, the most heavily weighted distance value is selected and output.

FIG. 37 shows a description of the flow of FIG. 36 according to the Fuzzy theory. At parts corresponding to the steps #61, #62 and #64 are similar to the steps #41, #42 and #43 of FIG. 21 and thus require no detailed description. At a part corresponding to the step #63: Even when the right measured distance value, for example, is heavily weighted on account of its closeness to the near distance, the weight attached by the variable RR is reduced by the function γ, on the basis of the above-stated inference, if the camera is then in the vertical photographing posture.

Figure 38:
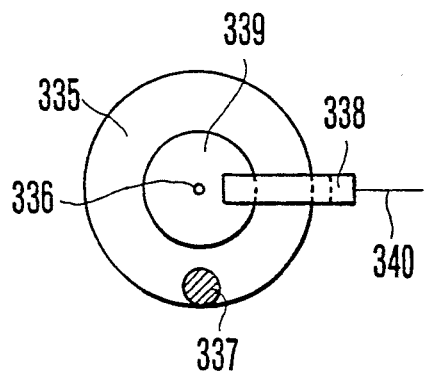
FIG. 38 shows a mechanism arranged to give information on other postures of the camera.

FIG. 38 shows an example wherein a different arrangement is used in making a discrimination between a normal vertical posture and inversely vertical posture. Referring to FIG. 38, a disc 335 is arranged to rotate on a shaft 336. A weight 337 is provided at a part of the rotary disc and is arranged to be in a lower position. A non-contact type encoder 338 is secured to the camera. The posture of the camera is detectable by reading the code of a code disc 339 which is coaxial with the disc 335. Posture information ANG from the encoder 338 is supplied via a signal line 340 to the computing circuit 310 of FIG. 30. This enables the device to correctly detect "the direction of the likely ground", even in the event of the inversely vertical posture, without recourse to the use of an operation member like in the case of the preceding example.

Figure 39:
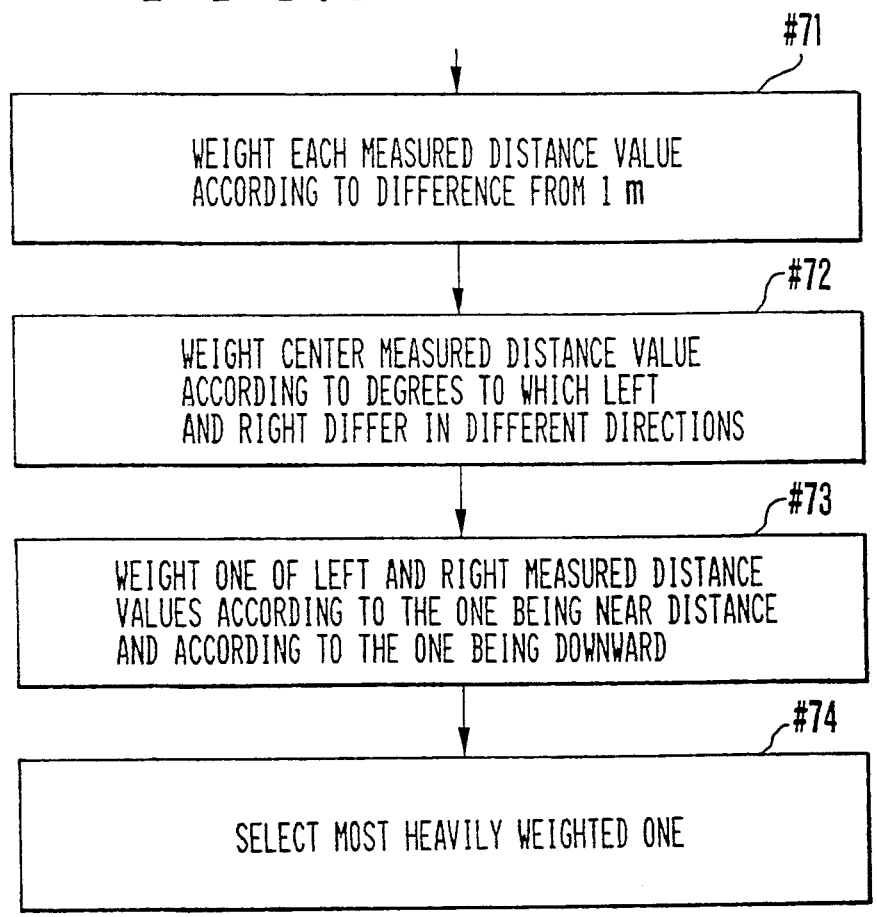
FIG. 39 is a flow chart showing the operation of the same mechanism.

FIG. 39 is a flow chart showing the operation of the above-stated computing circuit 310 to be performed with angle signals and with a microcomputer, etc. included in the circuit 310. The flow of operation is as follows: At a step #71: Each of the left, center and right measured distance values is weighted according to how much it differs from 1 m. At a step #72: The center measured distance value is weighted according to degrees to which the left and right measured distance values differ from the center measured distance value. At a step #73: In a case where the measured distance value of one side indicates a near distance, this value is weighted according to the photographing posture of the camera. This step is provided for weighting according to whether or not the camera is in the vertical posture according to the same inference as mentioned in the preceding embodiment. At a step #74: Among the measured distance values, the most heavily weighted value is selected and output.

FIG. 40 is a description of the flow of FIG. 39 according to the Fuzzy theory. Parts corresponding to the steps #71, #72 and #74 are similar to the steps #41, #42 and #43 of FIG. 21 and thus no further description of them is required here. A part corresponding to the step #63: In a case where the right measured distance value, for example, is weighted as it indicates a near distance, if the right distance measuring direction is lower than the left distance measuring direction, the weight attached by the variable RR is reduced by means of the function γ according to the same inference as mentioned in the foregoing. In other words, the possibility of the ground is determined by two rules according to binary information about which of the left and right sides is lower than the other.

Figure 29:
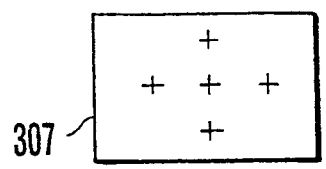

Further, an obstacle which is most likely the ground can be likewise eliminated in the case of measuring distances in five directions like in the case of FIG. 29.

Next, an example of using a somewhat different kind of information based on the Fuzzy theory in selecting a measured distance value is described below:

Again referring to the arrangement of FIG. 30, for the measured distance selection to be made by the computing circuit 310, the information ST about the use or nonuse of the flash device is added via the signal line 316 to the inputs of the circuit 310. The distance selecting logic can be changed on the basis of this additional input. The output of the flash device 317 is limited. If the object to be photographed is located at a far distance from the camera, the object cannot be adequately photographed as the photographable distance is limited to a medium distance because of insufficient quantity of light. Therefore, for a photograph, the lens is preferably focused for a range up to a distance reachable by the flash light (reachable distance).

Figure 41:
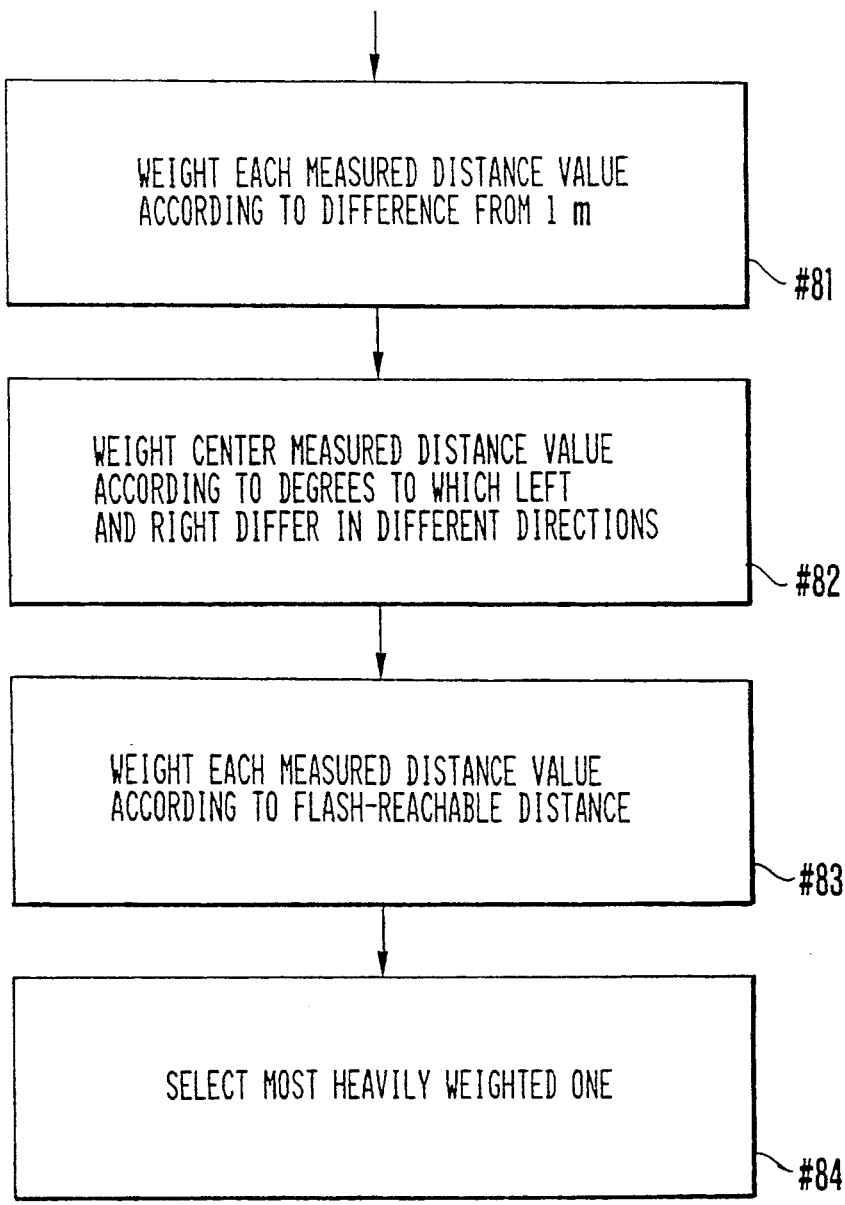
FIG. 41 is a flow chart showing the operation of an embodiment of the invention arranged to use information on the use or nonuse of a flash device.

FIG. 41 is a flow chart showing the operation of the computing circuit 310 performed on the basis of the above-stated concept with a microcomputer, etc. included in the computing circuit 310. The flow of operation is as follows: At a step #81: Each of the left, center and right measured distance values is weighted according to degrees to which the measured value deviates from 1 m. At a step #82: The center measured distance value is weighted according to degrees to which the left and right measured distance values differ from that of the center measured distance value. At a step #83: Each of the measured distance values is weighted according to whether the distance is reachable by the flash light. The reason for this step is as follows: As mentioned in the foregoing, the lens is preferably focused within the range of distances reachable by the flash light. Therefore, weight is attached according to the reachable distance. At a step #84: Among the measured distance values, the most heavily weighted value is selected and output.

FIG. 42 shows a description of the flow of FIG. 41 based on the Fuzzy theory. Parts corresponding to the steps #81, #82 and #84 of FIG. 41 are similar to the steps #41, #42 and #43 of FIG. 21 and, therefore, the details of them are omitted from the following description. At a part corresponding to the step #83: The weight attached to, for example, the right measured distance value and computed according to whether the measured value is close to the near distance is increased by a function δ accordingly as the right measured distance value is closer to the flash light reachable distance.

Figure 43:
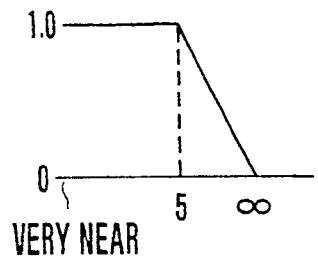
FIG. 43 shows a membership function for a reachable distance to be used for other embodiments of the invention.
Figure 44:
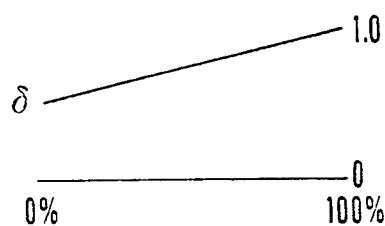
FIG. 44 shows a weakly affirmative membership function to be used for other embodiments.

The term "reachable distance" as used above is a membership function which becomes zero at a distance exceeding 5 m as shown in FIG. 43. The consequent δ is preferably a membership function which indicates a weak affirmation as shown in FIG. 44.

A remote-control receiving signal Rem which is to be supplied via a signal line 350 as shown in FIG. 30 is under a condition similar to the above-stated condition. Some cameras are arranged to have the shutter releasable by means of a remote-control device like in the case of a TV receiver. Like the flash device 317, the remote-control device has a limited reachable distance. Therefore, it is highly possible that the object is located within the reachable distance when an instruction is received. The flow of operation, therefore, can be executed in about the same manner with the part "flash device is lighted" of the description of FIG. 42 replaced with "remote-control signal is received".

Figure 45:
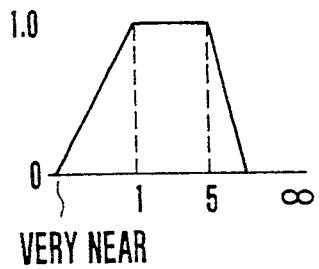
FIG. 45 shows a membership function for a remote-control received signal.

FIG. 45 shows another example of the membership function of the reachable distance obtained when the remote-control device is used. The remote-control device is usually used at a distance between 1 m and 5 m or thereabout. Therefore, the fact that the use of the remote-control device at a distance less than 1 m is abnormal would serve to prevent a faulty operation at a distance less than 1 m.

Therefore, a parameter for "frequently used distance" can be included in this manner as desired.

Figure 46:
FIGS. 46 to 48 show membership functions based on distance differences.

An example wherein information of another kind according to the Fuzzy theory is described as follows:

In each of the foregoing examples, the membership function for a distance difference from the center measured distance value which is output from the output circuit 239 of FIG. 19 is arranged to increase accordingly as the difference is greater than a difference of 2 m as shown in FIG. 46. In actual evaluation, however, if the aperture is small or if the focal length of the phototaking lens is small to give a deep depth of filed, a difference by 2 m or thereabout makes no difference in focusing. Under such a condition, the difference might remain inconspicuous until the difference exceeds 3 m.

Figure 47:
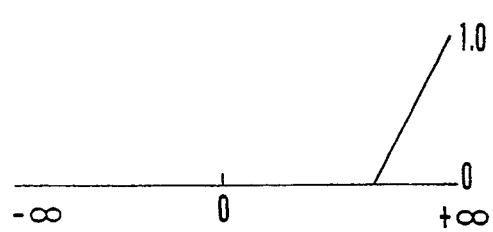
Figure 48:
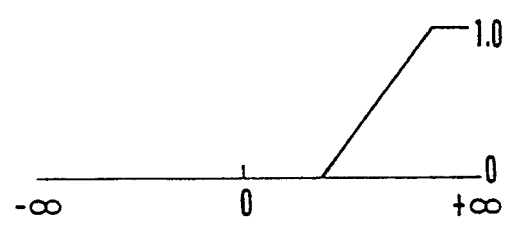
Figure 49:
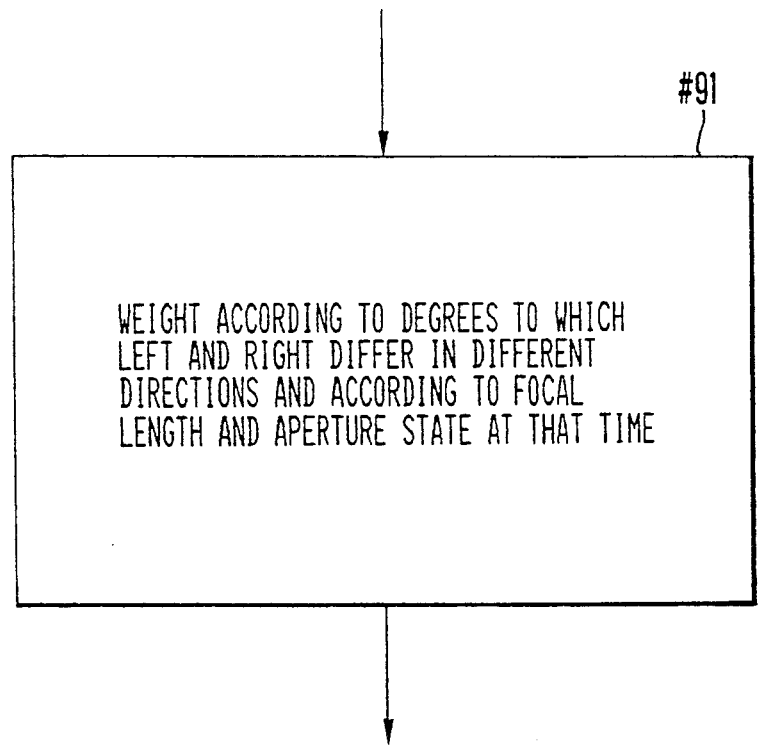
FIG. 49 is a flow chart showing an operation performed by using aperture-value or focal-length information.

Therefore, the membership function for the above-stated distance difference is preferably switched to a state of being insensitive to the distance difference, as shown in FIG. 47, in selecting the measured distance at the computing circuit 310 of FIG. 30, in a case where the membership function is stopped down further than F8 or the focal length is less than 50 mm according to an aperture signal AV received through a signal line 309 or focal length information f received through a signal line 360. Further, conversely, the membership function is preferably switched to a state of being sensitive to the distance difference as shown in FIG. 48 in the event of an aperture which is not much stopped down or in the event of a long focal length of the lens.

The above-stated concept can be simply carried out by replacing one membership function with another according to the above-stated conditions.

In another method for carrying out the above-stated concept, distance differences are multiplied by a value "focal length X aperture value" to make their blurring degrees on the film equal to each other before introducing them into the membership function. This method is more easily introducible for the general logic.

The introduction of this relation according to the Fuzzy theory is made in the following manner:

As shown in FIG. 50, two channels of inference formulas are prepared according to the longness or shortness of the focal length. Then, membership functions are prepared as shown in FIG. 46 for "positive and large" and as shown in FIG. 48 for "positive and extra-large". A reference numeral 361 of FIG. 51 denotes a function which becomes "1" at the maximum focal length in the case of a "long" focal length. A numeral 362 of FIG. 51 denotes a function which becomes "1" at the minimum local length in the case of a "short" focal length. A numeral 363 of FIG. 52 denotes a trapezoidal function which is provided for the "full aperture" side of the aperture and becomes "1" at aperture values located on the full aperture side of a certain aperture value. A numeral 364 of FIG. 52 denotes a trapezoidal function which is provided for the "stopped-down" side of the aperture.

Figure 51:
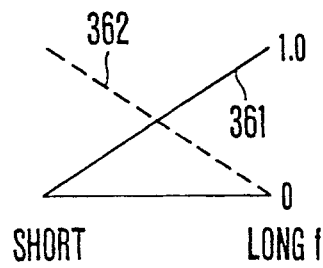
FIGS. 51 and 52 show membership functions of the aperture-value or focal-length information.
Figure 52:
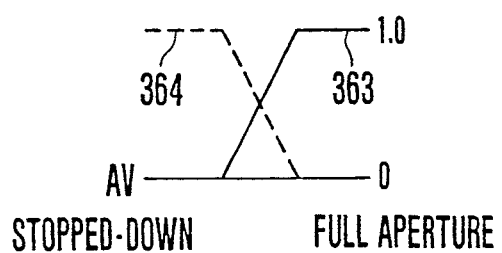

The preparation of functions in two channels for the conditions of focal length and aperture as mentioned above necessitates a switching action at a specific focal length in accordance with the binary logic. However, in the case of the Fuzzy logic, the two channels of functions work as if to obtain the weighted means of the conditions and, as shown in FIGS. 51 and 52, the functions correctly work without complementary branching conditions.

Figure 53:
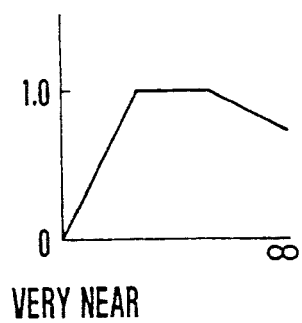
FIGS. 53 and 54 show membership functions for different focal lengths.
Figure 54:
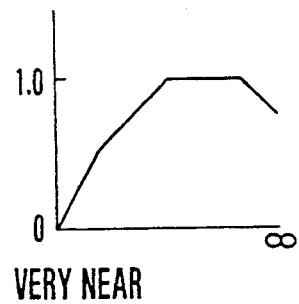
Figure 55:
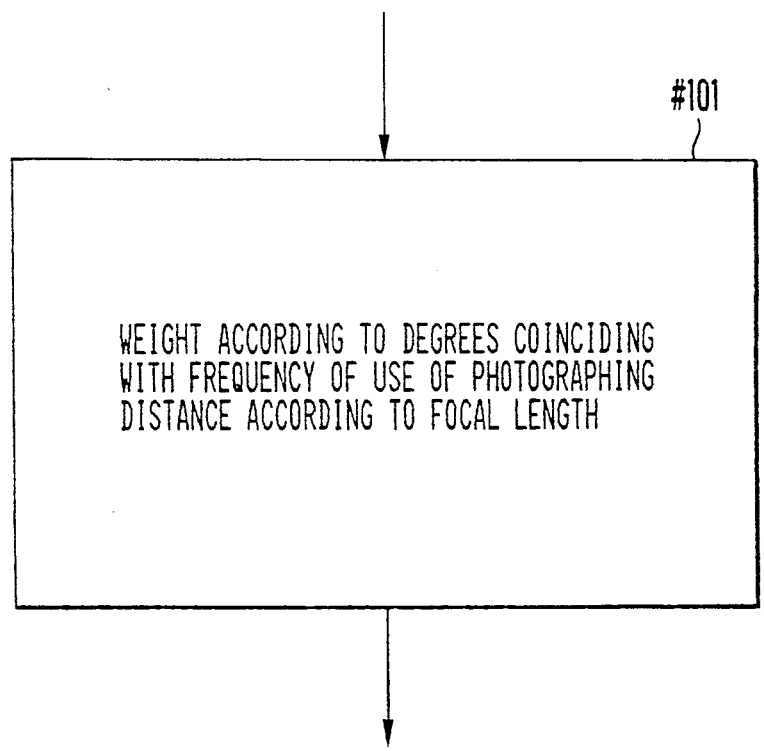
FIG. 55 is a flow chart showing an operation performed by using a focal length-using frequency for an embodiment of the invention.

Generally, the frequency of use of photographing distance varies with the focal length. FIG. 53 shows an example of the frequency obtained with generally employed focal lengths. FIG. 54 shows an example of the frequency obtained with telephoto focal lengths. FIG. 55 is a flow chart showing an operation performed according to the above-stated frequency by means of a microcomputer, etc. The operation is as follows: At a step #101: Weight is attached to a degree coinciding with the frequency of the use of photographing distances according to the focal length. For example, in a case where the frequency of use of the left distance measuring area at a short focal length, the left measured distance value is heavily weighted if the focal length currently in use is short.

The embodiment described above is arranged to measure distances through the left, center and right distance measuring points of the photographing picture plane; to judge the possibility of that the measured distance values is a distance to an obstacle such as the ground or the like on the basis of information on a difference between measured distances, information on the posture of the camera and information on measured light values obtained for the distance measuring points; to determine the degree of weight to be attached to the measured distance information by taking into consideration the result of the judgment in computing lens driving information. The arrangement thus enables the lens to be driven and controlled in a manner apposite only to the object to be photographed. Therefore, photographing can be accomplished to obtain a sharply focused picture.

Further, since the above-stated actions are automatically performed, a picture can be taken with the object in focus even when framing is freely selected. In addition to that advantage, the embodiment also permits adequate exposure control. In other words, the embodiment gives an automatic focusing camera which is capable of correctly focusing and adequately controlling an exposure without requiring the attention of the photographer to the distance measuring field.

Figure 57:
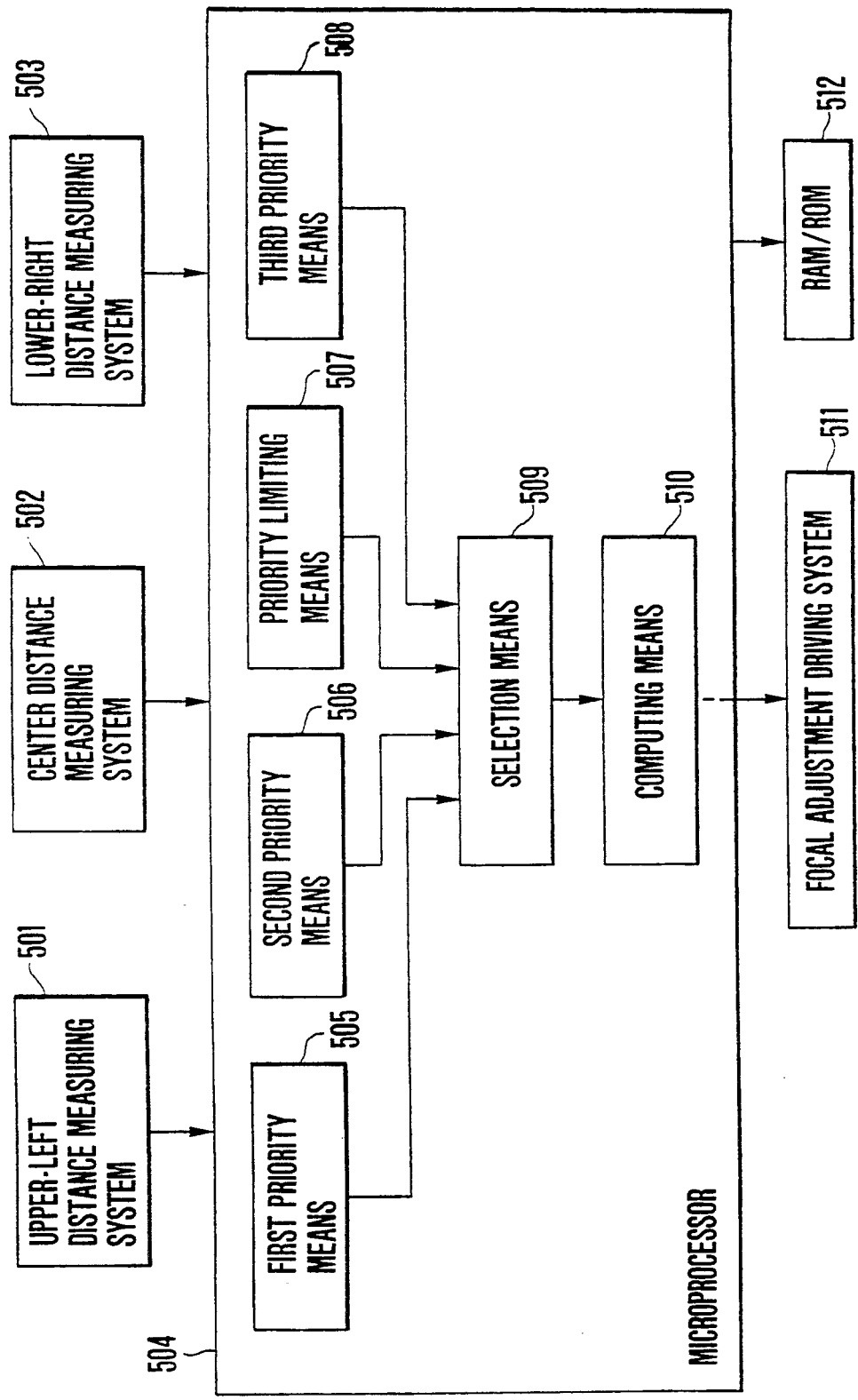
FIG. 57 is a block diagram showing a further embodiment of the invention.

Next, an embodiment of the invention wherein the Fuzzy theory is furthered is described in detail below:

FIG. 57 shows the fundamental arrangement of the embodiment. Measured distance values obtained from an upper-left distance measuring system 501, a center distance measuring system 502 and a lower-right distance measuring system 503 which are arranged for a viewfinder field which will be described later are supplied to a 4-bit microprocessor 504. The microprocessor 504 is arranged as follows: A first priority means 505 is arranged to give priority to the measured distance value which indicates the nearest distance among the values obtained by the distance measuring systems 501 to 503. The first priority means 505 produces the result of giving priority or the degree of priority given. A second priority means 506 is arranged as follows: In a case where the measured distance value of one of the distance measuring systems other than the center distance measuring system 502, say, the lower-right distance measuring system 503 (hereinafter referred to as the right measured distance value) indicates the nearest distance, the means 506 gives priority to the measured distance value of the center distance measuring system 502 (hereinafter referred to as center measured distance value) if the center measured distance value indicates a medium distance while that of the upper-left distance measuring system 501 (hereinafter referred to as left measured distance value) with these values being in a near-medium-far relationship. The second priority means 506 then produces the result of giving priority or the degree of the priority. A priority limiting means 507 is arranged as follows: In a case where the center measured distance value and another measured distance value or, for example, the right measured distance value are close to each other and one of them is the nearest distance, other measured distance value or, for example, the left measured distance value is lightly considered. The priority limiting means 507 then produces the result of the light consideration or a reduced degree of priority. A third priority means 508 is arranged as follows: In a case where both the left and right measured distance values indicate very near distance and the center measured distance value indicates a relatively far distance, the third priority means 508 allows the center measured value to have priority over the left and right measured distance values. If the left and right measured distance values indicate near distances while the center measured distance value indicates a relatively far distance, the third priority means 508 allows the left and right measured distance values to have priority over the center measured distance value and produces the result of giving the priority or the degree of priority given.

Selection means 509 is arranged to select one of the measured distance values having the highest priority or the highest degree of priority among the measured distance values on the basis of the outputs of the priority means 505, 506 and 508 and the priority limiting means 507. A computing means 510 is arranged to compute and obtain lens driving information from the measured distance value selected by the selection means 509. The lens driving information then causes a focus adjustment driving system 511 to focus the lens on an appropriate distance point for photographing.

A RAM/ROM 512 is arranged to record the program and constants of the microprocessor 504 and to temporarily store the outputs or the means 505 to 510.

Figure 58:
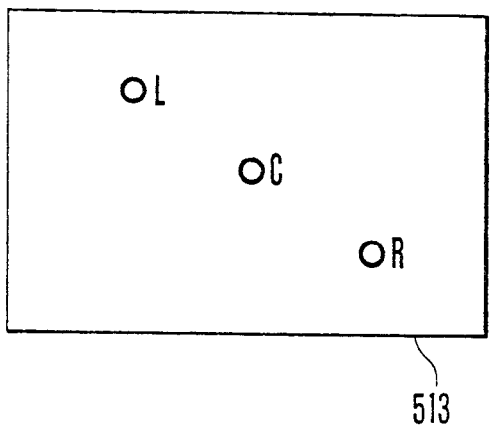
FIG. 58 shows distance measuring areas arranged within the viewfinder of the same embodiment.

FIG. 58 shows the distance measuring areas L, C and R of the above-stated upper-left distance measuring system 501, the center distance measuring system 502 and the lower-right distance measuring system 503 in relation to a viewfinder field 513.

With the embodiment arranged in the above-stated manner, the embodiment operates as follows: The first priority means 505 computes basic near distance priority. The second priority means 506 computes center measured distance value priority for removal of a nearby obstacle. The priority limiting means 507 computes the lightly consideration of the far distance of a distance measuring area which has a great degree of possibility of deviating from the object to be photographed in the event of a close-up shot. Further, the third priority means 508 computes priority for removal of any nearby obstacle and also priority for preventing the disappearance of the center area. The results of these computing operations are subjected to overall judgment to select one of them. This arrangement serves to enhance the accuracy of elimination of nearby obstacles.

Before entering into details of this embodiment, the Fuzzy rules of FIG. 21 are again described below:

The fuzzy rules of FIG. 21 include rules "a" to "e". The rules "a" to "c" are provided for computation with priority given to the basic near distance. The rules "d"

and "e" are provided for computation with priority given to the center measured distance value in a case where the measured distance values are obtained in an oriented alignment in the order of a near distance, a medium distance and a far distance with the center measured distance value indicating a medium distance in the middle of the alignment.

Further, In the case of the rule "a", the left measured distance value is weighted according to the degree to which this distance is close to 1 m which is a near distance weighting datum point. Then, the possibility LR that the left measured distance value which is thus weighted correctly represents the object's distance is computed by means of the function $\alpha$. In the rules "b" and "c", the possibilities CR and RR that the center and right measured distance values correctly represent the object's distance are likewise computed.

The rule "d": The measured distance values are weighted according to the degrees to which a difference between the left and center measured distance values is positive and a large value and a difference between the right and center measured distance value is negative and a large value (the degree of far-medium-near interrelation of the left, the center and the right). Then, the possibility CR that the weighted measured distance value of the center distance measuring system 502 is the most correct distance value is computed by using the function $\beta$. The function $\beta$ is arranged to make the possibility greater than the function $\alpha$. The rule "e": The treatment of the left and right measured distance values in the rule "d" is conversed in the rule "e".

Figure 59C:
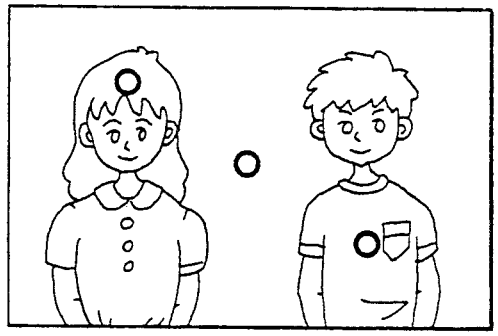
FIGS. 59(*a*) to 59(*e*) show typical framing examples according to the Fuzzy rules of FIG. 21.
Figure 59A:
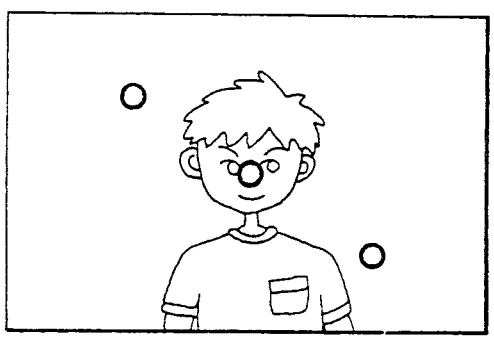

In typical examples of photographing framing shown in FIGS. 59(a) to 59(e), the relation of the rules "a" to "e" to the framing is as described below:

In the case of FIG. 59(a), a main object is located in the center of the frame. The center measured distance value is the closest to 1 m which is the near distance weighting datum in this case. Hence, the possibility CR computed by the rule "b" has the highest value. Other possibilities LR and RR computed by the rules "a" and "c" respectively have low values. The near-medium-far measured distance value orientation does not take place. Therefore, the possibility CR which is computed by the rules "d" and "e" respectively is at a low value. The possibility CR becomes the weighted mean of the values obtained by the rules "b", "d" and "e" and thus gives a highest degree of possibility. Therefore, the center measured distance value is selected.

Figure 59D:
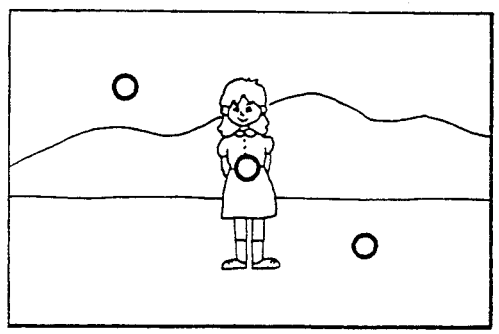
Figure 59B:
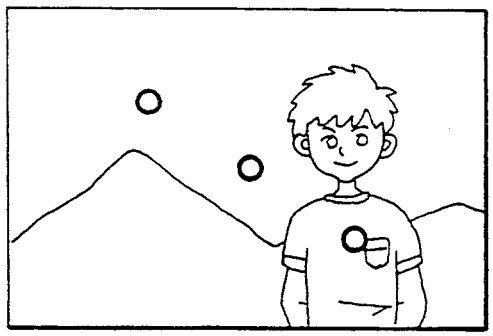

FIG. 59(b) shows the main object on the right side (or on the left side). If the object is located near, the right (or left) measured distance value is the closest to 1 m which is the near distance weighting datum. Therefore, the possibility RR (or LR) computed by the rule "c" (or the rule "a") becomes the highest value. Accordingly, the right (or left) measured distance value is selected in this instance.

FIG. 59(c) shows nearby objects both on the right and left sides. In this case, the possibilities LR and RR are at the highest values. Therefore, either the left or right measured distance value is selected.

Figure 59E:
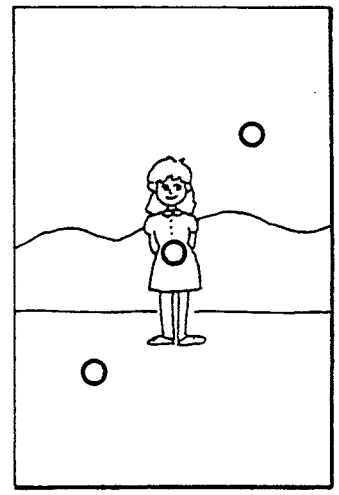

FIGS. 59(d) and 59(e) show a main object in the center of the frame. If the left, center and right measured distance values are in the interrelation of far-medium-near or near-medium-far, the rule "a" or "c" gives a high value to the possibility LR or RR. However, the possibility CR is allowed to have the highest value by the rule "d" or "e" (because the function $\beta$ is larger than the function $\alpha$. As a result, the center measured distance value is selected.

While the rules "a" to "e" of FIG. 21 are as described above, Fuzzy rules used for this embodiment are as shown in FIG. 60, wherein:

Rule 1 is the same as the rule "b" of FIG. 21. As shown at Rule 1 in FIG. 61, the result of computation indicates that the center measured distance value which shows the nearest distance has the highest possibility of being a correct distance value. Rules 2 and 3: They are about the same as the rules "a" and "c" of FIG. 21 and, as shown at Rules 2 and 3 in FIG. 61, the result of computation shows large possibility. However, the former differ from the latter in that a wide angle of view is added to the antecedent. In the case of a wide angle of view, assembled objects spread wide. This strongly suggests that the objects located in the upper-left and the lower-right parts of the picture plane (or frame) are not obstacles. Rules 4 and 5: The rules 4 and 5 are about the same as the rules "d" and "e" of FIG. 21 and, as shown at Rules 4 and 5 in FIG. 61, the former differs from the latter in that a narrow angle of view is added to the antecedent. A narrow angle of view means a close-up shot. Then, in the event of a near-medium-far interrelation, any object located closer than the center measured distance is very likely an obstacle.

Further, the near distance weighting datum point is set at 1 m for the center measured distance value in the same manner as in the case of FIG. 21. However, for the right measured distance value, the near distance weighting datum is set at 2 m for the purpose of a possible distance measurement error due to the presence of the ground. In this case, therefore, the weight is reduced for a distance less than 2 m. As for the left measured distance value, the near distance weighting datum point is set at 1.6 m considering a balanced relation to the right measured distance value. For a left measured distance value less than 1.6 m, the weight is reduced. When the camera is held in a normal posture, the upper-left distance measuring point measures a distance to an object located higher than an object being measured by the lower-right distance measuring point. Therefore, the ground measuring error possibility of the upper-left distance measuring point is less than that of the lower-right distance measuring point. In a case where the camera is held in a vertical posture, however, the upper point becomes lower and its ground measuring error possibility becomes higher than that of the center distance measuring point. In view of this, the near distance weighting datum is set at 1.6 m as an intermediate value between the data provided for the center and lower-right distance measuring points.

In the case of this embodiment, rules 6 to 10 are newly added. The rules 6 and 7 are arranged as follows: Measured distance values indicating very near distances not always represent obstacles. In the case of a close-up shot, the distance measuring area on one side L or R might be outside of the main object. In this instance, the distance measuring areas in the center and on the other side are covering the object located at a very near distance. The measured distance value of the center and that of one side become about equal to each other and indicate very near distances while that of the other side indicates a relatively far distance. The rules 6 and 7 are added for the purpose of lowering the evaluation rate of the possibility that the measured value of the far distance is correct under such conditions. Rule 6: Measured distance values are weighted according to the degree to which the left and center measured distance values are equal to each other; the degrees to which the left and center measured distance values are close to a very near distance weighting datum point 0.5 m; and the degrees to which the distance indicated by the right measured distance value is farther than the center measured distance value and farther than the left measured distance value respectively. Then, the possibility of judging that the right measured distance value is the most correct measured distance value is computed to be lower that other measured distance value by using an applicable function. In the Rule 7: The relation between the left and the right obtained in the rule 6 is conversely handled. By virtue of the rules 6 and 7, the likely out of-place measured far distance value is lightly handled.

FIG. 62 shows a similar case, wherein there are very near obstacles on both sides. In such a case, the parallax of the view finder tends to prevent the photographer from confirming the presence of the obstacles. The rule 8 is added in view of this. As stated at the Rule 8 in FIG. 61, the very near obstacles on both sides are lightly treated while importance is attached to the center measured distance value. Rule 8: Measured distance values are weighted according to the degree to which the left and right measured distance values are about equal to each other; the degrees to which the left and right measured distance values are close to the very near distance weighting datum 0.5 m respectively; and the degrees to which the center measured distance value is relatively farther than the left and right measured distance values. Among these weighted distance values, the rate of possibility that the center measured distance value is the most correct value is computed to be the highest by the applicable function.

In the case of the rule 8, the very near obstacles located on both sides are lightly treated. However, the addition of the rule 8 weakens the near distance priority rules 2 and 3. As a result, the two persons which are located on both sides as shown in FIG. 59(c) might be mistaken for obstacles. To solve this problem, rules 9 and 10 are also added. The rules 9 and 10 partly overlap the rules 2 and 3 but include provisions for attaching importance to the measured distance values obtained from the left and right sides in a case where they both indicate near distances which do not much differ from each other while the center measured distance is relatively farther than them. Rules 9 and 10: The measured distance values are weighted according to the degree to which the left and right measured distance values are about equal; the degrees to which the left and right measured distance values are close to the near distance weighting datum points 0.1 m and 1.6 m respectively; and the degrees to which the center measured distance is relatively farther than the left and right measured distance values respectively. Then, the rate of possibility that the left or right measured distance value is the most correct distance value is computed to be high by an applicable function.

These rules 1 to 10 are subjected to a computing operation. This is a Fuzzy computing operation involving 10 rules having 22 antecedent membership functions and 3 consequent membership functions. One rule has a maximum of 5 antecedent membership functions. Three or four rules are required before obtaining three outputs. Therefore, errors tend to enter in the inside computation of each rule and in the computation between one rule and another.

In the case of this embodiment, the following contrivance is made to permit use of a general-purpose low-cost microprocessor:

The consequent membership functions are modified to have the probabilities uniformly determined in relation to input probabilities. In addition to that, a weighted mean value of probabilities which are weighted by input probabilities is arranged to be obtained in the inter-rule computation. This means an expansion of the maximum value of the membership functions of sum computation by the Fuzzy theory into an algebraic sum. The weighted mean remains the same as long as the consequent membership function is exclusive. It differs in that the overlapping parts are computed. Generally, Fuzzy computation is performed according to rules as shown in FIGS. 63(a) and 63(b).

In the case of the rule of FIG. 63(a), the antecedent membership function is computed for an input X10. The membership degree hA1(X10) of the function is obtained. Then, either the gain of the consequent membership function is changed by using the degree hA1(X10) (a blackened part of the drawing) or, although not shown. the membership function of the rule is obtained by setting the upper limit of the membership function.

In the case of using two rules as shown in FIG. 63(b), X10 and X20 are included in two antecedent membership functions. Then, the membership degrees of these functions become hA2(X10) and hB2(X20). The least of the membership degrees hA2 and hB2 is obtained and hB2(X20) is obtained as the result of AND obtained for the rule. The gain of the consequent membership function is changed by means of the membership degree hB2(X20) as shown in the drawing (a blackened part). In another method, although it is not shown, the upper limit of the membership function is set and is used as the membership function of the rule. As for inter-rule computation, a membership function having the maximum value of the membership functions resulting from the rules is computed in a manner as shown at a part (6) in FIG. 63(b). Then, the barycenter position Uo of this membership function is obtained as the conclusion of the operation.

While the Fuzzy computation generally practiced is as shown in FIGS. 63(a) and 63(b), the embodiment of this invention performs computing operations in the following manner: In carrying out rules, the barycenter positions and heights are recorded and weight attaching degrees are averaged. This method is deemed to correspond to a method of carrying out barycenter computation including the overlapped part shown in a blank triangle between two blackened triangles at the part (6) in FIG. 63 (in cases where the base of the consequent function has a fixed length). The computing operation is, so to speak, performed with two variables to obtain about the same result as the general Fuzzy computation having a width from a point "0" to a point "z" of FIGS. 63(a) and 63(b) without performing the computation of the figure (array) up to its height "1.0" as shown in these drawings.

Figure 64:
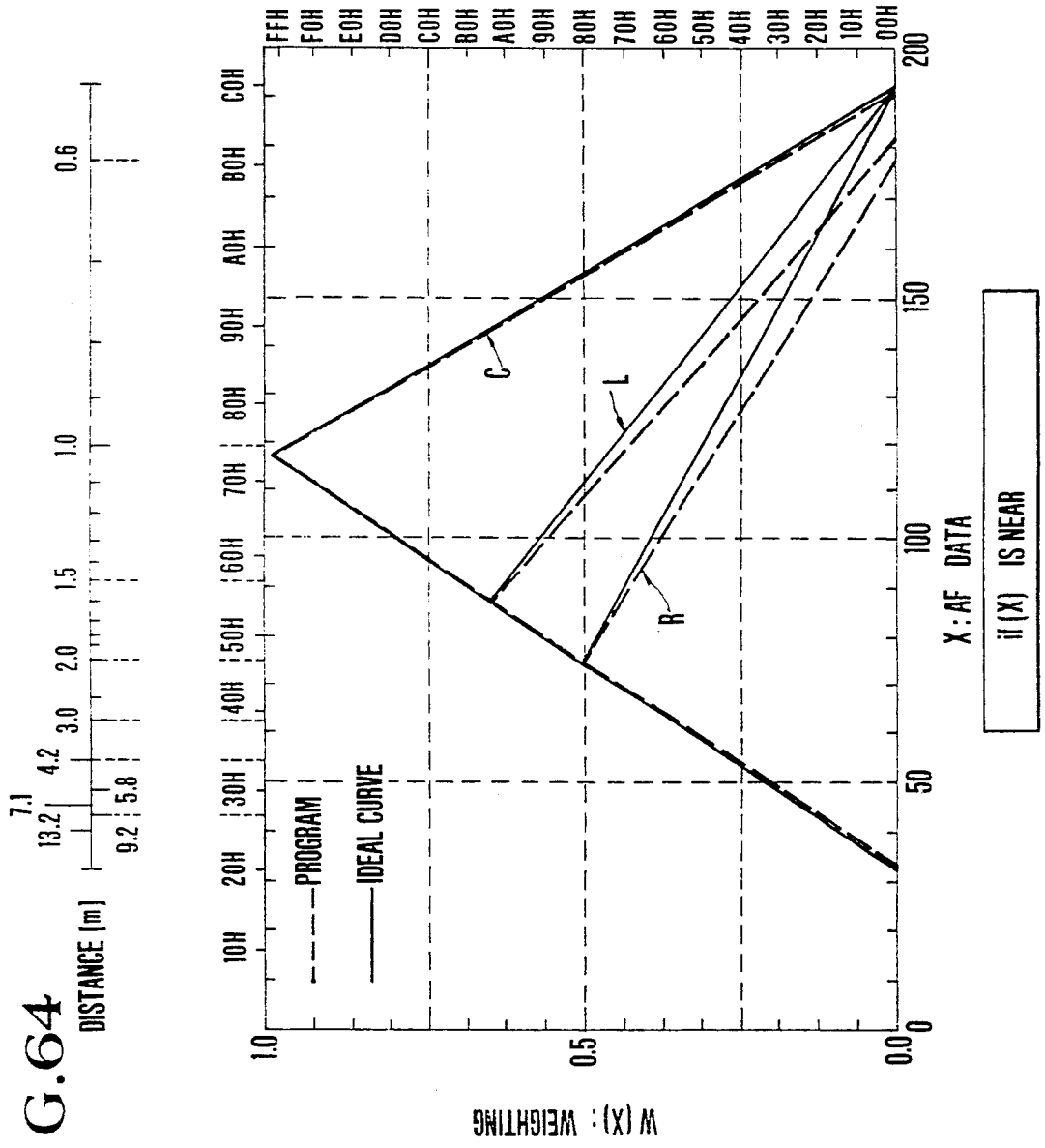
FIGS. 64, 66 to 68 and 70 show membership functions used by the embodiment of FIG. 57.

The membership functions to be used by this embodiment are as described below:

These functions are prepared according to the Fuzzy rules of FIG. 60. FIG. 64 shows the antecedent membership functions of the rules 1 to 3. The axis of abscissa of FIG. 64 shows distances between an infinity distance and 0.5 m with the infinity distance set a the zero point. These distances are expressed in AF data obtained by integrating pulses generated every time a distance ring is turned round a given degree of angle. The upper axis of abscissa shows the data in hexadecimal values and the lower axis of abscissa in decimal values. The left axis of ordinate shows the degrees of weight from 0 to 1. The right axis of ordinate shows the degrees of weight in hexadecimal values for input to the microprocessor. In respect to the "near" of the antecedent parts of the rules 1 to 3, a membership function which has its peak at about 1 m thus indicating the general photographic notion of "near" (not "very near") is used for the center distance measuring point as shown in FIG. 64. As for the left and right distance measuring points, the measured near distance values are expressed in triangular forms having peak values at 1.6 m and 2 m respectively because of the possibility that a ceiling or a ground is unintentionally measured. Distances farther than 1.6 m and 2 m are handled with priority given to near distances. Distances nearer than 1.6 m and 2 m are lightly handled.

As regards computation, the degrees of membership are computed according to formulas (1), (2), (3) and (10) shown in FIG. 65. For the "and" within each rule, the minimum value of the membership degree is used.

Figure 66:
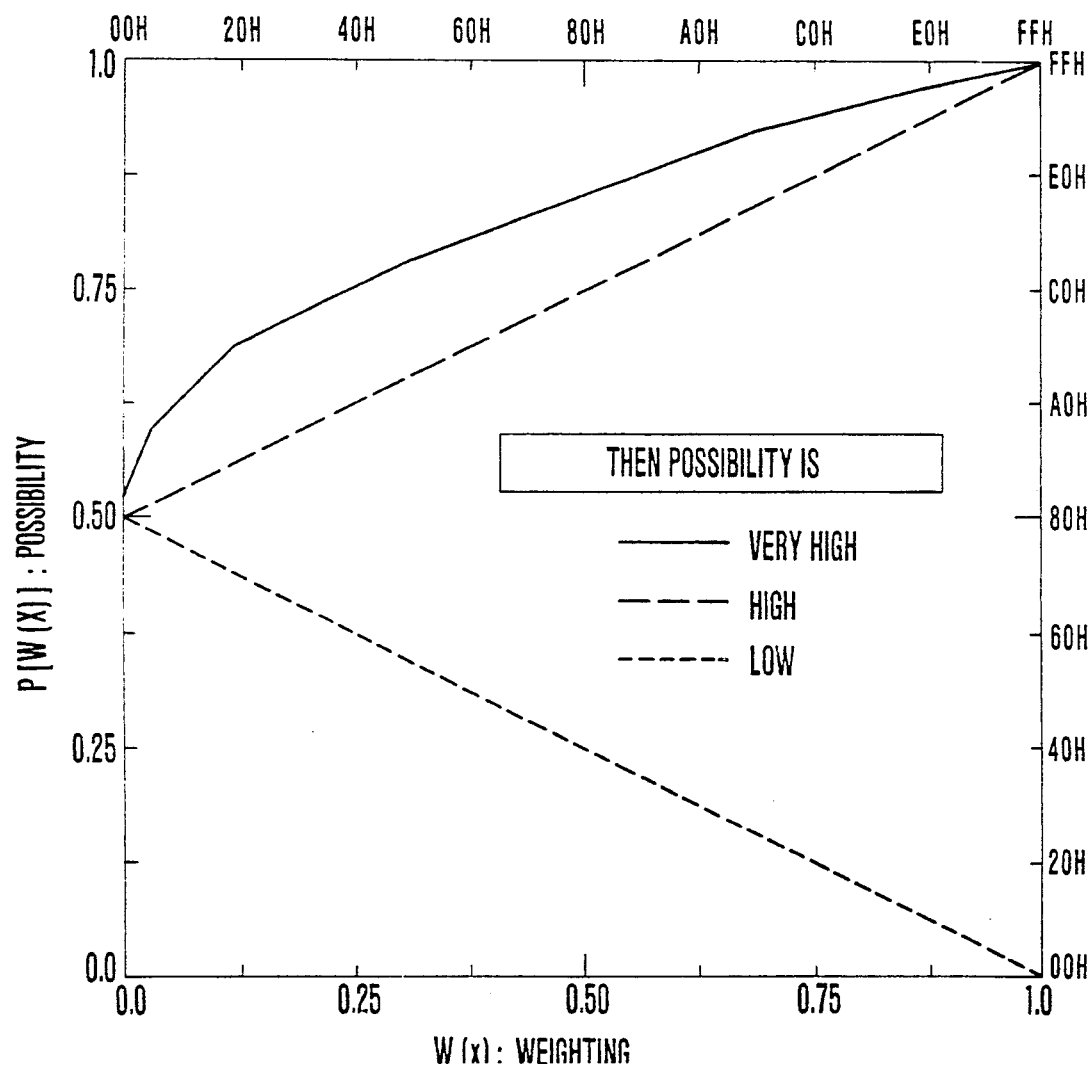

FIG. 66 shows the consequent membership functions of the rules 1 to 10. In FIG. 66, the lower axis of abscissa shows the weight of the antecedent part. The upper axis of abscissa shows the weight in hexadecimal values for input to the microprocessor. The left axis of ordinate shows the possibility of correctness of the measured distance values in decimal values. The right axis of ordinate shows the same possibility in hexadecimal values for input to the microprocessor. The consequent parts of the rules 1 to 3 are arranged as follows: For inter-rule computation with weighted mean as mentioned in the foregoing, functions showing probability rates 50% (80 H) to 100% (FFH) for the membership degrees 0 to FFH are used as shown in FIG. 66. The computation of this is performed according to a formula (11) shown in FIG. 65.

The rules 4 and 5 give priority to the center measured distance value in the case of the far-medium-near measured distance condition as mentioned in the foregoing. Since such condition is possible within a wide distance range, the judgment for far and near distances is made relative to the center measured distance value. In addition to that, the consequent parts of the rules 4 and 5 are arranged to be strong for the purpose of prevailing over the rules 1 to 3. Therefore, as shown by a dotted line in FIG. 67 (the axes of ordinate and abscissa are arranged in the same way as FIG. 64), the "nearer than" of the antecedent membership function gives 1.0 (FFH) if the distance becomes about one half (if apparently near as judged from the depth of field).

Figure 68:
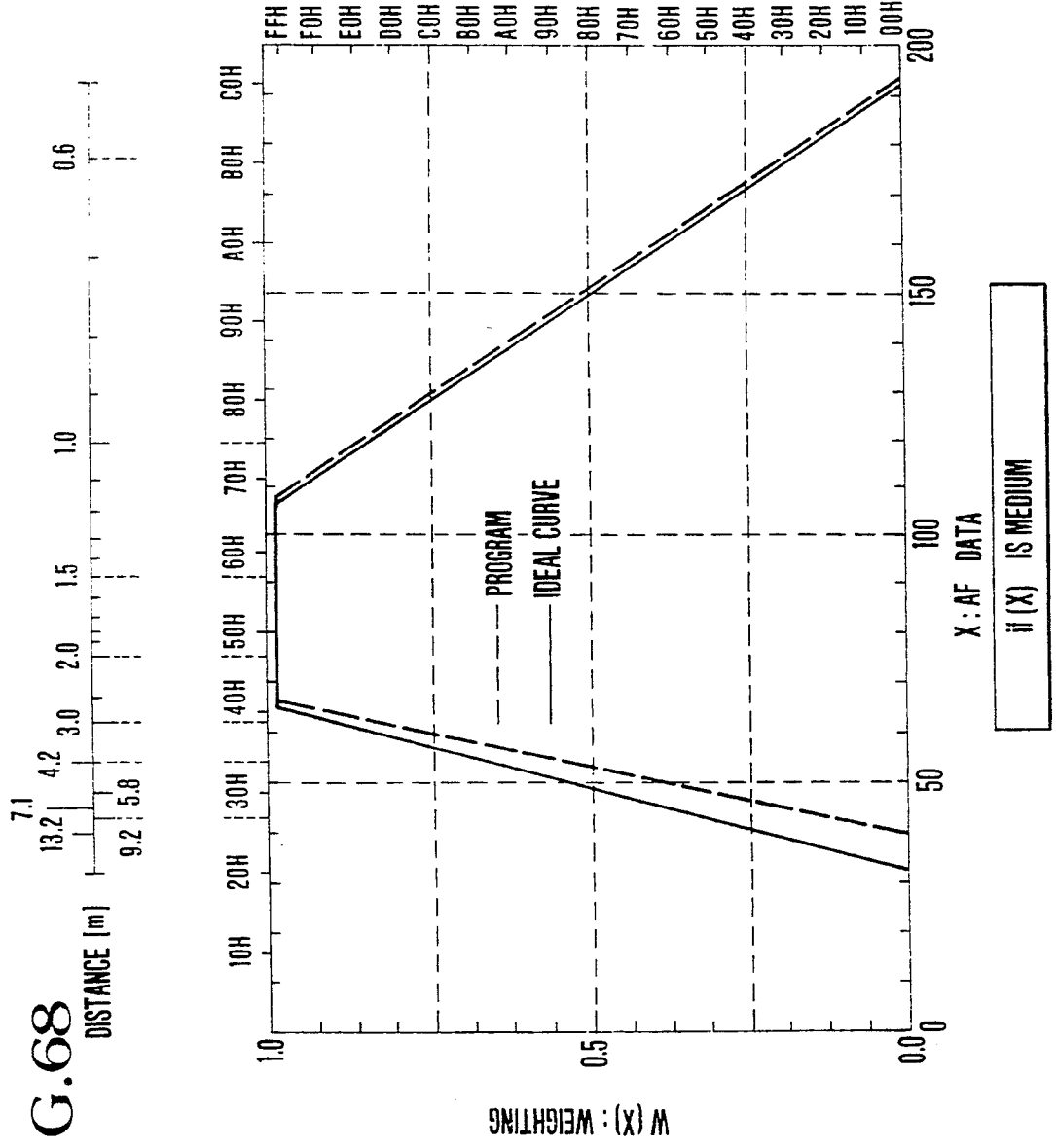

Further, with respect to the part "medium", a membership function which gives a maximum weight 1.0 (FFH) to a distance between 1.2 to 2.5 m at which pictures of persons are often taken in general as shown in FIG. 68 (the axes of ordinate and abscissa are arranged in the same way as in FIG. 64).

The part "angle of view is narrow" is a function which is complementary to the part "angle of view is wide" of the rules 2 and 3. In the case of zooming of the lens, the angle of view is changed in an analog manner. This part is provided because the layout of picture composition changes with the angle of view. The layout changes to a greater degree in the case of change-over of photo-taking size between a full size and a half size. In the case of this embodiment, therefore, membership degrees which are determined according to the full-size or half-size photographing are set. FIG. 69 shows an example of this setting at a formula (9) which is provided for that purpose.

Figure 67:
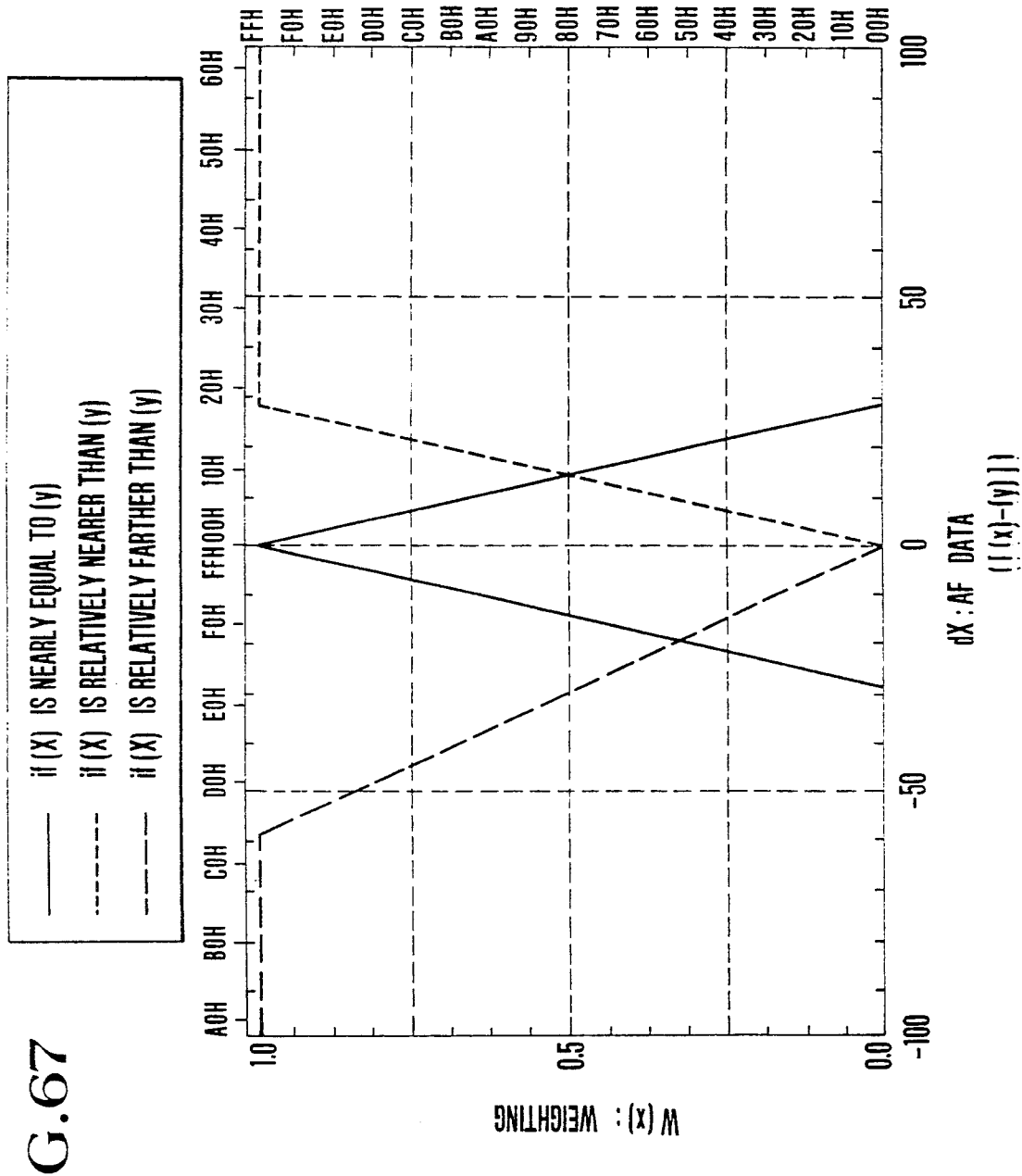

Further, with respect to the consequent membership functions of the rules 4 and 5, functions are arranged to give, so to speak, the square of the part "high" (a dotted line of FIG. 67) as indicated by a full line in FIG. 67. The function is thus arranged to give a higher value of possibility than the antecedent part.

FIG. 69 shows the program of this embodiment. In this program, a shifting process using linear interpolation with easily computable multiples in place of time consuming multiplication. As a result, the shape of the function somewhat deviates from the ideal curve thereof as indicated by a broken line in FIG. 68.

Figure 70:
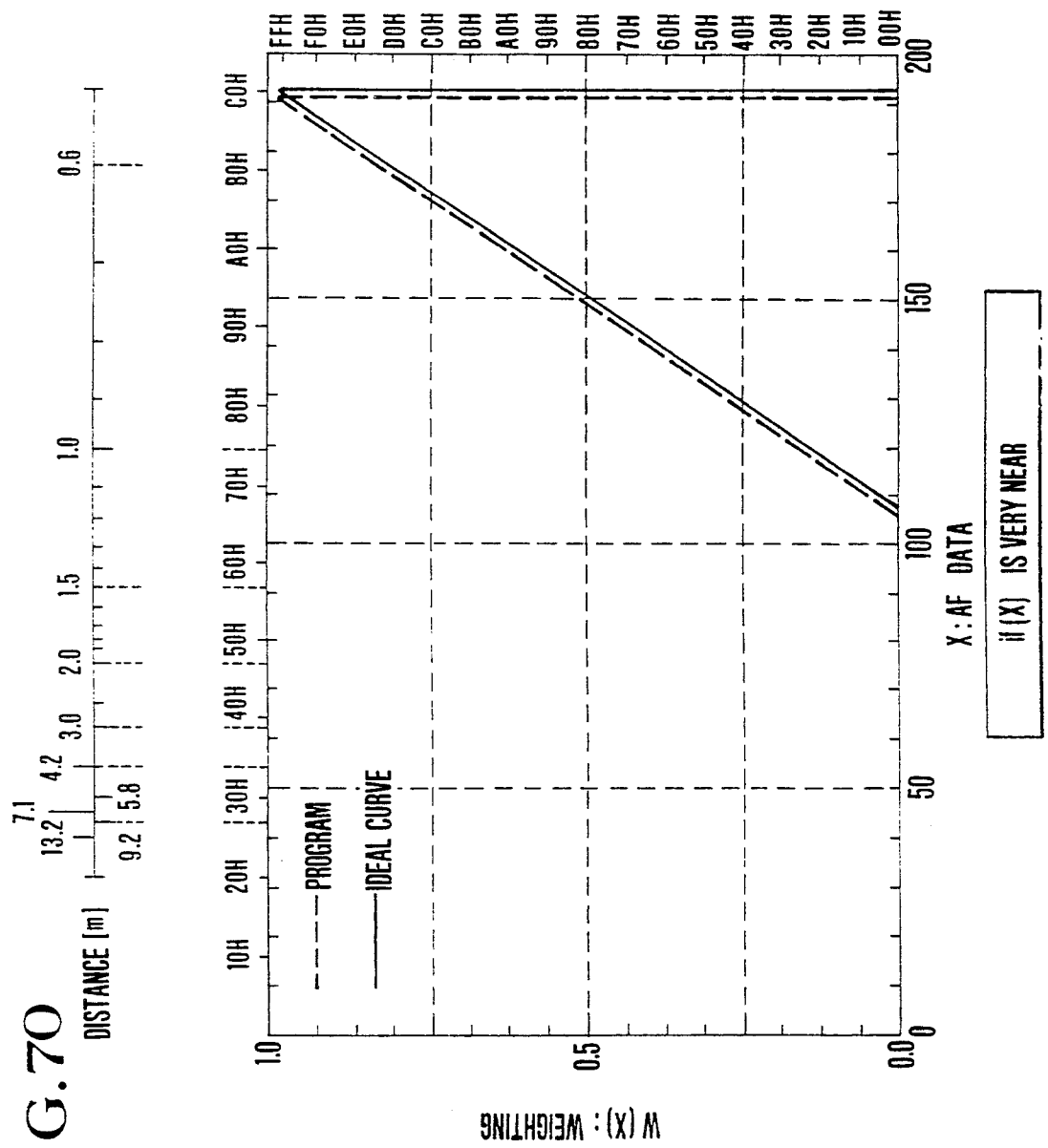

The rules 6 and 7 are provided for a case where distances to "two points which are very near and are nearly equal to each other" and that of a point deviating at an end part. For the part "nearly equal", a membership function which gives zero when distances differ as much as two times is used as shown in FIG. 67. For the part "very near," a membership function which increases the weight within 1.2 m as shown in FIG. 70 (axes of ordinate and abscissa are arranged in the same way as in FIG. 64) is used. Used for the part "relatively farther", is a membership function which gives 1.0 (FFH) for a distance differing to a great degree such as an infinity distance or 1.5 m as shown in FIG. 67. For a program, the embodiment employs proximity computation as shown in FIG. 71.

For the part "possibility is low", a function which lowers the possibility accordingly as the antecedent membership degree increases is used.

The membership functions are again described as follows: The membership functions for the part "near" varies according to the use of it for the center, right or left measured distance value, because: As mentioned in the foregoing, the lower-right distance measuring point has a high degree of possibility of mistaking an obstacle for the object is high. Hence, the membership function is lowered for the lower-right distance measuring point in the case of a distance nearer than 2 m. The same sort of mistaking is possible with the upper-left distance measuring point in the event of vertical posture photographing when it is turned round 90 degrees to the left. Therefore, for the left measuring point, the membership function is lowered for an upper-left measured distance nearer than 1.6 m. Further, in the case of a distance farther than 2 m, a function similar to that of the center measuring point is provided for the left and right distance measuring points to compare the membership degree with that of the center distance measuring point on the same level. As for very near distances, a function is formed in such a way as to have a membership degree lower than the center distance measuring point. A membership function for the part "relatively farther", is arranged to indicate that the distances are differing more than two times and if the lens is focused on one distance, the other would be out of focus.

Figure 61:
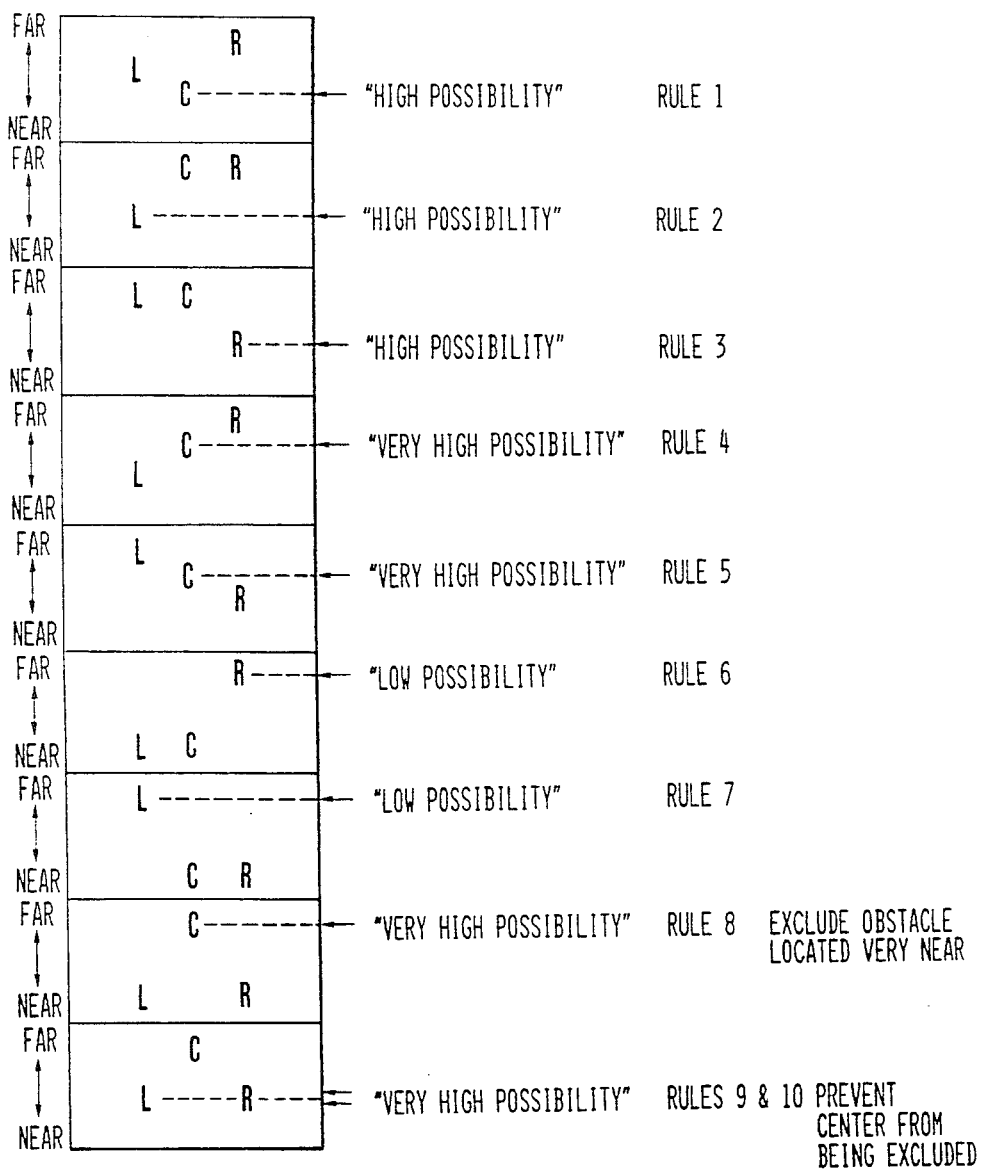
FIG. 61 schematically shows the Fuzzy rules of FIG. 60.
Figure 72:
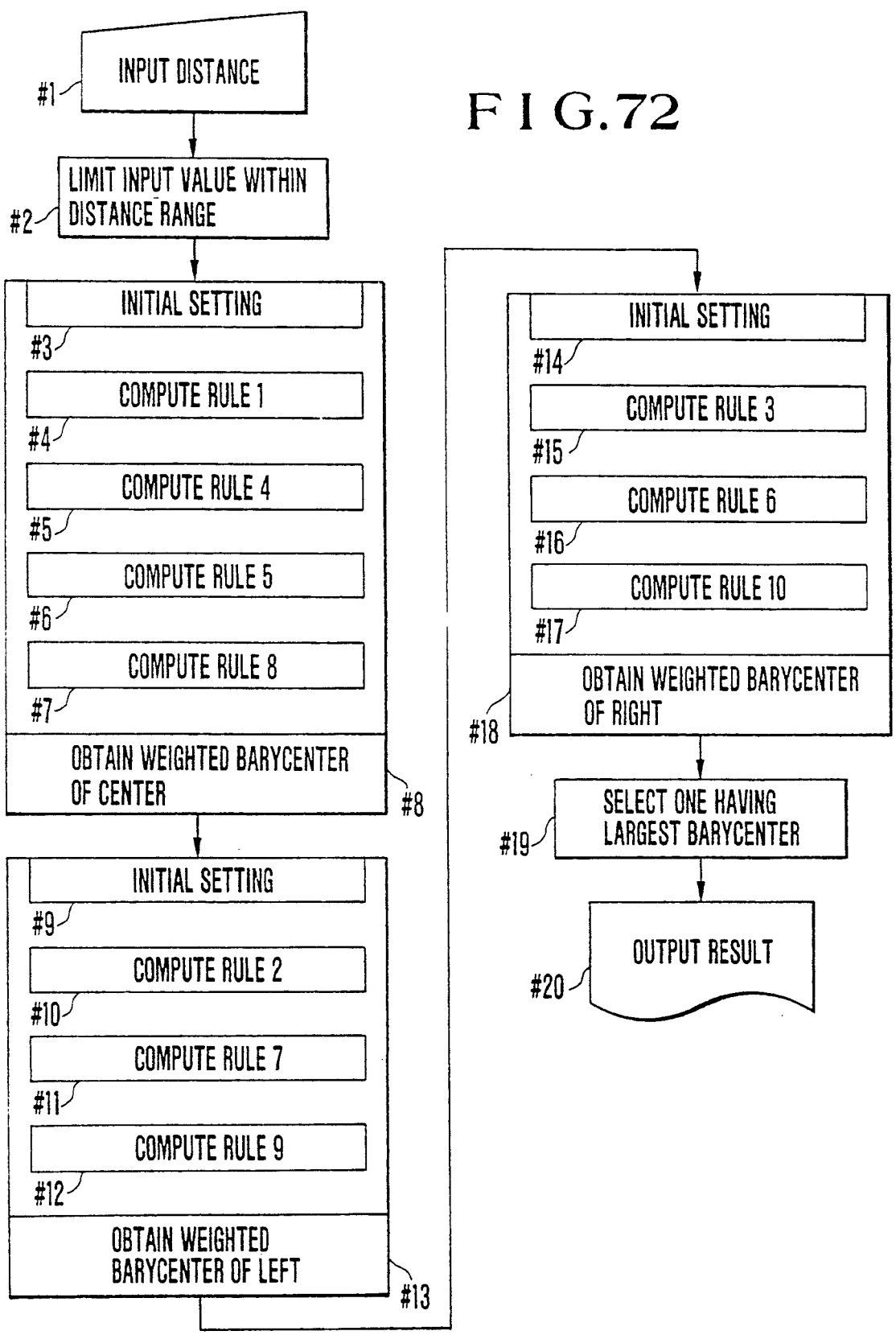
FIG. 72 shows in outline the program of the same embodiment.

FIG. 72 is a flow chart showing a program provided for this embodiment. At a step #1: Information on the measured distance values is received from the distance measuring systems 501 to 503. At a step #2: Each of the input values is limited according to a distance range. Steps #3 to #8 are provided for computing the possibility of that #the measured distance value of the center distance measuring point is the most correct distance value. At the step #3: Initial setting is performed. At the step #4: A computing operation is performed according to the rule 1 (FIG. 61). At the step #5: A computing operation is performed according to the rule 4. At the step #6: A computing operation is performed according to the rule 5. At the step #7: A computing operation is performed according to the rule 8. At the step #8: The barycenter of the weighted measured distance value of the center distance measuring point is obtained. Steps from #9 through #13 are provided for computing the possibility of that the measured distance values obtained from the left distance measuring point is the most correct distance value. At the step #9: Initial setting is performed. At the step #10: A computing operation is performed for the rule 2. At the step #11: A computing operation is performed for the rule 7. At the step #12: A computing operation is performed for the rule 9. At the step #13: The barycenter of the weighted measured distance value of the left distance measuring point is obtained. Steps from #14 through #18 are provided for computing the possibility of that the measured distance value obtained from the right distance measuring point is the most correct distance value. At the step #14: Initial setting is performed. At the step #15: A computing operation is performed for the rule 3. At the step #16: A computing operation is performed for the rule 6. At the step #17: A computing operation is performed for the rule 10. At the step #18: The barycenter of the weighted distance value of the right distance measuring point is obtained. At a step #19: One of the measured values having the largest barycenter is selected. At a step #20: The selected measured distance value is output as the most correct measured distance value.

FIGS. 73 to 80 show program examples for actually executing the program shown in FIG. 72. These programs conform to the ISO/JIS FORTRAN. According to these programs, three distance values are obtained from a file address 5 and the results of selection, etc. are written in a file address 6. Further, a mark " is used for inline comments.

FIG. 73 shows steps #1 and #2. At the step #1: The measured distance values of the center, right and left distance measuring points are received. At the step #2: The input values are limited.

FIG. 74 shows a part for obtaining the probability of the center measured distance value. A membership function MF1C (for center measured distance value) is used for the rule 1. With its membership degree obtained by a function of "high possibility", the integrated value of weighting SPPW and that of weight SPW are obtained. (Step #4)

In the computing operation for the rule 4, the part "L (left measured distance) is nearer than C (center measured distance)" is computed with a membership function MF4. The part "C is medium" is computed with a membership function MF3. The part "C is nearer than R (right measured distance)" is computed with the membership function MF4. The part "angle of view if narrow" is computed with a membership function MF7. Then, using the MIN0 of each of the incorporated functions, the minimum value of the membership degree is obtained. According to the result of this, the integrated value of weighting SPPW and the integrated value of weight SPW are obtained with the function of "possibility is very high" of the consequent membership function. (Step #5)

Following the above, a computing operation is performed for the rule 5. The part "R is nearer than C" is computed with the membership function MF4; the part "C is medium" with the membership degree which has been computed and held at "P22"; the part "C is nearer than L" with the membership function MF4; and the part "angle of view is narrow" with the membership function MF7, respectively. Then, according to a minimum membership degree thus obtained, the integrating computation is performed on the consequent part with a consequent part function for "probability is very high". (Step #6)

A computing operation for the rule 8 is likewise performed. The part "L and R are nearly equal" is computed with a membership function MF6. The part "L is very near" is computed with a membership function MF2. The part "R is very near" is computed with the membership function MF2. The part "C is relatively farther than L" is computed with a membership function MF5. The part "C is relatively farther than R" is computed with the membership function MF5. Then, using each membership degree at its minimum value, the membership degree is computed with a consequent membership function for "very high". (Step #7)

Then, the overall probability (overall barycenter position) is obtained from the probabilities (barycenter positions) of the consequent membership degrees with the overall probability weighted by membership degree (weight) of each probability in the following manner: Overall probability = $\Sigma$((membership degree of i-th rule) * (probability of i-th rule)) / $\Sigma$ (membership degree of i-th rule). Through this process, the overall probability can be numerically obtained "without computing the array of the functional forms of the consequent membership function". (Step #8)

FIG. 75 shows a program part for obtaining the probability of the left measured distance value. The consequent membership functions are computed for the rules 2, 7 and 9; and the probability of the left measured distance value is obtained by obtaining weighted mean values of the results of computation. (Steps #9 to #13)

FIG. 76 shows a program part for obtaining likewise the probability of the right measured distance value (steps #14 to #18) and another program part for selecting and producing one of three probability rates (steps #19 and #20). The probability of the right measured distance value is obtained by computing the consequent membership for each of the rules 3, 6 and 10 (10 is the same as 9 in respect to the formula).

The selection of one of three probability rates is made by producing a distance value corresponding to the largest of the three. In the event of equal rates, the center measured distance value is produced.

FIGS. 77 to 80 show function programs for the membership functions to be used for the program described in the foregoing. For obtaining the membership functions mentioned after the description of FIG. 64 are programmed according to the formulas shown in FIGS. 65, 69 and 71.

For example, the function for "near" of the membership function MF1C relative to the center distance measuring point is programmed to be zero for distances not exceeding 33 (far side). Distances between 33 and 118 have an increasing function which increases from zero to 255. Distances between 118 and 191 have a decreasing function which decreases from 255 to zero (greater, than zero). For distances above 191 (near side), zero is given back. (FIG. 65, (1))

The membership functions MF1L and MF1R for "near" for the left and right distance measuring points are arranged to decrease for distances exceeding (or nearer than) 76 and 88. (FIG. 65, (2) and (3))

FIG. 78 shows a function program arranged to show the function MF2 for "very near" by a function which becomes large at a near distance between distances from 107 to 192 (FIG. 71, (4)); and to show the function MF3 for "medium" by a trapezoidal membership function having 38 to 192 as the bottom and 67 to 106 as the upper side thereof. (FIG. 69, (5)) Further, the function MF4 for "x is nearer than y" is expressed by a membership function which increases the distance difference of the function MF4 from 0 to 29. (FIG. 69, (6))

FIG. 79 shows a function program which expresses a function MF5 for the part "x is relatively farther than y" (a membership function which decreases at a distance difference from −56 to zero,—FIG. 71, (7)); a function MF6 for the part "x and y are nearly equal" (a membership function which increases the absolute value of difference at below 29, --- FIG. 71, (8)); a function MF7 for the part "angle of view is narrow" (FIG. 69, (9)); and a function for the part "angle of view is wide" (FIG. 65, (10)).

FIG. 80 shows a program for the consequent membership function and the integrating part of the consequent part. A function HIGH showing the part "possibility is high" is provided for computing a weighted mean value weighted by probability rates from 128 to 255 and membership degrees according to membership degrees from zero to 255 of the antecedent part. For this purpose, integrating operations are performed on the product of the two and the membership degree through common variables SPPW and SPW. (FIG. 65, (11))

The program is thus arranged as follows: The probability rate of 128 (meaning 50%) is lightly weighted on the average if the membership degree is low. The probability rate of 255 (meaning 100%) is heavily weighted on the average if the membership degree is high. A function LOW for showing the part "possibility is low" is arranged to average weight the probability rates of 128 to zero according to the zero to 255 of the antecedent membership function. (FIG. 71, (12))

A function EXHIGH for the part "possibility is very high" is arranged to produce and average weight the probability rates of 132 to 255 (probability of that the same membership degree is higher than HIGH) according to the membership degrees of zero to 255. (FIG. 69, (13))

Briefly stated, the actions described above perform, so to speak, color sorting as to which of the three measured distances is to be selected by using the Fuzzy rules within a three-dimensional space consisting of the three distances.

However, it is an advantageous feature of this embodiment that a complex color sorting process which is more effective than a color sorting process based on a simple near-priority rule can be accomplished through adjustment made by intuitive Fuzzy rules.

In actuality, scenes to be photographed consists of a combination of varied distances. Selection of an optimum distance from among a variety of distances can be accomplished by methods of varied kinds. In the light of this, the use of the intuitive Fuzzy rules, adjustment according to the rules and the arrangement to have them simply programmed within a microprocessor are believed to give a good machine.

FIGS. 81, 82(*a*), 82(*b*), 83(*a*), 83(*b*), 84(*a*), 84(*b*), 85(*a*) and 85(*b*) show an embodiment of this invention wherein the Fuzzy theory is programmed for a practical machine product. In this case, the FORTRAN program of FIGS. 73 to 80 described in the foregoing is programmed on a 4-bit microprocessor, Model No. 47C800, which is a product of Toshiba.

Because of its character as an assembler, the center measured distance value is located at an address AFCNTL. The membership degree is obtained at an address 0.1 of a RAM by subroutine calling each membership function. Then, according to the membership degrees stored at addresses 20 and 21, the consequent membership is computed. Each membership function MEMB internally works as a function equivalent to MEMF.

At the start of the program, a RAM area is first cleared by means of RAMCAF and the rule 1 is computed. An address indicative of information about the distance of the center is placed in an HL register. The membership degree of the membership function MEMB1C is obtained from it. Its probability is computed by a PHIGH (PROBBH). Next, the rule 4 is computed by designating the addresses of the measured distance values of the center and the left. By this, the membership degree of that "the left is nearer than the center" is obtained with the membership function MEMBR4. Next, the membership degree of the part "the center is medium" is obtained with the membership function MEMBR3. Then the part "&" is computed with a minimum function of FIG. 82.

Next, the membership degree of the part "the center is nearer than the right" is obtained with the membership function MEMBR4. Then, "&" is computed again with the minimum function. The part "angle of view is narrow" is computed with the membership function MEMBR7. Then "&" is computed. Probability is computed with PHIGHX (=PROBBX).

Following this, a computing operation is performed for the rule 5. The degree of that "the right is nearer than the center" is computed with the membership function MEMBR4 which has the addresses of the center and right measured distance values set there. The degree of "the center measured distance value is medium" and "&" stored at the addresses 22 and 23 of the RAM are computed. Next, the measured distance value addresses of the left and the center are set. The degree of "the center is nearer than the left" is computed with the membership function MEMBR4. The result of this and the degree of "angle of view is narrow" are put together and the consequent part is integrated by a PHIGHX (=PROBBX).

Next, a computing operation is performed for the rule 8. The addresses of the right and left measured distance values are set. The degree of "right and left measured distance values are nearly equal" is obtained with the membership function MEMBR6 (=MEMF6). With the address of the left measured distance value set, the degree of "left measured distance value is very near" is obtained with the membership function MEMBR2 (=MEMF2). With the address of the right measured distance value set, the degree of "right measured distance value is very near" is obtained with the membership function MEMBR2. The addresses of the center and left measured distance values are set and the degree of "the center is relatively farther than the left" is obtained with the membership function MEMBR5. Next, the center and right measured distance values are set as shown in FIG. 84. The degree of "the center is relatively farther than the right" is obtained with the membership function MEMBR5. Their "&" is obtained and the integrated value of the consequent part is obtained with the PHIGHX. The weighted mean of the consequent part is obtained by DV20S and is set as the probability of the center measured distance value.

Next, the probability of the left (measured distance value) is obtained in the following manner: A computing operation is first performed for the rule 2. The address of the left measured distance value is obtained. The function MEMBR1L (=MEMF1L) is called to obtain the membership degree of "the left measured distance value is near for the left". Following this, the membership degree of "the angle of view is wide" is obtained with the function MEMBR8 (=MEMF8). Then, the consequent part is integrated with PHIGH (=PROBBH).

For the rule 7: the addresses of the center and right measured distance values are set. The degree of "the center and right measured distance values are near" is obtained by calling the function MEMBR6. The degree of "the right is very near" and "&" are computed. The address of the center measured distance value is set. The function MEMBR2 is called to obtain the degree of "the center is very near" together with "&". The addresses of the left and right measured distance values are set and the function MEMBR5 is called to obtain the degree of "the left is relatively farther than the right". Next, the address of the left measured distance value is set and the function MEMBR5 is called to compute the degree of "the left is relatively farther than the center". After that, according to the results of these computing actions, PLOW (=PROBBL) is called to compute the degree to which the probability of the left measured distance value is to be lowered.

Referring to FIG. 84, a computing operation is performed for the rule 9 in the following manner: The degrees of "the left and the right are nearly equal" and "the left is near" which have been computed are called. The address of the right measured distance value is set. The function MEMBR1R (=MEMF1R) is called. With these actions performed, the degree of "the right measured distance value is near" is obtained. Then, the degrees of "the center is relatively farther than the left" and "the center is relatively farther than the right" are obtained. From these degrees, the consequent membership degree is obtained by means of PHIGHX. After that, the probability of the left measured distance value is obtained with DV20S from the weighted mean thereof.

Next the probability of the right measured distance value is obtained in the following manner:

For the rule 3, the degree of "the right is near" computed in the above-stated manner and the degree of "the angle of view is wide" obtained by the membership function MEMBR8 are "&"-computed. Then, the consequent part is computed with PHIGH. For the rule 6, the addresses of the center and left measured distance values are set. The degree of "the center and left measured distance values are close to each other" is obtained by calling the function MEMBR6. Then, the degree of "the right is relatively farther than the center" is obtained from the above-stated degrees of "the left measured distance value is very near" and "the center measured distance value is very near" by setting the addresses of the right and left measured distance values; by obtaining the degree of "the right is relatively farther than the left" obtained by calling the function MEMBR5; by setting the addresses of the right and center measured distance values as shown also in FIG. 85; and by calling the function MEMBR5. Then, the degree to which the probability of the right measured distance value is to be lowered is computed with PLOW.

The probability of the rule 10 is integrated by calling PHIGHX according to the membership degree of the above-stated rule 9. Then, the barycenter probability of the left measured distance value is computed by calling DV20S.

The probability rates of three measured distance values are computed in the above-stated manner. After that, the probability rates of the center and right measured distance values are compared by DTCMPR. If the probability of the center is larger than that of the right or equal to the latter, the probability rates of the left and center measured distance values are compared with each other. If the probability of the center is larger than or equal to that of the left, the center measured distance value is decided to be the final measured distance value.

If the probability of the center is found then to be less than that of the left, the left measured distance value is decided to be the final value. If the probability of the center is found to be smaller than that of the right, the probability rates of the left and the right are compared. If the probability of the left is found to be larger than or equal to that of the right, the left measured distance value is decided to the final value. If the probability of the left is less than that of the right, the right measured distance value is decided to be the final value.

As described in the foregoing, the action to obtain the probability of each of a plurality of measured distance values as to representing a distance to a main object to be photographed can be programmed on the basis of the Fuzzy theory by simply converting Fuzzy rules. The program can be changed by virtue of the sensory language to permit easy adjustment of the apparatus. The program thus can be changed to enable a 4-bit microprocessor not only to discriminate obstacles but also to perform such elaborate or fine control and adjustment as to select the measured distance value of one of the center, left and right distance measuring points with due consideration of those of other points.

In short, the selection of one of a plurality of measured distance values can be accomplished by a microprocessor in accordance with complex rules. A camera embodying this invention permits the photographer to take a sharply focused picture without paying attention to a distance measurement mark. Besides, the program which is prepared by easy development of readily apprehensible Fuzzy rules permits easy adjustment. The barycenter computation utilizing the Fuzzy theory enables the program to be arranged in a compact state.

According to the foregoing description, the embodiment is arranged to have three distance measuring areas or points including the center, upper-left and lower-right distance measuring points. However, the invention is not limited to this. The distance measuring points may be either or vertically aligned and the number of them bay be increased to four or more.

This invention is applicable not only to a lens shutter type camera which directly measures the object's distance but also applicable to a single-lens reflex camera arranged to proximately convert a lens position into a distance value. The invention is applicable also to other optical apparatuses and optical systems.

What is claimed is:

1. A focus adjustment information forming device, comprising:
   (a) detection means for detecting signals depending on distances to objects existing in a plurality of directions relative to a photographic scene, and
   (b) a focus adjustment information forming means for forming a focus adjustment information centering on an object existing in a central target direction in response to said detection means when the distances to the objects in said plurality of directions are in mutual relations of a long distance in a marginal target direction toward one marginal portion of said photographic scene, an intermediate distance in said central target direction toward a central portion of said photographic scene and a short distance in another marginal target direction toward another marginal portion of said photographic scene.

2. A device according to claim 1, wherein said focus adjustment information forming means includes means for forming a focus adjustment information centering on the object existing in said another marginal target direction when the distances of the objects existing in the plurality of distances are not in said mutual relation of the long distance in the one marginal target direction, the intermediate distance in the central target direction and the short distance in the another marginal target direction and are in a mutual relation wherein the distance in the one marginal target direction is shorter than the distances in the central target direction and the another marginal target direction.

3. A device according to claim 2, wherein said focus adjustment information forming means includes means for forming a focus adjustment information centering on the object existing in the central target direction when the distances of the objects existing in the plurality of directions are not in the mutual relation wherein the distance in the one marginal target direction is long, the distance in the central target direction is intermediate, and the distance in the another marginal target direction is short, and are not in a mutual relation wherein the distance in the one marginal target direction is shorter than the distances in the central and the another marginal target directions.

4. A device according to claim 1, wherein said focus adjustment information forming means includes means for forming a focus adjustment information centering on the object existing in the central target direction when the distances of the objects existing in the plurality of directions are not in the mutual relation wherein the distance in the one marginal target direction is long, the distance in the central target direction is intermediate, and the distance in the another marginal target direction is short, and are in a mutual relation wherein the distance in the another marginal target direction is shorter than the distances in the central target direction and in the one marginal target direction.

5. A device according to claim 4, wherein said focus adjustment information forming means includes means for forming a focus adjustment information centering on the object existing in the central target direction when the distances of the objects existing in the plurality of directions are not in the mutual relation wherein the distance in the one marginal target direction is long, the distance in the central target direction is intermediate, and the distance in the another marginal target direction is short, and are not in a mutual relation wherein the distance in the another marginal target direction is shorter than the distances in the central target direction and in the one marginal target direction.

6. A device according to claim 1, wherein said focus adjustment information forming means includes a program operation circuit.

7. A device according to claim 1, wherein said focus adjustment information forming means includes an analog operation circuit.

8. A device according to claim 1, wherein said focus adjustment information forming means includes means for judging said long distance, said intermediate distance and said short distance on the basis of their absolute distances.

9. A device according to claim 1, wherein said focus adjustment information forming means includes means for judging said long distance, said intermediate distance and said short distance on the basis of their relative distances.

10. A device according to claim 1, wherein said focus adjustment information forming means includes means for judging said long distance, said intermediate distance and said short distance in view of a depth of field.

* * * * *